(12) United States Patent
Zabair et al.

(10) Patent No.: US 8,396,268 B2
(45) Date of Patent: Mar. 12, 2013

(54) SYSTEM AND METHOD FOR IMAGE SEQUENCE PROCESSING

(75) Inventors: Adeala T. Zabair, Oxford (GB); J. Alison Noble, Oxford (GB)

(73) Assignee: Isis Innovation Limited, Oxford (GB)

( * ) Notice: Subject to any disclaimer, the term of this patent is extended or adjusted under 35 U.S.C. 154(b) by 499 days.

(21) Appl. No.: 12/751,766

(22) Filed: Mar. 31, 2010

(65) Prior Publication Data

US 2011/0243401 A1 Oct. 6, 2011

(51) Int. Cl.
*G06K 9/00* (2006.01)
(52) U.S. Cl. ........ 382/128; 382/131; 382/132; 382/201; 382/224; 128/922
(58) Field of Classification Search .................. 382/128, 382/131, 132, 201, 224; 128/922
See application file for complete search history.

(56) References Cited

U.S. PATENT DOCUMENTS

| 7,995,819 B2* | 8/2011 | Vaillant et al. | 382/128 |
| 8,073,213 B2* | 12/2011 | Vaillant et al. | 382/128 |
| 2009/0161938 A1 | 6/2009 | Shekhar et al. | |
| 2011/0229005 A1* | 9/2011 | Den Harder et al. | 382/131 |

OTHER PUBLICATIONS

Novotney, R. L. (1976). Non-invasive determination of the human brachial arterial pressure wave contour. University of Illinois at Chicago, Health Sciences Center). ProQuest Dissertations and Theses, , 216 p. Retrieved from http://search.proquest.com/docview/302848119?accountid=14753. (302848119).*
Boukerroui, D., et al., "Velocity Estimation in Ultrasound Images: A Block Matching Approach," *IPMI*, pp. 586-598, 2003.
Breiman, L., "Bagging Predictors," *Machine Learning*, 1996, pp. 123-140, vol. 24, No. 2.
Breiman, L., "Random Forests," *Machine Learning*, 2001, pp. 5-32, vol. 45, No. 1.
Caruana, R., et al., "An Empirical Comparison of Supervised Learning Algorithms," *Proceedings of the 23rd International Conference on Machine Learning*, 2006.
Cerqueira, M.D., et al., "Standardized Myocardial Segmentation and Nomenclature for Tomographic Imaging of the Heart," *Circulation*, 2002, pp. 539-542, vol. 105, No. 4.
Cohen, B., et al., "New Maximum Likelihood Motion Estimation Schemes for Noisy Ultrasound Images," *Pattern Recognition*, 2002, pp. 455-463, vol. 35.
Cohen, J., "A Coefficient of Agreement for Nominal Scales," *Educational and Psychological Measurement*, 1960, pp. 37-46, vol. 20, No. 1.

(Continued)

*Primary Examiner* — Gerald J. O'Connor
*Assistant Examiner* — Mark Holcomb
(74) *Attorney, Agent, or Firm* — Saliwanchik, Lloyd & Eisenschenk

(57) ABSTRACT

A method for processing a sequence of images. In an embodiment, one or more training datasets are analyzed having a sequence of images showing a first condition and a sequence of images showing a second condition. A multivariate regression model is used to determine a relationship between relative positions of one or more features in the sequence of images showing the first condition and relative positions of the one or more features in the sequence of images showing the second condition. In an embodiment, the determined relationship is used to predict positions of the one or more features in an inquire sequence of images showing the second condition given an inquire sequence of images showing the first condition. The predicted positions can then be refined using various methods. In an embodiment, sequences of images are aligned to a common time scale.

39 Claims, 40 Drawing Sheets
(12 of 40 Drawing Sheet(s) Filed in Color)

OTHER PUBLICATIONS

Crosby, J., et al., "3D Speckle Tracking for Assessment of Regional Left Ventricular Function," *Ultrasound in Medicine & Biology*, 2009, pp. 458-471, vol. 35, No. 3.

Freund, Y., et al., "Experiments With a New Boosting Algorithm," *Proceedings of the 13th International Conference on Machine Learning*, 1996.

Kotropoulos, C., et al., "Nonlinear Ultrasonic Image Processing Based on Signal-Adaptive Filters and Self-Organizing Neural Networks," *IEEE Transactions on Image Processing*, 1994, pp. 65-77, vol. 3, No. 1.

Leung, K.Y., et al., "Sparse Registration for Three-Dimensional Stress Echocardiography," *IEEE Transactions on Medical Imaging*, 2008, pp. 1568-1579, vol. 27, No. 11.

Mansor, S., et al., "Wall Motion Classification of Stress Echocardiography Based on Combined Rest-and-Stress Data," *Lecture Notes in Computer Science*, 2008, pp. 139-146, vol. 5242.

Mulet-Parada, M., et al., "2D+T Acoustic Boundary Detection in Echocardiography," *Medical Image Analysis*, 2000, pp. 21-30, vol. 4, No. 1.

Myronenko, A., et al., "Maximum Likelihood Motion Estimation in 3D Echocardiography Through Non-Rigid Registration in Spherical Coordinates," *Lecture Notes in Computer Science*, 2009, pp. 427-436, vol. 5528.

Perperidis, A., et al., "Temporal Compounding and Its Effect on Clinical Measurements of Cardiac Ultrasound Data," Medical Image Understanding and Analysis, Kingston University, 2009.

Perperidis, D, et al., "Spatio-Temporal Free-Form Registration of Cardiac MR Image Sequences," *Medical Image Analysis*, 2005, pp. 441-456, vol. 9, No. 5.

Peters, R.M., "Fuzzy Cluster Analysis of Positive Stress Tests: Comparison With Stress Echocardiography and Nuclear Perfusion Imaging in Patients With Triple Vessel and Left Main Coronary Disease," *Cardiology*, 1999, pp. 66-68, vol. 91.

Revell, J., et al., "Ultrasound Speckle Tracking for Strain Estimation," *Technical Report CSTR-04-005*, Department of Computer Science, University of Bristol, Dec. 2003.

Shekhar, R., et al., "Registration of Realtime 3-D Ultrasound Images of the Heart for Novel 3-D Stress Echocardiography," *IEEE Transactions on Medical Imaging*, 2004, pp. 1141-1149, vol. 23, No. 9.

Strintzis, M.G., et al., "Maximum Likelihood Motion Estimation in Ultrasound Image Sequences," *IEEE Signal Processing Letters*, 1997, pp. 156-157, vol. 4, No. 6.

Walimbe, V., et al., "Quantitative Real-Time Three-Dimensional Stress Echocardiography: A Preliminary Investigation of Feasibility and Effectiveness," *Journal of the American Society of Echocardiography*, 2007, pp. 13-22, vol. 20, No. 1.

Wang, C.C-B., et al., "An Automated Approach for Direct Measurement of Two-Dimensional Strain Distributions Within Articular Cartilage Under Unconfined Compression," *Journal of Biomechanical Engineering*, 2002, pp. 557-567, vol. 124.

Xu, C., et al., "Generalized Gradient Vector Flow External Forces for Active Contours," *Signal Processing*, 1998, pp. 131-139, vol. 71.

Yeung, F., et al., "Multi-Level and Motion Model-Based Ultrasonic Speckle Tracking Algorithms," *Ultrasound in Medicine & Biology*, 1998, pp. 427-441, vol. 24, No. 3.

Zagrodsky, V., et al., "Registration-Assisted Segmentation of Real-Time 3-D Eechocardiographic Data Using Deformable Models," *IEEE Transactions in Medical Imaging*, 2005, pp. 1089-1099, vol. 24, No. 9.

* cited by examiner (a) Frame 1  (b) Frame 2  (c) Frame 3
(d) Frame 4  (e) Frame 5  (f) Frame 6
(g) Frame 7

(a) Rest  (b) Stressed (a) Frame 1  (b) Frame 2
(c) Frame 3  (d) Frame 4

(a) Step 1: Indentify phases (b) Step 2: Align rest and stress axes (a) Rest (b) Stress (a) Rest (b) Stress (a) Motion in the short axis (b) Motion in the long axis (a) Frame 1　　(b) Frame 2

(c) Frame 3　　(d) Frame 4

(e) Frame 5　　(f) Frame 6

(g) Frame 7

(a) Rest Frame (b) Stress Frame (a) Rest frame showing the template block $T_r$ (b) Stress frame showing the search window $W_s$ (a) Frame 1  (b) Frame 2
(c) Frame 3  (d) Frame 4

(a) Rest frame (b) Stress frame

SYSTEM AND METHOD FOR IMAGE SEQUENCE PROCESSING

BACKGROUND OF INVENTION

Various systems and methods for image sequence processing can be used to study sequences of images. In some applications, such systems or methods are used to identify features within an image sequence and/or to segment an image based on such identified features. In some applications, one or more sequences of images are compared, contrasted, or related. In another application, features of one image in a sequence are used to predict features of another image of the same sequence. Other applications of image sequence processing are known in the art. Such processing can be applied to various image subjects.

One established application of image sequence processing is the processing of echocardiography sequences. Real-time 2D echocardiography (ultrasound imaging of the heart) is a well-established clinical tool for cardiovascular disease diagnosis. One area of interest is stress echocardiography where heart disease is assessed by imaging at rest and then again after a stress stimulus is applied to the subject that makes the heart beat faster and harder. Although a stressed heart moves very differently to when it is at rest, the motion of the two sequences is related and it is this relation that a clinician is trying to infer qualitatively. Currently, the analysis is carried out through visual assessment by expert clinicians but this is very subjective and can result in discrepancies when assessed by different clinicians. In order to overcome these issues, the analysis techniques should be carried out in a more automated (i.e. less subjective) and quantitative manner.

One step toward automating such analysis is to delineate important structures within the heart. For the purpose of stress echocardiography, clinicians often observe the endocardial border of the left ventricle of the heart as it can provide important measures such as left ventricle volume and ejection fraction. Despite the development of segmentation and tracking techniques for the heart at rest, there is little literature on the same for the stressed heart, although some contribution to the field has been made by Shekhar and Leung. E.g., U.S. patent application Ser. No. 12/371,111, V. Walimbe, M. Garcia, O. Lalude, J. Thomas, and R. Shekhar, "Quantitative real-time three-dimensional stress echocardiography: A preliminary investigation of feasibility and effectiveness," *J. Am. Soc. Echocardiography,* 20(1), pp. 13-22, 2007; V. Zagrodsky, V. Walimbe, C. R. Castro-Pareja, J. X. Qin, J.-M. Song, and R. Shekhar, "Registration-assisted segmentation of real-time 3-d echocardiographic data using deformable models," *IEEE Trans. Med. Imag.,* 24(9), pp. 1089-1099, 2005; K. Y. Leung, M. van Stralen, A. Nemes, M. M. Voormolen, G. van Burken, M. L. Geleijnse, F. J. Ten Cate, J. H. Reiber, N. de Jong, A. F. van der Steen, and J. G. Bosch, "Sparse registration for three-dimensional stress echocardiography," *IEEE Trans. Med. Imag.,* 27(11), pp. 1568-1579, 2008. This limited progress in automating the analysis of stress echocardiography is because the motion of the heart under stress is much more difficult to model because of increased inter-subject variability and more complex dynamics in stress. Tracking algorithms that have been successfully applied to rest datasets cannot necessarily be applied directly to stress datasets as the image quality is poorer and the temporal resolution for the cardiac cycle is lower (around half that at rest). Optical flow based algorithms, for example, assume that the motion between frames is small and this is clearly violated in stress due to lower temporal resolutions. Another factor is that the shape variation throughout the frames from the end-diastolic (ED) to end-systolic (ES) is greater for stress than for rest data. An example of this variation can be seen in FIGS. 9 and 10, which show rest and stress frames in an echocardiogram from ED to ES, respectively.

BRIEF SUMMARY

Embodiments of the subject invention relate to systems, methods, and apparatus for processing a plurality of images. In an embodiment, a plurality of images depicts a subject at a corresponding plurality of timepoints within a time period. In an embodiment, the plurality of images, called a sequence of images, are sequenced according to the order of their corresponding timepoints within the time period. In an embodiment, one or more training datasets are analyzed having a plurality of images showing a first condition and a plurality of images showing a second condition. In an embodiment, the first and second conditions are dynamic states and the images show movement, velocity, or other changes in the subject over time. In an embodiment, a multivariate regression model is used to determine a relationship between relative positions of one or more features in the plurality of images showing the first condition and relative positions of the one or more features in the plurality of images showing the second condition. In an embodiment, the determined relationship is used to predict positions of the one or more features in an inquire dataset having an inquire plurality of images showing the first condition and an inquire plurality of images showing the second condition. Given positions of the one or more features in the inquire plurality of images showing the first condition and the determined relationship, positions of the one or more features in the inquire plurality of images showing the second condition are predicted. The predicted positions can then be refined using various methods. In an embodiment, one or more pluralities of images are aligned to a common time scale. In a further embodiment, the aligned pluralities are then compared or used to predict positions of features in other pluralities of images.

Echocardiography is described below in detail as an illustrative example of an application of the present invention. As described below, the invention can be applied to compare a plurality of images of a heart at rest with a plurality of images of the heart under stress. Various useful information can be gleaned from the comparison. The systems and methods of the present invention can also be applied to other image sequence processing subjects.

BRIEF DESCRIPTION OF DRAWINGS

The patent or application file contains at least one drawing executed in color. Copies of this patent or patent application publication, with color drawing(s), will be provided by the Office upon request and payment of the necessary fee.

DETAILED DISCLOSURE

Figure 1:
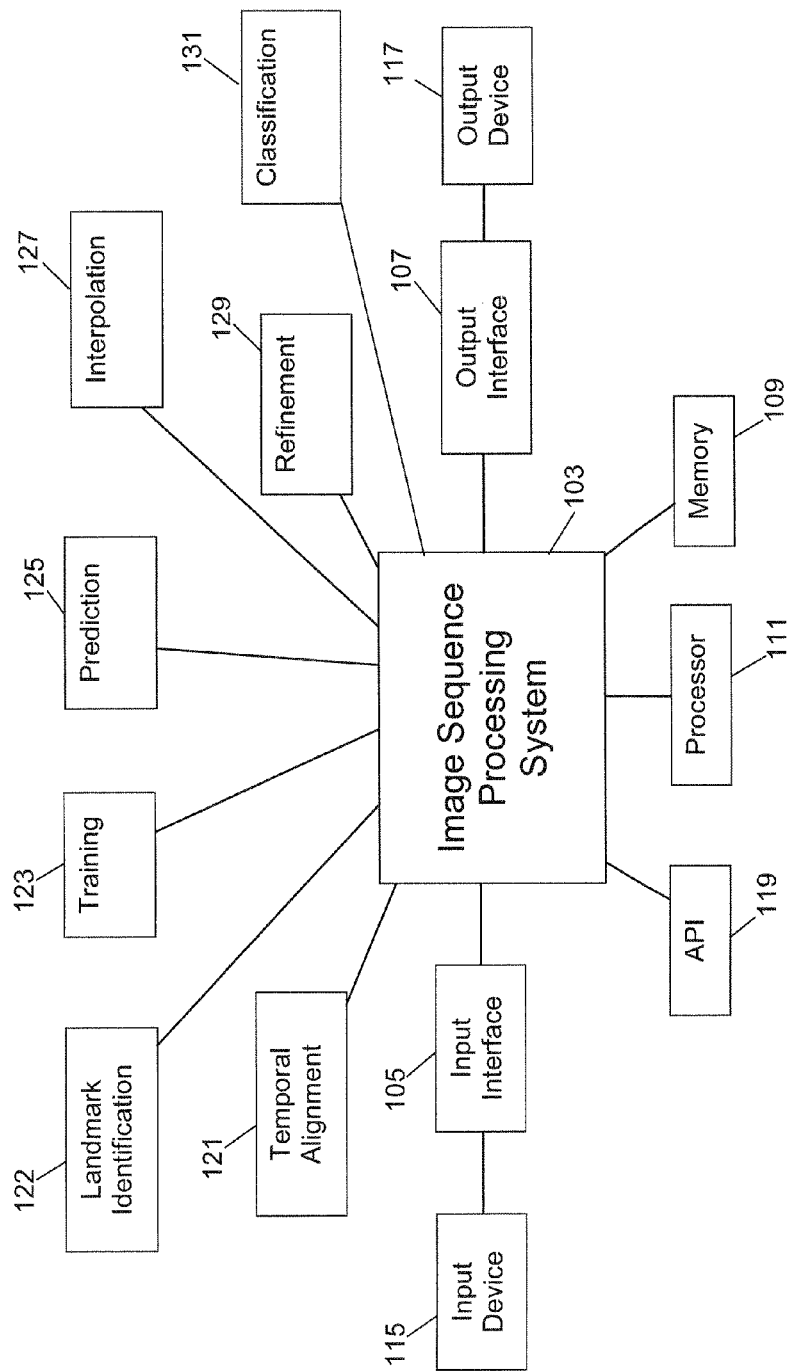
FIG. 1 is a functional block diagram of an image sequence processing system in accordance with an embodiment of the present invention.

Embodiments of the subject invention relate to systems, methods, and apparatus for processing a plurality of images. In an embodiment, a plurality of images depicts a subject at a corresponding plurality of timepoints within a time period. In an embodiment, the plurality of images, called a sequence of images, are sequenced according to the order of their corresponding timepoints within the time period. In an embodiment, one or more training datasets are analyzed having a first plurality of images showing a first condition and a second plurality of images showing a second condition. In an embodiment, the first plurality of images comprises images of a subject at a corresponding first plurality of timepoints within a first period of time and the second plurality of images of the subject comprises images of the subject at a corresponding second plurality of timepoints within a second period of time. In an embodiment, during the first period of time the subject is in the first condition and during the second period of time the subject is in the second condition. In an embodiment, the first and second conditions are dynamic states and the images show movement, velocity, or other changes in the subject over time. In an embodiment, a relationship is determined between relative positions of one or more features in the images showing the first condition and relative positions of the one or more features in the images showing the second condition. In an embodiment, a multivariate regression model is used to determine such a relationship. In an embodiment, the determined relationship is used to predict positions of the one or more features in an inquire dataset having a first plurality of images showing the first condition and a second plurality of images showing the second condition. Given positions of the one or more features in the first plurality of images and the determined relationship, positions of the one or more features in the second plurality of images are predicted. The predicted positions can then be refined using various methods. In an embodiment, a block-matching scheme is used to refine the predictions. In an embodiment, one or more pluralities of images are aligned to a common time scale. In a further embodiment, the aligned pluralities are then compared or used to predict positions of features in other images.

Embodiments of the subject invention can be applied to various image subjects. In an embodiment, the invention is applied to images of any dynamic subject, such as weather, earthquakes, and other natural forces; machines and other manufactured subjects; organisms or populations of organisms. In an embodiment, the invention is applied to images of exterior features, such as external organs, surfaces, or facial expressions. In an embodiment, the invention is applied to images of interior features, such as internal organs of organisms. In an embodiment, the invention is applied to images of a heart, lung, liver, or other organs. In a particular embodiment, the invention is applied to images of human lungs. In an embodiment, the subject is a liver or other organ wherein the organ's motion is affected by the respiration cycle. Specific embodiments are directed to images of structures that have movement patterns that follow a cycle, such as a beating heart, breathing lungs, or walking animal and/or human.

Embodiments of the subject invention can be used to relate and/or predict behavior of the various subjects under various conditions. In an embodiment, the change of a facial expression from smiling to frowning is related or predicted under different conditions. In an embodiment, walking motion, running motion, swimming motion, a golf swing, or other motion is related or predicted under different conditions. In an embodiment, motion at different rates is related. In an embodiment, different types of motion are related. For example, walking can be related to running, or trotting can be related to galloping, a slice can be related to a draw. In an embodiment, organ motion during rest and stress are related. In an embodiment, images of a subject at different levels or magnitudes of a stimulus are related. For example, in an embodiment, organ motion at different levels of rest and stress are related. In an embodiment, organ motion at different respiration rates are related. In an embodiment, heart motion during rest and stress are related. In an embodiment, reactions to a reagent, drug, or other therapy are studied. For example, the motion of a lung can be related both before or after application of therapy, or the motion of the lung at different levels of therapy can be related. In an embodiment, the invention can be used to analyze a subject's response to other stimulus, such as a learning exercise, emotional stimulation, or other stimulus. In an embodiment, fuctional MRI (fMRI) images are used to analyze brain response to different stimuli or levels of stimuli. The examples provided here are merely illustrative. Other subjects can also be studied.

Various principles can be used with the subject invention to relate different states or conditions. In an embodiment, conditions are related by assuming certain forces applied to a subject are balanced. In an embodiment, an additional force is applied to a subject in a second condition related to the first condition. In determining the relationship between the first condition and second condition, the additional force is accounted for. For example, in an embodiment, the equation $cx^{2nd}+dy^{2nd}=ax^{1st}+by^{1st}+F$ is used to balance the forces, wherein $x^{1st}$ and $y^{1st}$ are components of a position of a feature in an image of the subject in the first condition, $x^{2nd}$ and $y^{2nd}$ are components of a position of the feature in an image of the subject in the second condition, F represents the additional force, and coefficients a, b, c, and d can represent stiffnesses or inertia of the feature in response to the force. The relationship can thus be defined by the values of the coefficients a, b, c, and d. In an embodiment, the positions of a plurality of features or landmarks are studied. For example, in an embodiment, the previous equation is modified as follows, wherein n landmarks are related:

$$\sum_{n=1}^{landmarks} (c_n x_n^{2nd} + d_n y_n^{2nd}) = \sum_{n=1}^{landmarks} (a_n x_n^{1st} + b_n y_n^{1st}) + F \quad (1)$$

In an embodiment, the forces are assumed to be balanced at each of a plurality of timepoints within a period of time. In an embodiment, the period of time comprises one or more occurrences of a physical cycle exhibited by the subject. In an embodiment, the position of each landmark is described using one component, x. In an embodiment, the last equation can be modified as follows to handle three components of each position:

$$\sum_{n=1}^{landmarks} (d_n x_n^{2nd} + e_n y_n^{2nd} + f_n z_n^{2nd}) = \quad (2)$$

$$\sum_{n=1}^{landmarks} (a_n x_n^{1st} + b_n y_n^{1st} + c_n z_n^{1st}) + F$$

In an embodiment, four or more components can be used to describe each landmark. In another particular embodiment, as further discussed below, conservation of work energy is used to relate different states or conditions.

In an embodiment, one-dimensional images are used, such as electrocardiogram (ECG) images. In an embodiment, two-dimensional images are used, such as photographs, sonogram images, X-rays, magnetic resonance images (MRI), or other two-dimensional images. In an embodiment, three-dimensional images are used, such as three-dimensional sonogram images, or X-ray computed tomography images. In other embodiments, higher dimension images can be used.

Embodiments of the subject invention can be applied to compare and predict variation in images based on the presence, absence, or magnitude of various conditions. In an embodiment, movement, velocity, or other changes of a set of indentified features of the images are compared and/or predicted between pluralities of images showing contrasting conditions. In an embodiment, Doppler effects are used to measure the velocity of tissue in an ultrasound image using a technique called Tissue Doppler. In an embodiment, the velocity of myocardial motion is measured using Tissue Doppler. In an embodiment, the images depict the same subject under contrasting conditions. In an embodiment, a control and an experimental condition are compared and/or predicted. In a particular embodiment, the invention is applied to pluralities of images showing organ motion at different respiration rates. In another embodiment, the invention is applied to pluralities of images showing rest or stress conditions. In another embodiment, the invention is applied to pluralities of images showing an organism before or after the application of particular therapy. Various therapies can be studied including radiation, pharmacological, psychological, physical, and other types of therapies. In a particular embodiment, the invention is applied to pluralities of images showing drug or reagent uptake. In an embodiment, the invention is applied to pluralities of images showing responses to learning activities, emotional stimulation, or other stimulus. In other embodiments, the invention is applied to other conditions.

In an embodiment, images of a subject at different levels or magnitudes of a stimulus are related. For example, in an embodiment the subject's response to different levels of a therapy are related. In a particular embodiment, organ motion in a subject at different levels of rest and stress are related. For example, in an embodiment, a rest condition is related to a peak stress condition. In an embodiment, a partial stress condition is related to a peak stress condition. In an embodiment, a partial stress condition is related to another partial stress condition.

Various methods of measuring rest and stress in a subject are known in the art. In an embodiment, a rest condition is defined by an absence of activity in the subject. In an embodiment, the magnitude of stress is determined based on a percentage of maximum heart rate (MHR) exhibited by the subject. Various ways of defining maximum heart rate are known in the art. In an embodiment, MHR is defined as varying with age, for example, 220 beats less the age of the subject, 206.3 beats less the age of the subject multiplied by the coefficient 0.711 (MHR=206.3−(0.711×age)). In other embodiments, MHR varies with sex, level of fitness, or type of activity, for example, some experts have found MHR to be higher when the subject is running on a treadmill than when bicycling. In an embodiment, peak stress is defined as about 85% of MHR. In an embodiment, a first percentage of MHR is determined for the subject under the first condition and a second percentage of MHR is determined for the subject under the second condition. In an embodiment, each percentage of MHR is stored, presented, or output for later use. In a embodiment, the first and second percentage are used to calculate a change in percentage of MHR for the subject between the first and second conditions. In an embodiment, the change in MHR is stored, presented, or output for later use.

Various ways of inducing stress in a subject are known in the art. In an embodiment, stress is induced in a manner that can be controlled. In an embodiment, stress is induced in a manner that can be measured. In an embodiment, a stress stimulus is applied to the subject. In an embodiment, the subject can be imaged during or shortly after the stress stimulus. In an embodiment, the stress stimulus comprises a pharmaceutical drug administered to the subject. For example, in an embodiment, a pharmaceutical drug, such as Dobutamine, Atropine, and/or Dipyridamole is administered to increase a heart rate of the subject. In an embodiment, Dobutamine is used alone. In an embodiment, Atropine is used with Dobutamine. In an embodiment, Dipyridamole is used alone or in combination with Dobutamine. In an embodiment, the stress stimulus comprises physical exercise performed by the subject, such as running on a treadmill, using an elliptical machine, pedaling on a bicycle, or any other exercise where heart rate can be increased in a controlled manner in a testing environment. In an embodiment, the magnitude of the stress stimulus applied is measured and used in the methods of the subject invention as discussed below.

FIG. 1 is a functional block diagram of an image sequence processing system 103 according to an embodiment of the present invention. The system 103 is only an illustrative embodiment of the invention. Other embodiments of such a system may include more, fewer, or different components. Or the components shown may be differently arranged.

In the embodiment shown, the image sequence processing system 103 includes an input interface 105, an output interface 107, memory 109 for program storage and/or data storage, and a processor 111 for processing information. In an embodiment, the input interface 105 includes an input device 115 such as a mouse or other pointing device, a keyboard, or a communication device such as a modem or other network interface. In a particular embodiment, the input device 115 is an imaging device such as a sonogram machine. In another embodiment, the image sequence processing system 103 is incorporated into an imaging device. Other input devices for receiving information are known in the art and can be used with the subject invention. In an embodiment, the input interface 105 serves to translate data received from the input device 115 into a format usable by the image sequence processing system 103. Thus, the input device 115 and the input interface 105 can be replaced without modifying the image sequence processing system 103 as known in the art. In an embodiment, the output interface 107 includes an output device 117 such as a monitor, printer, projector, or other display device, a speaker or other audio device, or a communication device such as a modem. Other output devices for presenting information are known in the art and can be used with the subject invention. In an embodiment, the output interface 107 serves to translate data received from the image sequence processing system 103 into a format usable by the output device 117. Thus, the output device 117 and the output interface 107 can be replaced without modifying the image sequence processing system 103 as known in the art. In an embodiment, the image sequence processing system 103 includes an application interface 119 for sharing information with other applications. For example, the image sequence processing system 103 can include an interface for communicating with an electronic medical records system. In an embodiment, the memory 109 includes computer-readable media embodying a computer-program product as described above. In an embodiment, the memory includes a database or other device for data storage. Other memory devices are known in the art and can be used with the subject invention. In an embodiment, the image sequence processing system 103 includes multiple input interfaces 105, output interfaces 107, memories 109, processors 111, input devices 115, output devices 117, or APIs 119.

In an embodiment, the image sequence processing system 103 includes one or more program modules, such as a temporal alignment module 121, a landmark identification module 122, a training module 123, a prediction module 125, an interpolation module 127, a refinement module 129, and/or a classification module 131, as further described below.

In an embodiment, the temporal alignment module 121 is configured to align one or more pluralities of images to a time scale. In an embodiment, a plurality of images depicts a subject at a corresponding plurality of timepoints within a time period. In an embodiment, the plurality of images, called a sequence of images, are sequenced according to the order of their corresponding timepoints within the time period. In an embodiment, two or more pluralities of images are aligned to a common time scale. In an embodiment, images from two or more pluralities are grouped according to time value. For example, images from two pluralities can be paired when they correspond to, or are proximate to, a common point in time in a physical cycle such as respiration, cardiac movement, or other established physical cycles. Various methods of aligning a plurality of images to a time scale are known in the art and can be used with the present invention. In a particular embodiment, a method is used such as that described in relation to FIG. 2 below.

In an embodiment, the landmark identification module 122 is configured to identify one or more features of interest within an image. In an embodiment, the features include identifiable shapes or patterns within the image. In an embodiment, the features include variations in intensity, brightness, hue, saturation, luminosity, contrast, color, local phase features, and/or other properties, within the image. In an embodiment, the features are described by their position within the image. In an embodiment, the position of a feature is described relative to an origin position within the image. For example, the top left corner of the image can be defined as the origin position. In an embodiment, the position of a particular feature defines the origin position. In an embodiment, the position of a feature is described relative to a displacement of the feature from the feature's identified position within a selected image. In an embodiment, a common set of features is identified in each image of a sequence or plurality of images. In an embodiment, a common set of features is identified in each image of multiple sequences or pluralities of images. In an embodiment, the position of a feature in each image is described relative to the identified position of the feature in one image of the plurality. In an embodiment, features include points or pixels of interest in the image. In an embodiment, features include sets of points or pixels in the image. In an embodiment, a feature is a line, a curve, a border, a surface, a volume, a cross-sectional slice, or other shape. In an embodiment, such shapes can be extrapolated from other identified features. In an embodiment, external software is used to identify one or more features and the results are communicated to the image sequence processing system 103 via the API 119. In an embodiment, features in images are identified or validated by technicians, radiologists, or other persons trained to analyze such images. In an embodiment, one or more features are identified or validated by visual inspection by such persons and communicated to the image sequence processing system 103 via the input interface 105.

Figure 14:
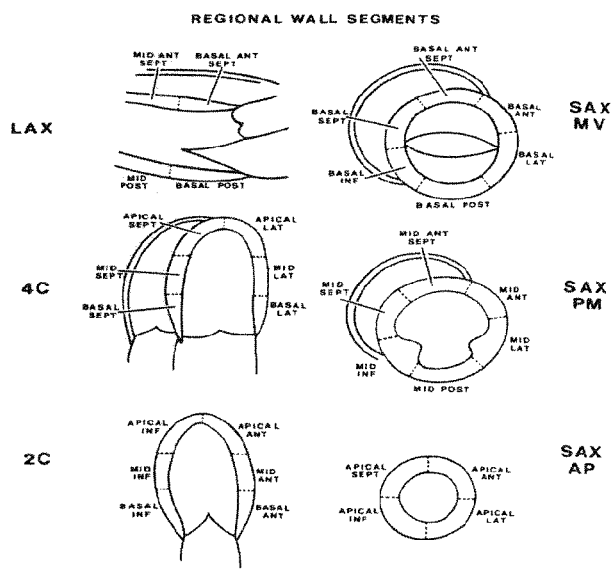
FIG. 14 shows 16-segment labeling and divisions for the myocardium in each of the standard 2D views in accordance with embodiments of the subject invention.

In an embodiment, the identified features can define the general shape of an internal or external organ. In an embodiment, the identified features can define the contour or surface of the organ. In a particular embodiment, the subject is a lung and vessel junctions in the lung visible in computer tomography angiography (CTA) are identified. For example, for the right lung the landmarks could be the apex, the four points on the boundary where the horizontal fissure and the oblique fissure begin and end, and the bottom tip of the inferior lobe. In an embodiment, the boundary of the lung can be extrapolated from such points. In another embodiment, Quamus™ software (developed by Mirada Solutions Ltd., Oxford, UK) is used to identify one or more landmarks within a plurality of sonogram images of a heart. In an embodiment, each image of the plurality of sonogram images depicts a particular view of the heart. Various views of the heart are shown in FIG. 14, which was taken from M. D. Cerqueira, N. J. Weissman, et. al, Standardized Myocardial Segmentation and Nomenclature for Tomographic Imaging of the Heart. Circulation, 105(4): 539-542, 2002.

In an embodiment, the training module 123 is configured to develop a model of a relationship between pluralities of images. In an embodiment, a relationship between a plurality of images of a subject under a first condition and a plurality of images of the subject under a second condition is determined by the training module 123. In an embodiment, such a relationship model is developed according to a method such as the method discussed below in relation to FIG. 3.

In an embodiment, the prediction module 125 is configured to predict the positions of one or more features in a plurality of images of a second condition given a plurality of images of a first condition. In an embodiment, a relationship model is applied to make such a prediction. In an embodiment, the relationship model is developed according to the systems or methods of the present invention, such as training module 123 discussed above and/or the method discussed below in relation to FIG. 3. In an embodiment, such a prediction is made according to a method such as the methods discussed below in relation to FIGS. 4 and 5.

In an embodiment, the interpolation module 127 is configured to interpolate and/or extrapolate one or more features in an image of a plurality of images from other features identified in the plurality of images. In an embodiment, a relative position of a feature in an image of the plurality is interpolated and/or extrapolated based on the relative position of the feature in another image of the plurality. In an embodiment, a line, curve, border, a surface, a volume, a cross-sectional slice, or other shape in an image is extrapolated from one or more other features of images of the plurality. The one or more other features can be from the same image or different images of the plurality. In a particular embodiment, a plurality of landmarks is used to approximate an epicardial border and/or an endocardial border in a plurality of echocardiography images, as further described below. In an embodiment, the epicardial border and/or the endocardial border is a border of the left ventricle (LV) of a heart. Various methods known in the art can be used to interpolate such features, such as a quadratic spline, an nth degree polynomial, a piecewise cubic spline, or a natural cubic spline, among other methods. In an embodiment, the invention is not limited to any one interpolation method. As discussed below, an interpolation module such as the interpolation module 127 can be used in various steps in the methods discussed below in relation to FIGS. 3-5.

In an embodiment, the refinement module 129 is configured to refine one or more features identified or predicted within an image of a plurality of images. As discussed above, various features can be identified, predicted, or interpolated within images. In an embodiment, one or more such features can be refined. In an embodiment, the position of one or more points or pixels that comprise the feature are updated or corrected by the refinement module 129. In an embodiment, the needed refinement is determined by comparing images of a first plurality of images to images of a second plurality of images. In an embodiment, the each of the first plurality of images exhibits a subject in a first condition and each of the second plurality of images exhibits the subject in a second condition. In an embodiment, the needed refinement is determined by comparing images of a first sequence of images to images of a second sequence of images. Various methods known in the art can be used to refine such features. In a particular embodiment, a method is used such as that described in relation to FIG. 6 below. In an embodiment, the invention is not limited to any one refinement method. As discussed below, a refinement module such as the refinement module 129 can be used in various steps in the methods discussed below in relation to FIGS. 3-5.

In an embodiment, the classification module 131 is configured to classify the subject of one or more pluralities of images. In an embodiment, the classification module 131 derives features of interest and/or performs calculations from one or more pluralities of images. In an embodiment, such features and calculations are used to classify the subject. In an embodiment, such calculations or features compare two or more pluralities of images. Possible configuration and use of the classification module 131 is further discussed below in relation to FIG. 4.

The components of an image sequence processing system can be housed on a single computer or distributed across a network as is known in the art. In an embodiment, components of the image processing system are distributed on computer-readable media as part of an image sequence analysis package, such as a stress-echocardiography analysis software package. In an embodiment, a user can access the image sequence processing system via a client device. In an embodiment, some of the functions of the image sequence processing system can be stored and/or executed on such a device. Such devices can take any of a variety of forms. By way of example, a client device may be a desktop or laptop computer, a personal digital assistant (PDA), an MP3 player, a communication device such as a telephone, pager, email reader, or text messaging device, or any combination of these or other devices. In an embodiment, a client device can connect to the image sequence processing system via a network. As discussed below, the client device may communicate with the network using various access technologies, both wireless and wireline. Moreover, the client device may include one or more input and output interfaces that support user access to the image sequence processing system. Such user interfaces may further include various input and output devices which facilitate entry of information by the user or presentation of information to the user. Such input and output devices can include, but are not limited to, a mouse, touch-pad, touch-screen, or other pointing device, a keyboard, a camera, a monitor, a microphone, a speaker, a printer, a scanner, sonogram machine, among other such devices. As further discussed below, the client devices can support various styles and types of client applications.

Figure 2:
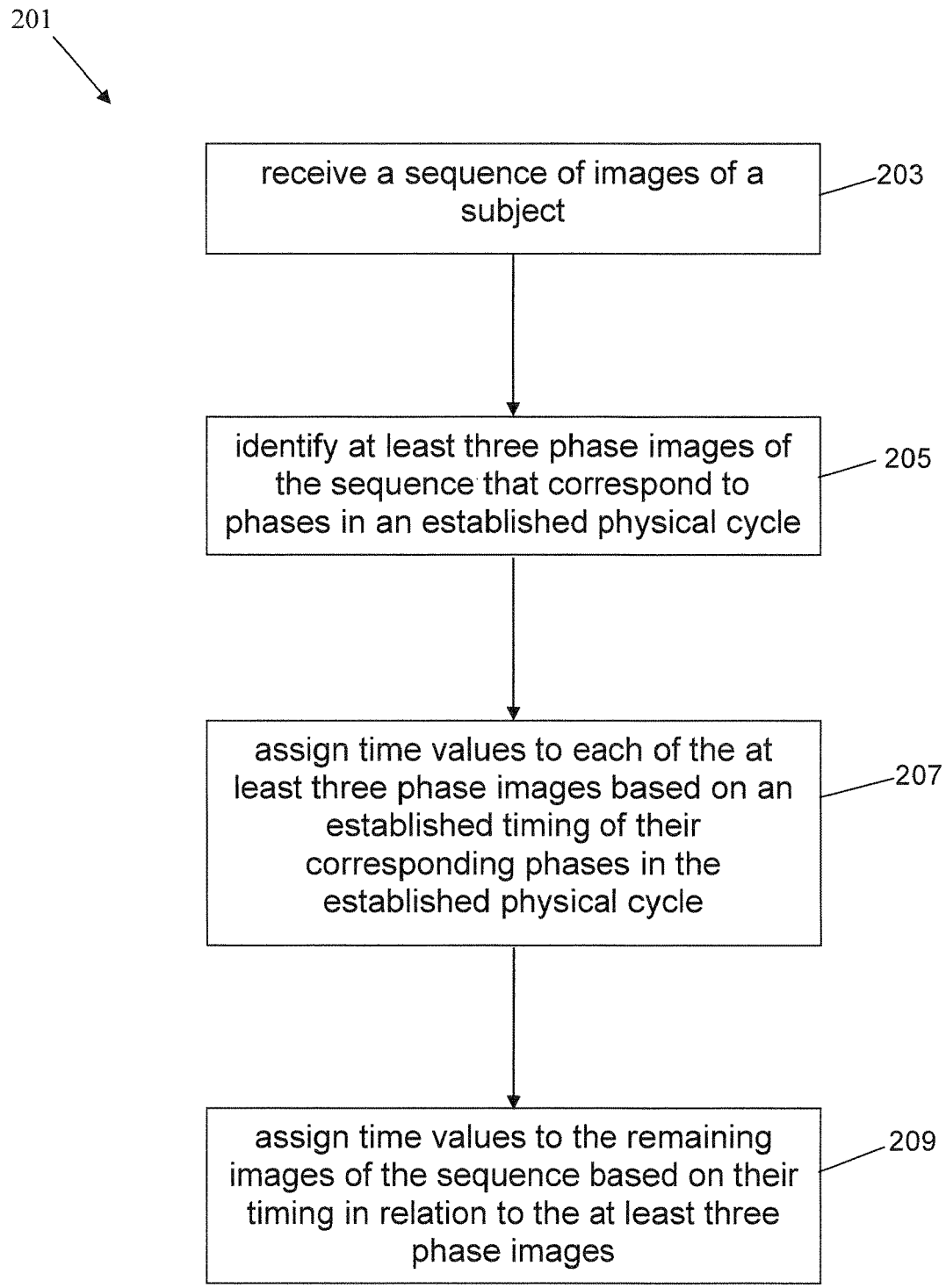
FIG. 2 is a flowchart of a method of temporally aligning a sequence of images in accordance with an embodiment of the present invention.

FIG. 2 is a flowchart of a method 201 of temporally aligning a sequence of images in accordance with an embodiment of the present invention. In an embodiment, the method 201 applies to a plurality of images. In an embodiment, the method, a subset, and/or a variation thereof can be executed via a temporal alignment module such as the temporal alignment module 121.

At a step 203, a plurality of images of a subject is received showing the subject at a corresponding plurality of points in time in an established physical cycle exhibited by the subject. Various physical cycles can be analyzed with the subject invention. For example, in an embodiment, the subject is a lung and the established physical cycle is a respiration cycle. In an embodiment, the subject is a cell and the established physical cycle is a metabolic process in the cell. In an embodiment, the subject is a lung and the established physical cycle is a respiration cycle. In an embodiment, the subject is a liver or other organ wherein the organ's motion is affected by the respiration cycle. In an embodiment, the subject is a heart and the established physical cycle is a cardiac cycle. In an embodiment, each image shows the subject at a different point in time in the established physical cycle. In an embodiment, the plurality of images is a sequence of images ordered from the earliest point in time to the latest. In an embodiment, the plurality of images includes multiple cycles of the physical cycle. In an embodiment, the plurality of images includes partial cycles of the physical cycle. In an embodiment, the plurality of images depicts a cardiac cycle of a heart from an end-diastolic phase (ED) to an end-systolic phase (ES).

In a particular embodiment, the plurality of images is a plurality of ultrasound images. In an embodiment, the plurality of images is a plurality of echocardiography images. In an embodiment, each image of the plurality of echocardiography images depicts a particular view of the heart. Various views of the heart useable with the subject invention are shown in FIG. 14. In an embodiment, the plurality of images is received via an input interface such as the input interface 105 and/or an input device such as the input device 115. In an embodiment, the plurality of images is received via an API such as the API 119. In an embodiment, the plurality of images is received from a sonogram machine. In an embodiment, the plurality of images is received in a standard format such as the DICOM format set by the DICOM Standards Committee.

At a step 205, at least three phase images are identified from the plurality of images corresponding to phases in the established physical cycle. For example, in an embodiment, phase images correspond to the beginning of expiration, the ending of expiration, the beginning of inspiration, and/or the ending of inspiration in a respiration cycle. In an embodiment, the phases are identified by analyzing movement, velocity, or other changes in the subject exhibited in the plurality of images, such as the expansion and contraction of a lung. In an embodiment, other inputs or measurements are used to identify such phase images. For example, an airflow sensor can be used to identify the beginning and ending of expiration in a respiration cycle. In another embodiment, an ECG signal is used to identify phases in the cardiac cycle. In an embodiment, the images are echocardiography images with corresponding ECG images superimposed thereon. Thus, the ECG signal can be used to identify phase images in the echocardiogram. In another embodiment, a capture time of an image is recorded and used to identify one or more phase images. In an embodiment, the plurality of images does not contain an image that precisely corresponds to a phase of the established cycle. In an embodiment, the closest image is identified as the corresponding phase image. In an embodiment, an image identified if it is determined to be within a certain range of time of the phase. The certain range of time could be a constant, such as 0.1 seconds. Or it could be vary based on the temporal resolution of the studied image sequence, or other factors. In an embodiment, an image is not identified for every established phase in the physical cycle.

At a step 207, the at least three phase images are assigned time values based on their timing within the established physical cycle. In an embodiment, at least some of the assigned values are to scale in that they are proportional to values assigned to images corresponding to other phases or the length of the entire physical cycle. For example, in a respiration cycle, inspiration normally takes about twice as long as expiration. Thus, the values assigned to the beginning of inspiration and the ending of inspiration can be about twice as close together as the values assigned to the beginning of expiration and the ending of expiration. In an embodiment, the assigned values are not to scale. In an embodiment, the values are assigned based on the order of the phases in the physical cycle. For example, the phase image corresponding to the earliest phase can be assigned time value 1, the phase image corresponding to the next phase can be assigned time value 2, etc.

At a step 209, time values are assigned to one or more images of the plurality of images which are not identified as corresponding to a phase in the established physical cycle (non-phase images). In an embodiment, time values are assigned to all of the non-phase images of the plurality of images. In an embodiment, the time value assigned to a non-phase image is based on the non-phase image's timing with respect to two or more of the at least three phase images. For example, in an embodiment, when a phase image was captured between two phase images, the phase image is assigned a time value between the time values assigned to the two phase images. In an embodiment, the capture time of one or more images is used to calculate the time value to be assigned. For example, in an embodiment, the capture time of the non-phase image is compared to the capture time of at least one phase image and a proportional time value is calculated and assigned. In an embodiment, it is assumed that images are captured at regular intervals and therefore time values assigned to images captured between two phase images are evenly distributed between the time values of the phase images. For example, in an embodiment, the images are ultrasound images captured at regular intervals. In an embodiment, the interval is defined by the temporal resolution of the sonogram machine used to capture the images. In an embodiment, non-phase images are assigned time values based on at least two piecewise interpolation functions, wherein for each consecutive pair of phase images of the at least three phase images one of the at least two piecewise interpolation functions is applied to the images sequenced between the consecutive pair of phase images to determine the assigned time values of the images based on the time values assigned to the consecutive pair of phase images. In an embodiment, one or more of the at least two piecewise interpolation functions is a linear function.

In an embodiment, the resulting time values are stored, presented, or output for later use. In an embodiment, the resulting time values are stored in a memory such as the memory 109. In an embodiment, the time values are presented, transmitted, or otherwise output via an output interface such as the output interface 107 and/or an output device such as the output device 117. In an embodiment, the time values are transmitted via an API such as the API 119. In an embodiment, the time values are stored, presented, or output as a delimited sequence of time values, wherein each time value provides a relative time value for each image in a sequence. In an embodiment, the delimited sequence of time values can be written to a flat file and later read by a suitably programmed file reader.

Figure 3:
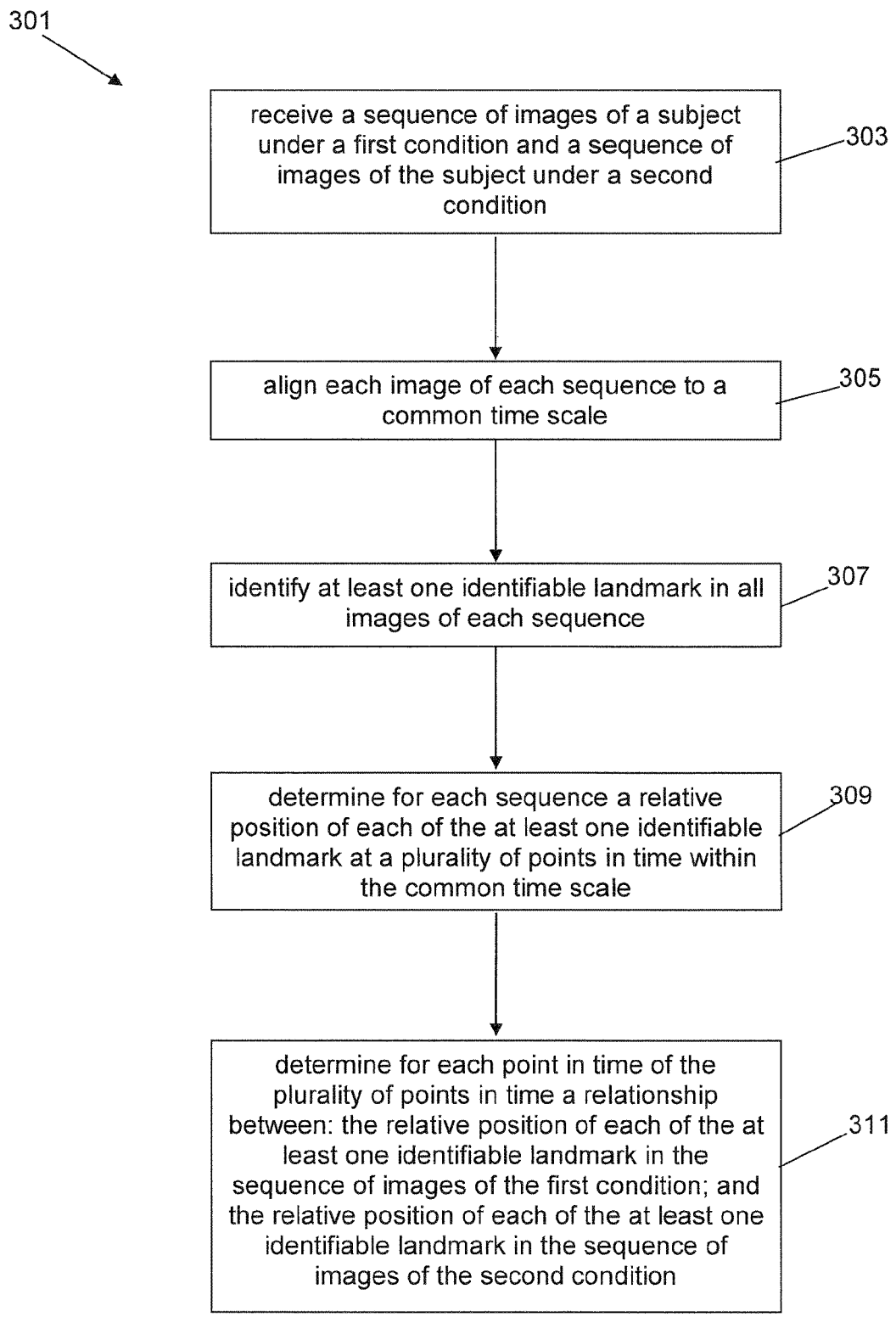
FIG. 3 is a flowchart of a method of determining a relationship between sequences of images showing a subject in a first condition and sequences of images showing the subject in a second condition in accordance with an embodiment of the present invention.

FIG. 3 is a flowchart of a method 301 of determining a relationship between sequences of images showing a subject in a first condition and sequences of images showing the subject in a second condition in accordance with an embodiment of the present invention. In an embodiment, the method 301 applies to pluralities of images. In an embodiment, the method, a subset, and/or a variation thereof can be executed via a training module such as the training module 123.

At a step 303, a first plurality of images of a subject under a first condition and a second plurality of images of the subject under a second condition is received. As discussed above, embodiments of the subject invention can be used to analyze images of various subjects under various conditions. For example, in an embodiment, the subject is a lung and the first plurality captures images of the lung as a control and the second plurality captures images of the lung after an asthma or other medicament has been administered. In an embodiment, each of the first and the second plurality comprise images of the subject at a plurality of timepoints. In an embodiment, each of the first and the second plurality comprise images of the subject at a plurality of points in time within a physical cycle exhibited by the subject.

In an embodiment, the first plurality and the second plurality comprise a training dataset related to the subject. In an embodiment, additional training datasets are received comprising pluralities of images of additional subjects under the first condition and the second condition. In an embodiment, each plurality is a sequence is ordered from the earliest point in time to the latest. In an embodiment, a plurality includes multiple cycles of the physical cycle. In an embodiment, a plurality includes partial cycles of the physical cycle. As further discussed below in relation to FIG. 4, various types of training data can be used with the method 301 for various purposes. In an embodiment, the training data used exhibits a specific class of behavior for the subject in order to predict the class of behavior in an inquire subject. For example, in an embodiment, the training data used exhibits normal behavior for the subject in order to predict a normal behavior in the inquire subject. In an embodiment, the training data used exhibits a specific class of abnormal behavior for the subject in order to predict the class of abnormal behavior in the inquire subject.

In a particular embodiment, each plurality of images is a plurality of ultrasound images. In an embodiment, each plurality of images is a plurality of echocardiography images. In an embodiment, a plurality is received via an input interface such as the input interface 105 and/or an input device such as the input device 115. In an embodiment, a plurality is received via an API such as the API 119. In an embodiment, a plurality is received from a sonogram machine. In an embodiment, a plurality is received in a standard format such as the DICOM format set by the DICOM Standards Committee.

At a step 305, each image of each plurality is aligned to a common time scale. Various methods can be used to align the images to the common time scale. For example, in an embodiment, the capture times of the images are used. In an embodiment, a temporal baseline image is identified in each plurality, wherein each temporal baseline image corresponds to a common point in time. Each temporal baseline image can thus be assigned the same time value. Then, the other images of each plurality can be assigned values based on the differences between the capture time of the other images and the capture time of the temporal baseline image. In an embodiment, the common time scale is based on an established physical cycle exhibited by the subject as discussed above. In an embodiment, the temporal baseline image can be identified in the same manner as a phase image as discussed above. For example, in an embodiment, an image of a lung when it is maximally inflated or maximally deflated (points in the respiration cycle that are easily identified by clinicians) can be used as the temporal baseline image. In an embodiment, a method such as the method 201 is used to align each plurality to a common time scale. In an embodiment, the temporal alignment module such as the temporal alignment module 121 is used to align each plurality to a common time scale.

At a step 307, a set of common features or landmarks are identified in each image of each plurality. In an embodiment, such features include points or pixels of interest in each image. In an embodiment, such features include sets of points or pixels in each image. In an embodiment, such features include lines, curves, borders, surfaces, volumes, or other shapes. In an embodiment, a single feature is identified in each image. In an embodiment, a plurality of features are identified in each image. In an embodiment, the plurality of features relate to and can define larger features such as lines, shapes, curves, borders, surfaces, or volumes. In an embodiment, the plurality of features can define a border of an object such as an internal or external organ.

Various methods known in the art can be used to identify such features in an image. In an embodiment, a landmark identification module such as the landmark identification module 122 is used. In an embodiment, after a feature is identified in a first image of a plurality, optical flow based registration/motion extraction is used to identify the feature in other images of the plurality. In an embodiment, features are identified, validated, or corrected by visual inspection by one or more persons.

At a step 309, for each plurality a position is determined for each member of the set of common features at a plurality of points in time within the common time scale. In an embodiment, if an image of a plurality is aligned to one of the plurality of points in time, then for that plurality the positions of the features at that time point are determined based on the positions of the features within that image. In an embodiment, if no image of a plurality is aligned to one of the plurality of points in time, the positions of the features for that plurality at that time point are interpolated based on the known positions of the features in that plurality at other time points. Various interpolation methods known in the art can be used to interpolate a position of a feature from the known positions of the feature. In an embodiment, an interpolation module such as the interpolation module 127 is used.

In an embodiment, the position determined for each feature or landmark is a relative position. In an embodiment, the relative position of a feature or landmark is defined by the displacement of the feature from a defined origin position. In an embodiment, the origin position is defined for all images as an established location within each image, such as the top left corner of the image. In an embodiment, the origin position is defined for each image as the position of another feature or landmark in the image. In an embodiment, the origin position is defined for each plurality for each landmark as a position of the landmark in a positional baseline image of the plurality. In an embodiment, the positional baseline image is a phase image. In an embodiment, the positional baseline image corresponds to the earliest phase of an established physical cycle.

At a step 311, for each of the plurality of points in time a relationship is determined between:

the positions of the members of the set of common features under the first condition; and the positions of the members of the set of common features under the second condition. In an embodiment, a multivariate regression model is used to determine such a relationship. In an embodiment, a linear multivariate regression model is used. In an embodiment, a CCA model, PCA model, ICA model, and/or PLSR model is used. In an embodiment, a plurality of piecewise linear models can be used to introduce some level of non-linearity to the model. For example, in an embodiment, a plurality of piecewise CCA models are used to determine the relationship. In an embodiment, the relationship is modeled using quadratic, polynomial, or other non-linear functions. Such functions can also be applied piecewise. Various other methods are known in the art and can be used in embodiments of the subject invention. In an embodiment, the relationship is determined based on a difference in work energy required under the first condition and the second condition, assuming energy is conserved.

In an embodiment, the determined relationship is used to predict the behavior of a subject under the second condition given the behavior of the subject under the first condition. In an embodiment, a method, such as the method 401 described next or the method 501 described thereafter, is used to predict such behavior. In an embodiment, the relationship is stored, presented, or output for later use. In an embodiment, the relationship is stored in a memory such as the memory 109. In an embodiment, the relationship is presented, transmitted, or otherwise output via an output interface such as the output interface 107 and/or an output device such as the output device 117. In an embodiment, the relationship is transmitted via an API such as the API 119. In an embodiment, the relationship is stored, presented, or transmitted as a matrix.

Figure 4:
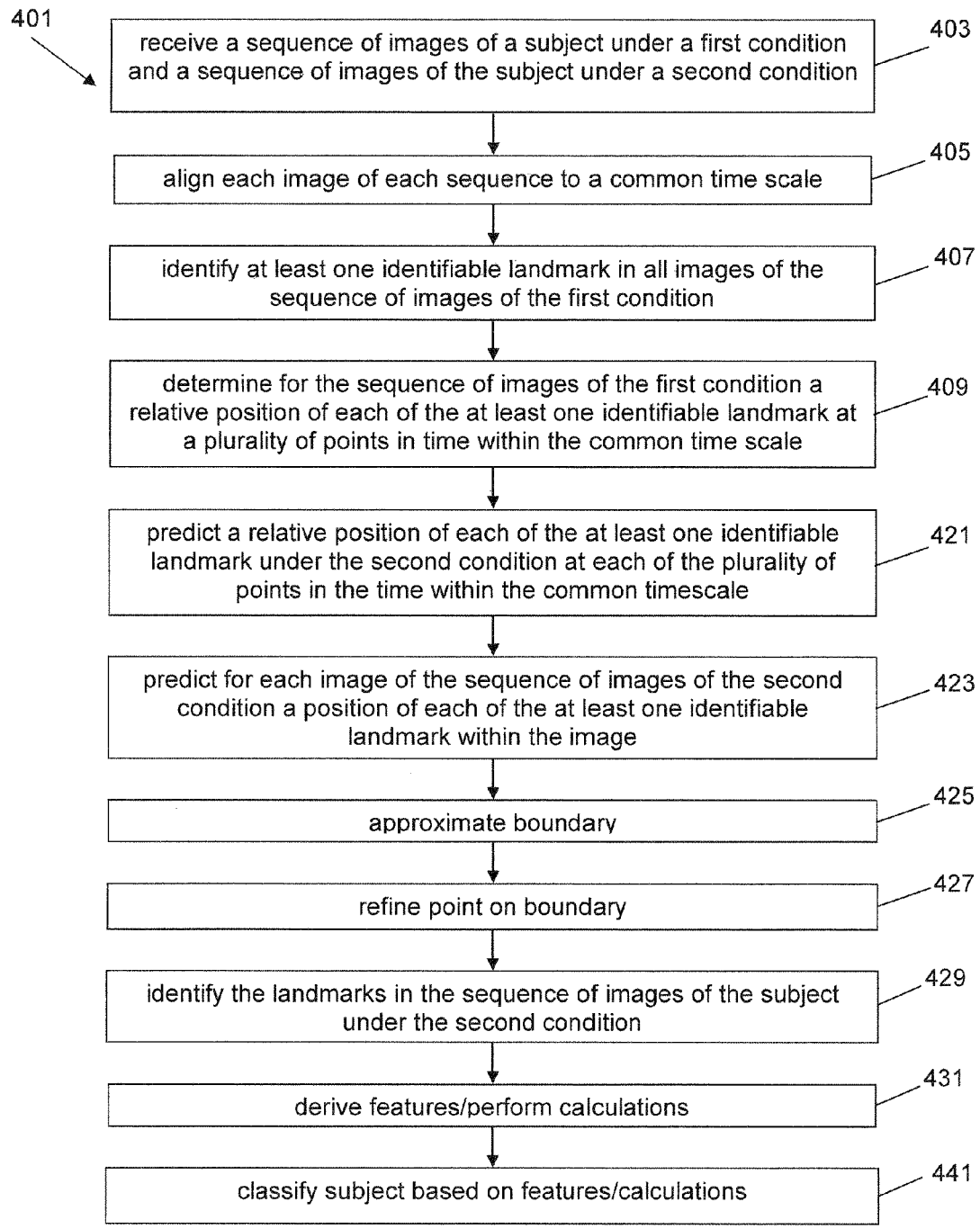
FIG. 4 is a flowchart of a method of predicting landmark positions in a sequence of images showing a subject in a second condition given a sequence of images showing the subject in a first condition in accordance with an embodiment of the present invention.

FIG. 4 is a flowchart of a method 401 of predicting landmark positions in a sequence of images showing a subject in a second condition given a sequence of images showing the subject in a first condition in accordance with an embodiment of the present invention. In an embodiment, the method 401 applies to pluralities of images. In an embodiment, the method, a subset, and/or a variation thereof can be executed via a prediction module such as the prediction module 125. In an embodiment, the method, a subset, and/or a variation thereof can be executed via a classification module such as the classification module 131.

At a step 403, a first plurality of images of a subject under a first condition and a second plurality of images of the subject under a second condition is received. As discussed above, embodiments of the subject invention can be used to analyze images of various subjects under various conditions. For example, in an embodiment, the subject is a lung and the first plurality captures images of the lung as a control and the second plurality captures images of the lung after an asthma or other medicament has been administered. In an embodiment, each of the first and the second plurality comprise images of the subject at a plurality of timepoints. In an embodiment, each of the first and the second plurality comprise images of the subject at a plurality of points in time within a physical cycle exhibited by the subject. In an embodiment, each plurality is ordered from the earliest point in time to the latest. In an embodiment, a plurality includes multiple cycles of the physical cycle. In an embodiment, a plurality includes partial cycles of the physical cycle.

In a particular embodiment, each plurality of images is a plurality of ultrasound images. In an embodiment, each plurality of images is a plurality of echocardiography images. In an embodiment, a plurality is received via an input interface such as the input interface 105 and/or an input device such as the input device 115. In an embodiment, a plurality is received via an API such as the API 119. In an embodiment, a plurality is received from a sonogram machine. In an embodiment, a plurality is received in a standard format such as the DICOM format set by the DICOM Standards Committee.

At a step 405, each image of each plurality is aligned to a common time scale. As previously discussed in relation to the method 201 and the step 305, various methods can be used to align the images to the common time scale.

At a step 407, a set of common features or landmarks are identified in each image of each plurality. As previously discussed in relation to the step 307, various methods can be used to identify such features or landmarks. In an embodiment, the same set of common features is also used to analyze a training data set such as by the method 301 described above.

At a step 409, for the first plurality a position is determined for each member of the set of common features at a plurality of points in time within the common time scale. In an embodiment, if an image of the plurality is aligned to one of the plurality of points in time, then the positions of the features at that time point are determined based on the positions of the features within that image. In an embodiment, if no image of the plurality is aligned to one of the plurality of points in time, the positions of the features at that time point are interpolated based on the known positions of the features in the plurality at other time points. Various interpolation methods known in the art can be used to interpolate a position of a feature from the known positions of the feature. In an embodiment, an interpolation module such as the interpolation module 127 is used. In an embodiment, the position determined for each feature or landmark is a relative position as discussed above in relation to the step 309.

At a step 421, for the second plurality a position is predicted for each member of the set of common features at the plurality of points in time. In an embodiment, such prediction is made based on outcome of the step 409. In an embodiment, such prediction is also based on a determined relationship between:

the positions of the members of the set of common features under the first condition; and the positions of the members of the set of common features under the second condition.

Various methods of determining such a relationship can be used with embodiments of the subject invention. In an embodiment, such a relationship is determined by analyzing empirical evidence. In an embodiment, such a relationship is determined by analyzing one or more training datasets such as by the method 301 discussed above. Various training data can be used to determine the relationship. In an embodiment, the training data used exhibits a specific class of behavior for the subject in order to predict the class of behavior in response to the second condition given the positions in the first condition. In an embodiment, the training data used exhibits normal behavior for the subject in order to predict a normal response to the second condition given the positions in the first condition. In an embodiment, the training data used exhibits a specific class of abnormal behavior for the subject in order to predict the class of abnormal behavior in response to the second condition given the positions in the first condition. In an embodiment, the relationship is determined by assuming certain forces applied to the subject are balanced. In an embodiment, an additional force is applied to the subject in the second condition. In determining the relationship between the first condition and second condition, the additional force is accounted for. In an embodiment, the relationship is determined based on a difference in work energy required under the first condition and the second condition, assuming energy is conserved. In an embodiment, a difference in the work energy expended by the subject under the first condition and under second condition is used to make such a prediction.

In an embodiment, the predicated positions are stored, presented, or output for later use. In an embodiment, the predicated positions are stored in a memory such as the memory 109. In an embodiment, the predicated positions are presented, transmitted, or otherwise output via an output interface such as the output interface 107 and/or an output device such as the output device 117. In an embodiment, the predicated positions are transmitted via an API such as the API 119. In an embodiment, the predicated positions are used to derive one or more features and/or perform one or more calculations as described below in relation to the step 531. In an embodiment, the predicted positions can be stored, presented, or output as a delimited sequence of coordinates. In an embodiment, such a delimited sequence can be written to a flat file and later read by a suitably programmed file reader.

In an embodiment, the method 401 proceeds to a step 423 wherein for each image in the second plurality a position is predicted for each member of the set of common features. In an embodiment, if an image of the plurality is aligned to one of the plurality of points in time, then the positions of the features in that image are determined based on the positions of the features at that time point. In an embodiment, if an image of the plurality is not aligned to one of the plurality of points in time, the positions of the features in that image are interpolated based on the predicted positions of the features at other time points. Various interpolation methods known in the art can be used to interpolate a position of a feature from the predicted positions of the feature. In an embodiment, an interpolation module such as the interpolation module 127 is used. In an embodiment, the position predicted for each feature or landmark is a relative position as discussed above in relation to the step 309. In an embodiment, the predicated positions of the step 423 are stored, presented, or output for later use as discussed above in relation to the step 421. In an embodiment, the predicated positions are used to derive one or more features and/or perform one or more calculations as described below in relation to the step 531.

In an embodiment, the method 401 proceeds to a step 425 wherein a larger feature in the images of the second plurality is approximated based on the predicated positions of the step 423. In an embodiment, the larger feature is a shape comprising the predicated positions. In an embodiment, the shape is a line, a curve, a surface, a volume, a cross-sectional slice, or other shapes. In an embodiment, the shape is a border. In an embodiment, the border approximates the boundary to an internal or external organ. In an embodiment, the organ is a lung. In an embodiment, the organ is a heart. In an embodiment, the border approximates an endocardial boundary of the heart. Various methods known in the art can be used to interpolate such features, such as a quadratic spline, an nth degree polynomial, a piecewise cubic spline, or a natural cubic spline, among other methods. In an embodiment, the invention is not limited to any one interpolation method. In an embodiment, an interpolation module such as the interpolation module 127 is used.

In an embodiment, the approximated boundary is stored, presented, or output for later use. In an embodiment, the predicated positions are stored in a memory such as the memory 109. In an embodiment, the approximated boundary is presented, transmitted, or otherwise output via an output interface such as the output interface 107 and/or an output device such as the output device 117. In an embodiment, the approximated boundary is transmitted via an API such as the API 119. In an embodiment, the approximated boundary is used to derive one or more features and/or perform one or more calculations as described below in relation to the step 531.

In an embodiment, the method 401 proceeds to a step 427 wherein a position of a feature of an image of the second plurality is refined. In an embodiment, the refined feature is a point. In an embodiment, the feature is part of a larger feature such as a shape. In an embodiment, the feature is a point on a boundary. In an embodiment, positions of two or more features are refined. In an embodiment, positions of features of two or more images of the second plurality are refined.

Various methods known in the art can be used to refine the position of a feature. In an embodiment, the position of the feature is refined based on information from the first plurality. In an embodiment, the feature is refined based on information from a corresponding image of the first plurality, wherein the corresponding image is aligned to the same point in time in a common time scale as the image of the second plurality. In an embodiment, a method such as the method 601, described below, is used. In an embodiment, the refined boundary of the step 427 is stored, presented, or output for later use as discussed above in relation to the step 425.

In an embodiment, the method 401 proceeds to a step 431 wherein one or more features are derived and/or one or more calculations are performed. In an embodiment, one or more calculations are preformed based on the predicted positions of the set of common features. In an embodiment, the predicted positions are used to approximate at least one feature as described above in relation to the step 425. In an embodiment, a feature is approximated for each of the plurality of points in time. In an embodiment, the calculations are preformed based on the approximated feature(s). Various calculations of interest will be known to one skilled in the art and familiar with the analysis of the types of images included in the plurality.

For example, in an embodiment, a heart is the subject of the images. In an embodiment, the approximated feature(s) include an endocardial border of the heart. In an embodiment, the border of the heart of a patient after a stress stimulus is approximated. In an embodiment, the border approximates the endocardial border of the left ventricle (LV) of the heart. Various calculations can be made from the endocardial border of the left ventricle. In an embodiment, a left ventricular area and/or volume is calculated. In an embodiment, such an area and/or volume is calculated at various time points within the cardiac cycle of the heart. In an embodiment, the images are three-dimensional images that allow a three-dimensional endocardial border to be approximated. A volume can then be calculated from the three-dimensional border. In an embodiment, the images are two-dimensional images that allow a two-dimensional border to be approximated. In an embodiment, a volume is estimated from the two dimensional border. In an embodiment, such a volume is estimated, such as by using perpendicular views of the LV and/or by assuming an ellipsoidal shape. In an embodiment, the area and/or volume is calculated at the end diastolic (ED) and/or the end systolic (ES) phase of the cycle. In an embodiment, the end diastolic volume (EDV) and the end systolic volume (EDV) are used to calculate the stroke volume (SV) and/or the ejection fraction (EF) as known in the art. Various other calculations can be made, such as radial shortening, circumferential length and/or surface area, curvatures, velocities, and/or endocardial motion fields. In an embodiment, features on the epicardial (outer LV) boundary are also tracked and myocardial strain can be calculated from the positions thereof. In an embodiment, myocardial thickening is calculated from tracked features of the heart.

In an embodiment, calculations can be made based on information derived about the behavior of the subject under the first condition and the second condition. In an embodiment, observed data about the behavior of the subject under the first condition is combined with predicted data about the behavior of the subject under the second condition in order to yield such calculations. For example, where the subject is a heart, an embodiment can calculate the portion of the LV in stress that lies outside the boundary of the LV in rest in the ED to ES stage of the cardiac cycle. This measure is often considered by clinicians evaluating the health of the heart. The example calculations presented here are merely illustrative. Various other calculations are also possible.

In an embodiment, one or more results of the step 431 are stored, presented, or output for later use. In an embodiment, the results are stored in a memory such as the memory 109. In an embodiment, such results are presented, transmitted, or otherwise output via an output interface such as the output interface 107 and/or an output device such as the output device 117. In an embodiment, such results are transmitted via an API such as the API 119. In an embodiment, the results can be stored, presented, or output as a delimited sequence of coordinates. In an embodiment, such a delimited sequence can be written to a flat file and later read by a suitably programmed file reader.

In an embodiment, the method 401 proceeds to a step 441 wherein the subject of the plurality is classified based one or more results of the step 431. In an embodiment, the subject is classified as normal or abnormal. In an embodiment, the subject is classified into established categories. Various classification techniques can be used. In an embodiment, a supervised classification technique is used wherein a machine learning technique learns a function for classification from training data, which includes measurements or calculations upon which to base the classification (inputs) paired with their corresponding classes (outputs). In an embodiment, the training data includes one more calculations described in the step 431 above. Various learning techniques can be used, such as a naive Bayes' classifier and a random forests classifier.

The naive Bayes' classifier is based on Bayes' theorem and makes strong independence assumptions about the inputs. A naïve Bayes classifier also assumes that all the inputs are equally powerful in their ability to distinguish between classes. In an embodiment, random forests can produce a very accurate classifier because of its ability to estimate the importance of variables in the classification (i.e., all inputs are not thought to be equally important as in the naive Bayes' classifier). In an embodiment, one or more results from the step 431 are used as inputs to the trained classifier to produce a classification for the subject.

Various training data can be used with the various learning techniques to create a suitable classifier for the subject. In an embodiment, the training data used exhibits at least one specific class of behavior for the subject. The subject can then be classified as one or more of the at least one specific class when there is good agreement between the behavior of the subject and each of the one or more of the at least one specific class. In an embodiment, similar training data is used in the method 301 to determine the relationship between the first condition and the second condition. The relationship is then used to predict the relative position of each landmark in the step 421. Such training can facilitate classification of a specific class of behavior in the step 441. For example, normal data can be used in the method 301 so that a normal response to the second condition is predicted in the step 421 given the positions of each landmark in the first condition. Then, the actual response of the subject can be determined from the plurality of images of the subject under the second condition. In an embodiment, the actual response is determined by identifying the common set of landmarks in the plurality of images of the subject under the second condition. In an embodiment, such identification can be accomplished as described in the step 407. In the step 441, the actual response can be compared to the predicted response. Where strong agreement is found between the actual and predicted responses, the subject can be classified as normal. In an embodiment, the classification that results from the step 441 can be encoded for later use. Various methods to encode such information will be known to one skilled in the art.

In an embodiment, one or more results of the step 441 are stored, presented, or output for later use. In an embodiment, the results are stored in a memory such as the memory 109. In an embodiment, such results are presented, transmitted, or otherwise output via an output interface such as the output interface 107 and/or an output device such as the output device 117. In an embodiment, such results are transmitted via an API such as the API 119.

In an embodiment, after classification of the subject a message is automatically transmitted to a clinician for further action. In an embodiment, such a message is transmitted only when an abnormal result is obtained. In an embodiment, such a message is transmitted to a client device. Various communication techniques can be used as further discussed below. The clinician can then verify the result and take further action as indicated.

Figure 5:
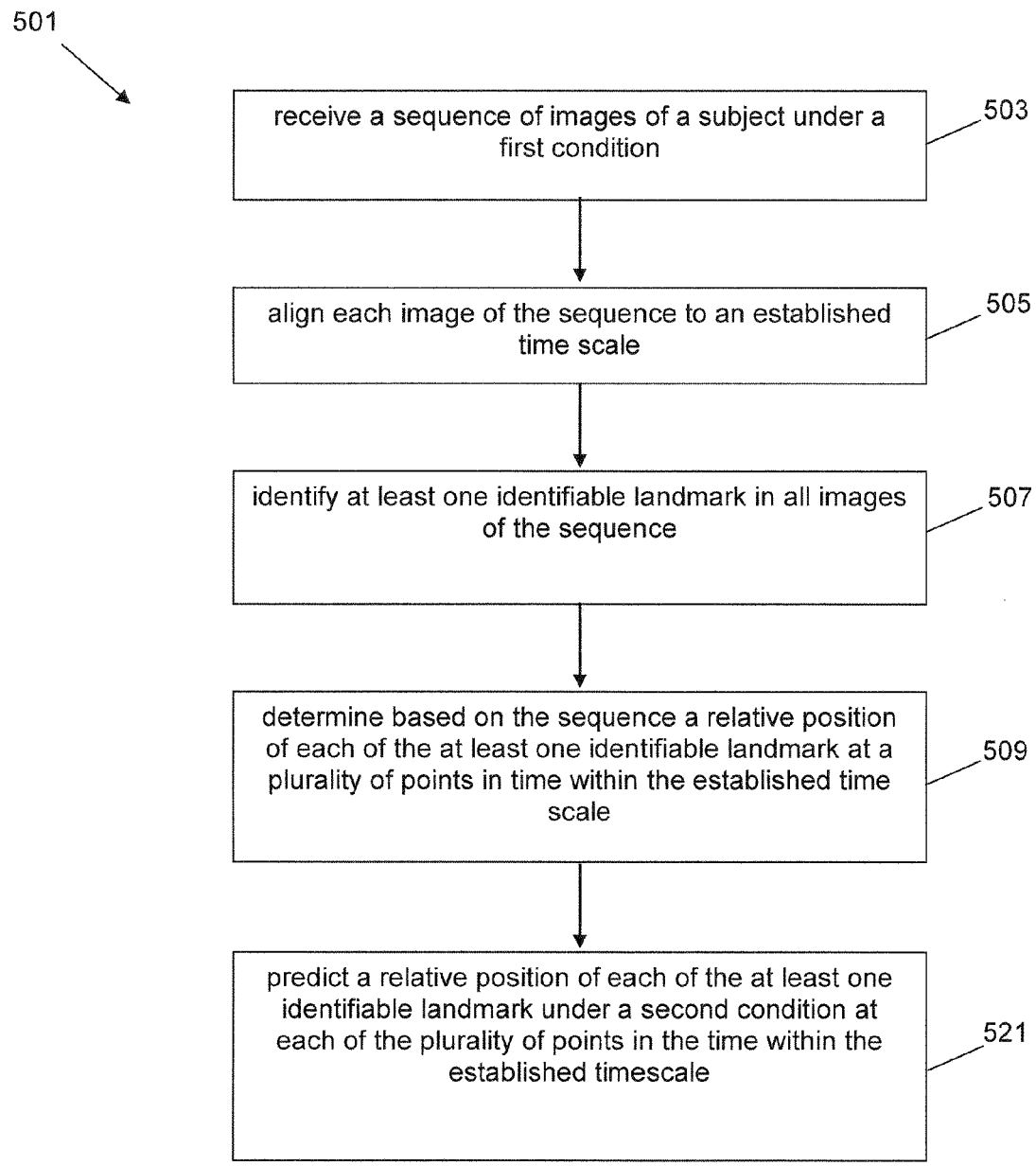
FIG. 5 is a flowchart of a method of predicting relative landmark positions in a second condition given a sequence of images showing a first condition in accordance with an embodiment of the present invention.

FIG. 5 is a flowchart of a method 501 of predicting relative landmark positions in a second condition given a sequence of images showing a first condition in accordance with an embodiment of the present invention. In an embodiment, the method 501 applies to pluralities of images. In an embodiment, the method, a subset, and/or a variation thereof can be executed via a prediction module such as the prediction module 125.

At a step 503, a plurality of images of a subject under a first condition is received. As discussed above, embodiments of the subject invention can be used to analyze images of various subjects under various conditions. In an embodiment, the plurality comprises images of the subject at a plurality of timepoints. In an embodiment, the plurality comprises images of the subject at a plurality of points in time within a physical cycle exhibited by the subject. In an embodiment, the plurality is a sequence ordered from the earliest point in time to the latest. In an embodiment, the plurality includes multiple cycles of the physical cycle. In an embodiment, the plurality includes partial cycles of the physical cycle.

In a particular embodiment, the plurality of images is a plurality of ultrasound images. In an embodiment, the plurality of images is a plurality of echocardiography images. In an embodiment, the plurality is received via an input interface such as the input interface 105 and/or an input device such as the input device 115. In an embodiment, the plurality is received via an API such as the API 119. In an embodiment, the plurality is received from a sonogram machine. In an embodiment, the plurality is received in a standard format such as the DICOM format set by the DICOM Standards Committee.

At a step 505, each image of the plurality is aligned to an established time scale. In an embodiment, the established time scale corresponds to an established physical cycle exhibited by the subject. As previously discussed in relation to the method 201 and the step 305, various methods can be used to align the images to a time scale.

At a step 507, a set of common features or landmarks are identified in each image of the plurality. As previously discussed in relation to the step 307, various methods can be used to identify such features or landmarks. In an embodiment, the same set of common features is also used to analyze a training data set such as by the method 301 described above.

At a step 509, based on the images of the plurality a position is determined for each member of the set of common features at a plurality of points in time within the established time scale. In an embodiment, if an image of the plurality is aligned to one of the plurality of points in time, then the positions of the features at that time point are determined based on the positions of the features within that image. In an embodiment, if no image of the plurality is aligned to one of the plurality of points in time, the positions of the features at that time point are interpolated based on the known positions of the features in the plurality at other time points. Various interpolation methods known in the art can be used to interpolate a position of a feature from the known positions of the feature. In an embodiment, an interpolation module such as the interpolation module 127 is used. In an embodiment, the position determined for each feature or landmark is a relative position as discussed above in relation to the step 309.

At a step 521, a position is predicted for each member of the set of common features at the plurality of points in time wherein the subject is under a second condition. As discussed above, embodiments of the subject invention can be used to analyze images of various subjects under various conditions. For example, in an embodiment, under the first condition the subject is unmedicated (a control) and under the second condition a medicament has been administered to the subject. In an embodiment, the invention can be used to analyze drug and/or reagent uptake in a subject. In an embodiment, the invention can be used to analyze a subject's response to other stimulus, such as a learning exercise, emotional stimulation, or other stimulus. In an embodiment, functional MRI (fMRI) images are used analyze brain response to different stimuli.

In an embodiment, such prediction is made based on the outcome of the step 509. In an embodiment, such prediction is also based on a determined relationship between:

the positions of the members of the set of common features under the first condition; and the positions of the members of the set of common features under the second condition. Various methods of determining such a relationship can be used with embodiments of the subject invention. In an embodiment, such a relationship is determined by analyzing empirical evidence. In an embodiment, such a relationship is determined by analyzing one or more training datasets such as by the method 301 discussed above. In an embodiment, the relationship is determined based on a difference in work energy required under the first condition and the second condition, assuming energy is conserved. In an embodiment, a difference in the work energy expended by the subject under the first condition and under second condition is used to make such a prediction.

In an embodiment, the predicated positions are stored, presented, or output for later use. In an embodiment, the predicated positions are stored in a memory such as the memory 109. In an embodiment, the predicated positions are presented, transmitted, or otherwise output via an output interface such as the output interface 107 and/or an output device such as the output device 117. In an embodiment, the predicated positions are transmitted via an API such as the API 119.

FIGS. 4 and 5 illustrate two possible embodiments of the invention. One or more of the steps discussed above can be combined in other ways to produce other embodiments of the subject invention. Such steps can also be combined with additional steps to produce still more embodiments.

Figure 6:
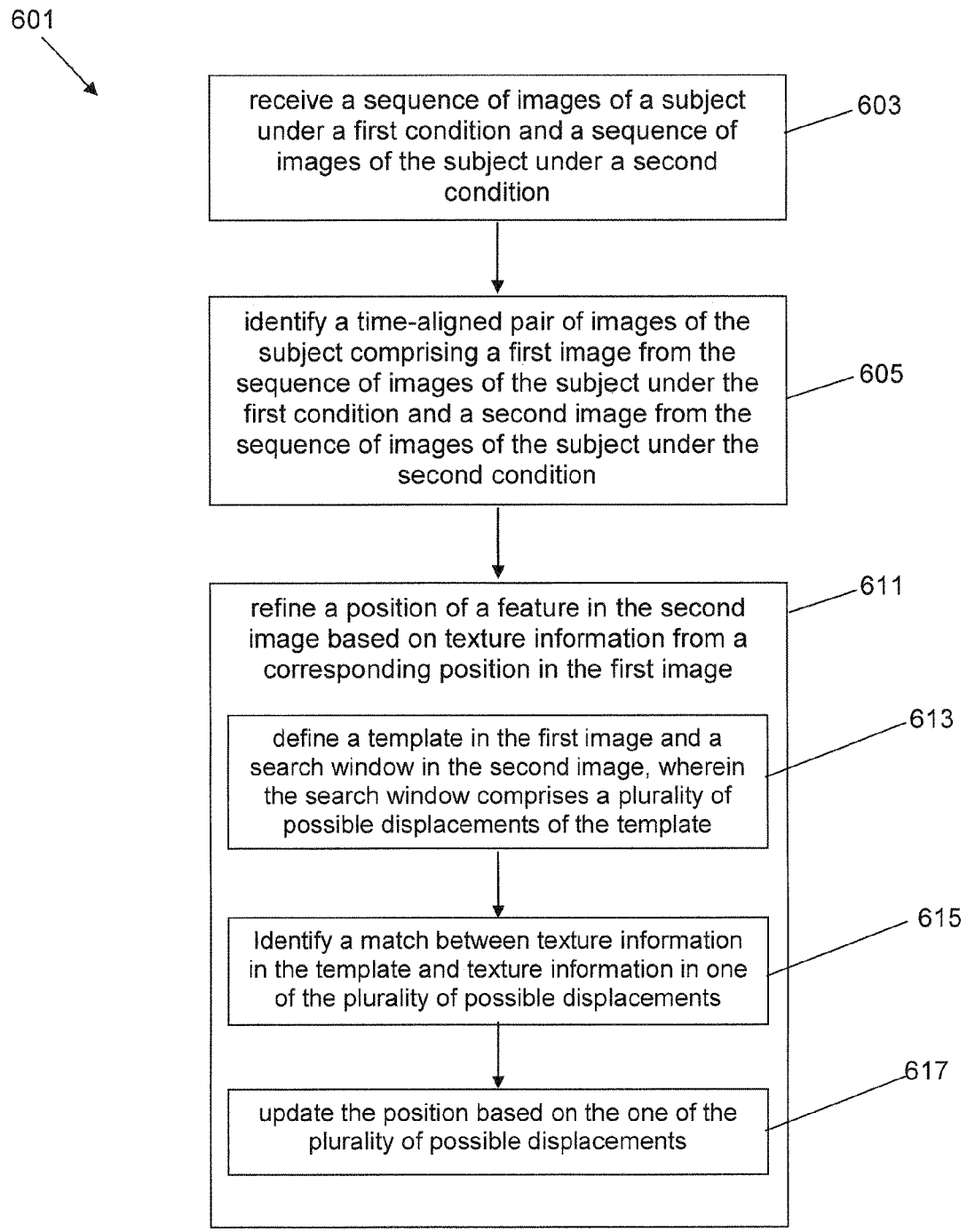
FIG. 6 is a flowchart of a method of refining a position of an image feature in accordance with an embodiment of the present invention.

FIG. 6 is a flowchart of a method 601 of refining a position of an image feature in accordance with an embodiment of the present invention. In an embodiment, the method 601 applies to pluralities of images. In an embodiment, the method, a subset, and/or a variation thereof can be executed via a refinement module such as the refinement module 129.

At a step 603, a first plurality of images of a subject under a first condition and a second plurality of images of the subject under a second condition is received. As discussed above, embodiments of the subject invention can be used to analyze images of various subjects under various conditions. In an embodiment, each of the first and the second plurality comprise images of the subject at a plurality of timepoints. In an embodiment, each of the first and the second plurality comprise images of the subject at a plurality of points in time within a physical cycle exhibited by the subject. In an embodiment, each plurality is ordered from the earliest point in time to the latest. In an embodiment, a plurality includes multiple cycles of the physical cycle. In an embodiment, a plurality includes partial cycles of the physical cycle.

In a particular embodiment, each plurality of images is a plurality of ultrasound images. In an embodiment, each plurality of images is a plurality of echocardiography images. In an embodiment a plurality is received via an input interface such as the input interface 105 and/or an input device such as the input device 115. In an embodiment, a plurality is received via an API such as the API 119. In an embodiment, a plurality is received from a sonogram machine. In an embodiment, a plurality is received in a standard format such as the DICOM format set by the DICOM Standards Committee.

At a step 605, at least one time-aligned pair of images is identified having a first image from the first plurality of images and a second image from the second plurality of images, wherein the first image comprises an image of the subject at a particular point in time and the second image comprises an image of the subject at a corresponding point in time. In an embodiment, the pairs are identified by comparing movement, velocity, or other changes in the subject exhibited in each plurality of images. In an embodiment, where the movement of the subject is sufficiently similar a pair is identified. In an embodiment, other inputs or measurements are compared to identify such pairs. For example, airflow sensors can be used to identify the beginning and ending of expiration in a respiration cycle. In another embodiment, electrocardiogram (ECG) signals are compared to identify pairs. In another embodiment, a capture time of an image is recorded and used to identify one or more pairs. In an embodiment, the first plurality does not contain an image that precisely corresponds to an image in the second plurality. In an embodiment, the closest image in the first plurality is paired with the image in the second plurality. In an embodiment, the second plurality does not contain an image that precisely corresponds to an image in the first plurality. In an embodiment, the closest image in the second plurality is paired with the image in the first plurality. In an embodiment, images are paired if they are determined to be within a certain range of time of each other. The certain range of time could be a constant, such as 0.1 seconds. Or it could be vary based on the temporal resolution of the studied image sequence, or other factors. In an embodiment, a pair is not identified for every image received.

At a step 611, a position of at least one landmark or feature in the second image is refined based on a comparison with a corresponding position in the first image. In an embodiment, texture or other image derived information at or near the position in the second image is compared to such information at or near the corresponding position in the first image. In an embodiment, the refined feature is a point. In an embodiment, the feature is part of a larger feature such as a shape. In an embodiment, the feature is a point on a boundary. In an embodiment, positions of two or more features are refined. In an embodiment, positions of features of two or more images of the second plurality are refined. Various image derived information can be for such a comparison. In an embodiment, local phase features are used. Local phase features can be computed from log-Gabor filter banks or wavelets. For example, Log-Gabor filters and wavelets can be used to calculate local amplitude and phase at a particular frequency. Typically, a bank of filters is applied to the image where each filter is created by different scalings and orientations (phase) of the reference filter. At each point in the image, the responses are recorded for each filter from the bank. Each response is greatest when the filter scale/orientation matches the image point's scale/orientation. In this way, peak responses from filters give feature information such as where there are edges in a particular orientation for example. In an embodiment, these features can give an indication of the location of a boundary, such as a LV boundary, in a heart with the direction of the edge. In an embodiment, such edge detection can be used on echocardiogram images, as further discussed in M. Mulet-Parada and J. A. Noble, "2D+T Acoustic Boundary Detection in Echocardiography," Medical Image Analysis, vol. 4, pp. 21-30, 2000. In an embodiment, texture information is used, such as variations in intensity, brightness, hue, saturation, luminosity, contrast, color, and/or other properties. In an embodiment, speckle distribution is used. Different texture measurements may work better for different types of images. For example, in an embodiment, the images are ultrasound images and Rayleigh distributed speckle is used. In another embodiment, the images are MRI images and Gaussian distributed noise is used.

Various methods of refining a position of a feature or landmark in a second image based a corresponding position in the first image can be used. The steps 613-617 discussed below illustrate one method of accomplishing this objective. Other methods are possible.

At a step 613, a template and a search window are defined, wherein the template is a portion of the first image at or near the corresponding position and the search window is a portion of the second image encompassing a plurality of possible displacements of the template. In an embodiment, the template encompasses a corresponding point in the first image corresponding to the corresponding position. In an embodiment, the template is centered on such a point. In an embodiment, the search window encompasses a point in the second image corresponding to the position. In an embodiment, the search window is centered on such a point.

In an embodiment, the template and the search window are defined by a set of pixels. In an embodiment, the template set includes a pixel corresponding to the corresponding position and one or more additional template pixels. In an embodiment, the search window set includes a pixel corresponding to the position and one or more additional search pixels. In an embodiment, the one or more additional template pixels consist of an area (or volume for three-dimensional images) contiguous to the pixel corresponding to the corresponding position. In an embodiment, the one or more additional search pixels consist of an area (or volume for three-dimensional images) contiguous to the pixel corresponding to the position. In an embodiment, the search window and the template are centered on the pixel corresponding to the position and the pixel corresponding to the corresponding position, respectively. In an embodiment, the search window and the template are not centered on the position and the corresponding position in this manner. For example, in an embodiment, the position and the corresponding position form the upper-left corner of the search window and the template, respectively. In an embodiment, the search window is centered but the template is not (or vice versa) in order to bias the result in a particular direction.

Various template and window sizes and shapes can be used with the subject invention. In an embodiment, the template is square or cubic "block" of pixels. In an embodiment, the template is a regular triangle, hexagon, octagon, or other regular polygon. In an embodiment, the template is an irregular shape, such as a rectangle or rectangular solid. The search window is larger than and encompasses at least two displacements of the template. For example, a 5×5 block of equally sized pixels, the search window, encompasses nine possible displacements of 3×3 block of equally sized pixels, the template. A 4×5 block of equally sized pixels would encompass six possible displacements.

At a step 615, the template is compared to each of the possible displacements of the template in the search window. In an embodiment, a superior match is identified between one of the possible displacements and the template. In an embodiment, texture information in the template is compared with texture information in each of the possible displacements. In an embodiment, identifying the superior match comprises computing a similarity measure for each of the possible displacements, wherein the similarity measure represents a degree of textual similarity between the template set and the displacement. In an embodiment, the similarity measure is based on Rayleigh distributed speckle in the template set and the displacement. In an embodiment, identifying the superior match further comprises computing a confidence measure for each of the possible displacements, wherein the confidence measure measures the smoothness and/or motion coherence of motion leading to the displacement. In an embodiment, the similarity measures and confidence measures are combined to identify the superior match.

At a step 617, the position of the feature in the second image is updated based on the identified displacement. In an embodiment, the position is updated to a position of a pixel in the identified displacement. In an embodiment, the position is updated to a position in the center of the identified displacement.

In an embodiment, the refined feature is stored, presented, or output for later use as discussed above in relation to the step 425. In an embodiment, the refined feature is used to derive one or more features and/or perform one or more calculations as described below in relation to the step 531.

Figure 7:
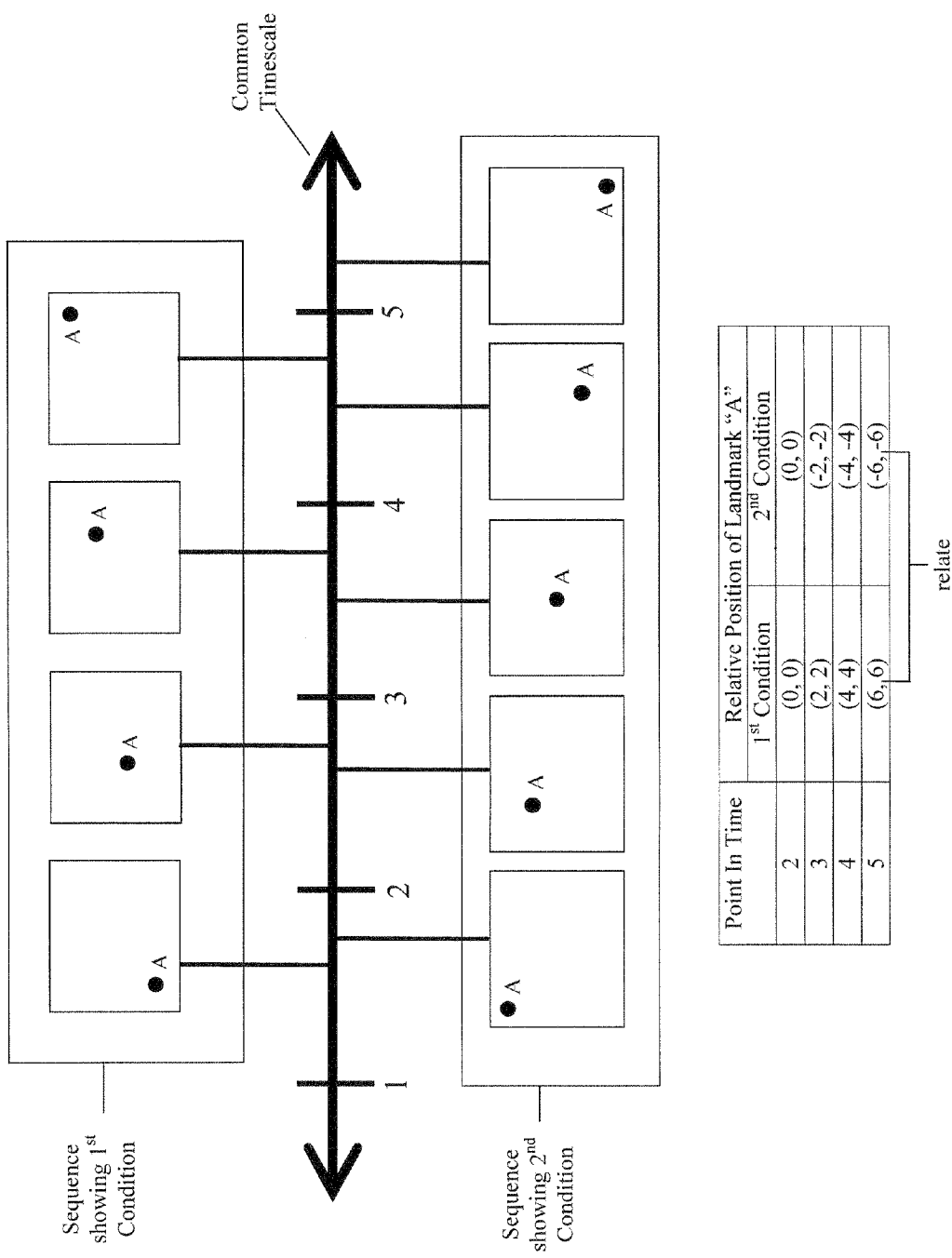
FIG. 7 illustrates a method of determining a relationship between sequences of images showing a first condition and sequences of images showing a second condition in accordance with an embodiment of the present invention.

FIG. 7 illustrates a method of determining a relationship between sequences of images showing a first condition and sequences of images showing a second condition in accordance with an embodiment of the present invention. In an embodiment, the method applies to pluralities of images. In the embodiment shown, a sequence of images showing the first condition includes four images and the sequence of images showing the second condition includes five images. Both pluralities are aligned to a common timeline. As discussed above in relation to the method 201 and the step 305, various methods of aligning a sequence of images to a common timeline can be used. As also shown, the position of a landmark "A" is identified in each image of each sequence. As discussed above in relation to the step 307, various methods can be used to identify such landmarks. In the embodiment shown, four points in time on the timeline (2, 3, 4, 5) are included in a table. As shown in the timeline, these points in time do not necessarily correspond to the timing of any of the images of either sequence. Still as shown in the table, a relative position of the landmark "A" is determined for each sequence at each of these studied points in time. In an embodiment, for each of the studied time points for each sequence of the pluralities, the relative position of the landmark "A" is interpolated based on the positions of the landmark "A" in the images of the sequence. As discussed above in relation to the step 309, various methods can be used to interpolate such a relative position for a landmark or feature. In the embodiment shown, the relative positions of the landmark "A" are each represented by two values in the table. In an embodiment, these values are vector components of a displacement along two perpendicular axes of a coordinate system. In the embodiment shown, the displacement for both pluralities is from the position of the landmark "A" at the point of time 2. Thus, in this embodiment, the position of the landmark "A" at the point in time 2 serves as the origin position as discussed above. The relative positions of the landmark "A" at the various time points can be related as discussed above in relation to the step 311.

Figure 8:
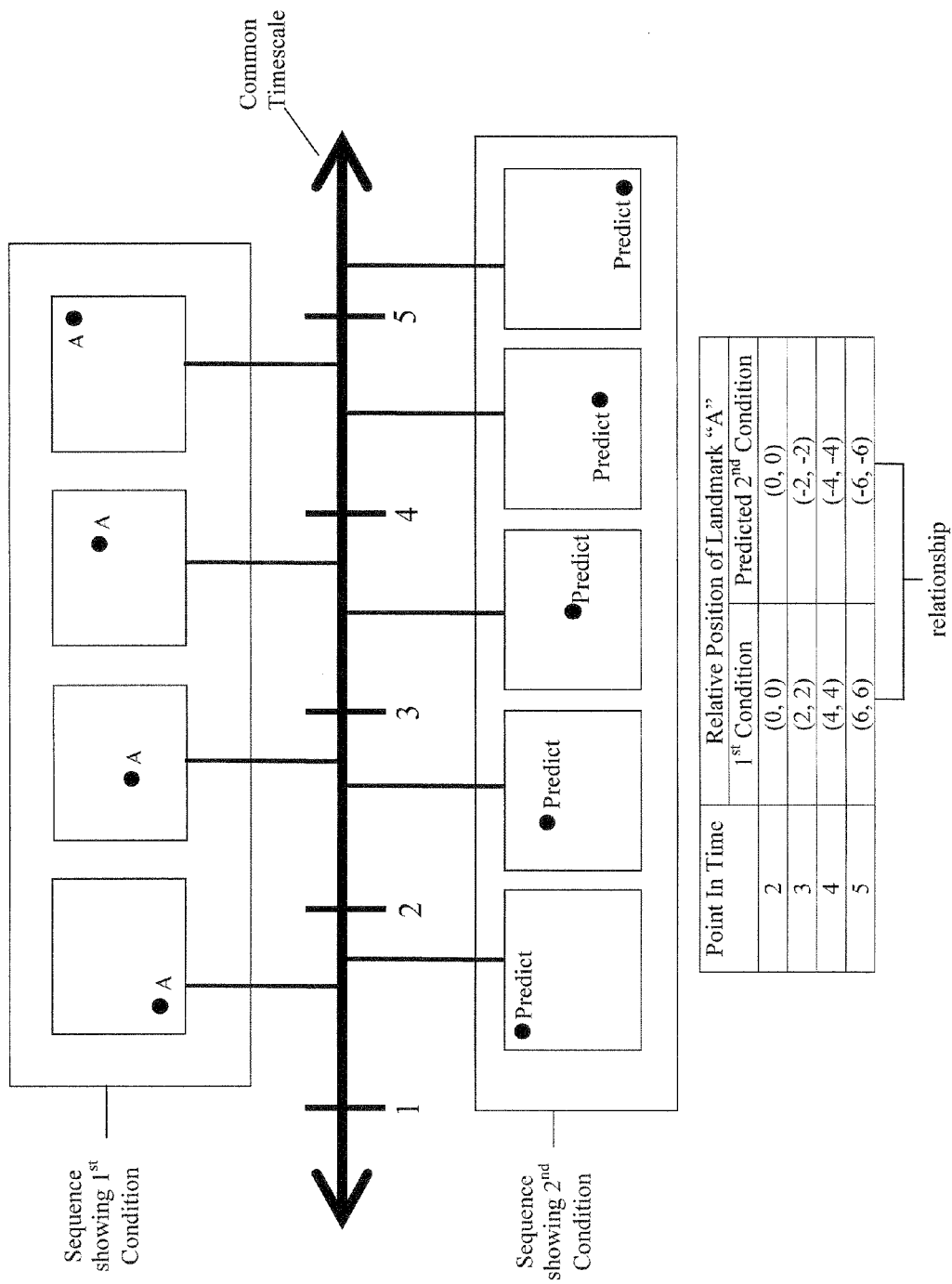
FIG. 8 illustrates a method of predicting landmark positions in a sequence of images showing a second condition given a sequence of images showing a first condition in accordance with an embodiment of the present invention.

FIG. 8 illustrates a method of predicting landmark positions in a sequence of images showing a second condition given a sequence of images showing a first condition in accordance with an embodiment of the present invention. In an embodiment, the method applies to pluralities of images. As in FIG. 7, in the embodiment shown, a sequence of images showing the first condition includes four images and the sequence of images showing the second condition includes five images. More or fewer images can be included in each sequence. The pluralities need not have an equal number of images. Again both pluralities are aligned to the common timeline. In the embodiment shown, the position of a landmark "A" is again identified in each image of the sequence showing the first condition, but a predicted position of the landmark "A" is shown in each image of the sequence showing the second condition. As shown in the table, for the sequence of images showing the first condition, a relative position of the landmark "A" is determined for each sequence at each of these studied points in time. In an embodiment, such relative positions are determined as discussed above in relation to FIG. 7. For the second sequence, a relative position of the landmark "A" is predicted at each of the four studied points in time. As discussed above in relation to the step 421, a relationship between the relative positions of the landmark "A" at the various time points can be used to predict the relative position of the landmark at a studied point in time for the sequence of images showing the second condition. In an embodiment, the relationship can be determined as described in relation to FIG. 7. As discussed above in relation to the step 423, these predicted relative positions of the landmark can be used to interpolate the positions of the landmark in the images of the sequence of images showing the second condition.

In an embodiment of the subject invention, a multivariate regression model is used to relate a least one position A corresponding to at least one feature in a sequence A of image frames to a least one position B corresponding to the at least one feature in a sequence B of image frames. The resulting model can be used to predict the at least one position B of the at least one feature in a sequence B for a new dataset, given the at least one position A of the at least one feature in a sequence A for the new data set.

In a further embodiment, information derived from an image A from the sequence A of the new data set is used to refine the prediction of one or more of the at least one position B of the at least one feature in an image B from the sequence B of the new data set. In an embodiment, the image A and the image B depict corresponding times within their respective sequences. For example, if frame 2 in sequence A (A2) corresponds to frame 3 in sequence B (B3), then image derived information from points near the at least one feature in A2 are compared to the image derived information from a search region around corresponding points near the at least one feature in B3. The one or more of the at least one position B of the at least one feature in the image B is then refined using this new information. In an embodiment, the feature is a boundary.

In a particular embodiment, the subject invention is applied to stress echocardiography images. In stress echocardiography, a heart (or typically the left ventricle) is imaged using ultrasound at rest and then after administration of a stress stimulus. Clinical analysis is typically 2D and focuses on visualizing these two sequences of images (rest and stressed) side by side. A sick heart typically moves differently under stress than a healthy one and the clinician will grade this motion by eye and from this decide whether the heart is abnormal or not. This interpretation is subjective. Automating this task is difficult. Methods developed for analyzing rest images do not work well on stress images. Embodiments of the subject invention are directed to automating processing of the stressed images using results from processing the higher quality rest images.

Thus, in an embodiment, the invention involves a prediction of a stress sequence segmentation given a rest sequence segmentation of the left ventricle. In a further embodiment, the prediction is then updated by either using more traditional segmentation algorithms such as level sets or snakes or using image derived information from the rest sequence to inform the segmentation of the stress sequence as described above.

In an embodiment of the subject invention, a multivariate regression model, such as a Canonical Correlation Analysis (CCA) model, is developed using training datasets where each dataset consists of two segmented image sequences; sequence A (rest) and sequence B (stress). The model links the segmentations of the rest sequence to those of the stress sequence by modeling the motion of landmarks in the images and returns the model parameters.

In an embodiment, the model links the rest and stress sequences using the principle of conservation of energy at each corresponding timepoint, t, in the cardiac cycle. In an embodiment, the internal strain energy (in the heart tissue) at stress, $S_{stress}$, is assumed to be the same as the internal strain energy at rest, $S_{rest}$, plus some additional work energy, W, required to meet the extra demand on the heart when stressed:

$$S_{stress,t} = S_{rest,t} + W_t \qquad (3)$$

Assuming a linear elastic model, the internal strain energy is proportional to the displacement and Equation 3 can be re-written as:

$$\sum_{n=1}^{landmarks} (c_{n,t} \Delta x_{n,t}^{stressed} + d_{n,t} \Delta y_{n,t}^{stressed}) = \\ \sum_{n=1}^{landmarks} (a_{n,t} \Delta x_{n,t}^{rest} + b_{n,t} \Delta y_{n,t}^{rest}) + W_t \cdot \Delta\% \ MHR, \qquad (4)$$

where a, b, c, d are the coefficients to be deduced, $\Delta x$ and $\Delta y$ are the displacements of the points on the boundary relative to the end-diastolic frame in the short and long axes of the heart respectively, W is the additional work energy term, and $\Delta\%$ MHR is the percentage of the Maximum Heart Rate (MI-IR) reached in stress relative to rest. Including this final term ($\Delta\%$ MHR) provides a way to incorporate a measure of the level of stress reached in the stress echocardiography session. This term can be useful because not all subjects reach the optimal level of peak stress (about 85% of MHR). The model computes the coefficients, a, b, c and d, and the work energy term, W, that result in an optimal linear relationship (in terms of cross-covariance) as described by Equation 4. In an embodiment, the final term ($\Delta\%$ MHR) is folded into the W term to represent the additional amount of work energy required at the indicated stress level. In another embodiment, the work W and percentage of MHR terms are split over both sides of the equation so that an amount of work required for the heart at rest $W_{rest}$ and an amount of work required for the heart in stress $W_{stressed}$ can considered separately, as shown in Equation 5:

$$\sum_{n=1}^{landmarks} (c_{n,t} \Delta x_{n,t}^{stressed} + d_{n,t} \Delta y_{n,t}^{stressed}) + W_{stressed,t} \cdot \% \ MHR_{stressed} = \\ \sum_{n=1}^{landmarks} (a_{n,t} \Delta x_{n,t}^{rest} + b_{n,t} \Delta y_{n,t}^{rest}) + W_{rest,t} \cdot \% \ MHR_{rest}. \qquad (5)$$

As discussed above, % $MHR_{rest}$, % $MHR_{stressed}$, and/or $\Delta\%$ MHR can be determined in various manners. In other embodiments, the displacement or relative position of each point ($\Delta x$ and $\Delta y$ here) can be defined differently, for example the position can be defined relative to an origin position in each image, or the coordinate system for $\Delta x$ and $\Delta y$ can be differently oriented.

In an embodiment, having derived the model parameters, the model is then applied in a patient-specific way to an inquire dataset. In an embodiment, the model input includes the rest landmark positions derived from the rest sequence of the inquire dataset and the output is a prediction of the stress landmark positions for the stress sequence of the inquire dataset. Hence, the global model is applied in a patient-specific manner by using rest sequence information derived from the inquire dataset to predict stress sequence information for the patient.

In a further embodiment, the predicted stress sequence information is refined using a block-matching scheme as further described below. In an embodiment, the block-matching scheme is used to refine a feature in an image of a stress sequence based on information derived from an image of a rest sequence. In an embodiment, the block-matching scheme can be applied to refine the feature in the stress sequence without first developing or applying the model described above.

Cohen and Dinstein described a similarity measure, suitable for carrying out block-matching between two consecutive frames in a sequence of images, based on a simplified model of image formation whereby they assumed the ultrasound (US) images were contaminated by Rayleigh distributed multiplicative noise. B. Cohen and I. Dinstein, "New maximum likelihood motion estimation schemes for noisy ultrasound images," *Pattern Recognition*, 35, pp. 455-463, 2002. According to this method, a block (or other set) of pixels in one image is matched to another block (or set) in a second image by means of a maximum likelihood (ML) estimation scheme within a pre-defined search area to arrive at motion estimates between the two images. Boukerroui et al. improved on this idea by using normalised image blocks, a probability weighted motion estimate from the search area using Singh's algorithm, and finally optimising all the parameters for a given sequence of images. D. Boukerroui, J. A. Noble, and M. Brady, "Velocity Estimation in Ultrasound Images: A Block Matching Approach," *IPMI*, pp. 586-598, 2003.

In an embodiment of the subject invention, a similar approach is used to compare a block (or set) of pixels from a rest frame to one or more blocks (or sets) of pixels in a stress frame. In an embodiment, the results of the comparison are then used to refine one or more points comprising a feature (such as a boundary) in the stress frame. In an embodiment, the invention thereby aides segmentation of the stress frame. In an embodiment, the block-matching scheme is applied to paired frames from the rest and stress sequences of a dataset that are at corresponding phases in the cardiac cycle. In an embodiment, the block-matching scheme is used to refine a point along a boundary in a stress frame based on information derived from a corresponding point in the paired rest frame. In a particular embodiment, for any point along the boundary in the rest frame, a template block of size 3×3 pixels is used to search a block of size 5×5 pixels around its corresponding point in the stress frame. In an embodiment, the similarity measure and optimisation are computed as described by Boukerroui et al. but in a multi-resolution approach.

Figure 9:
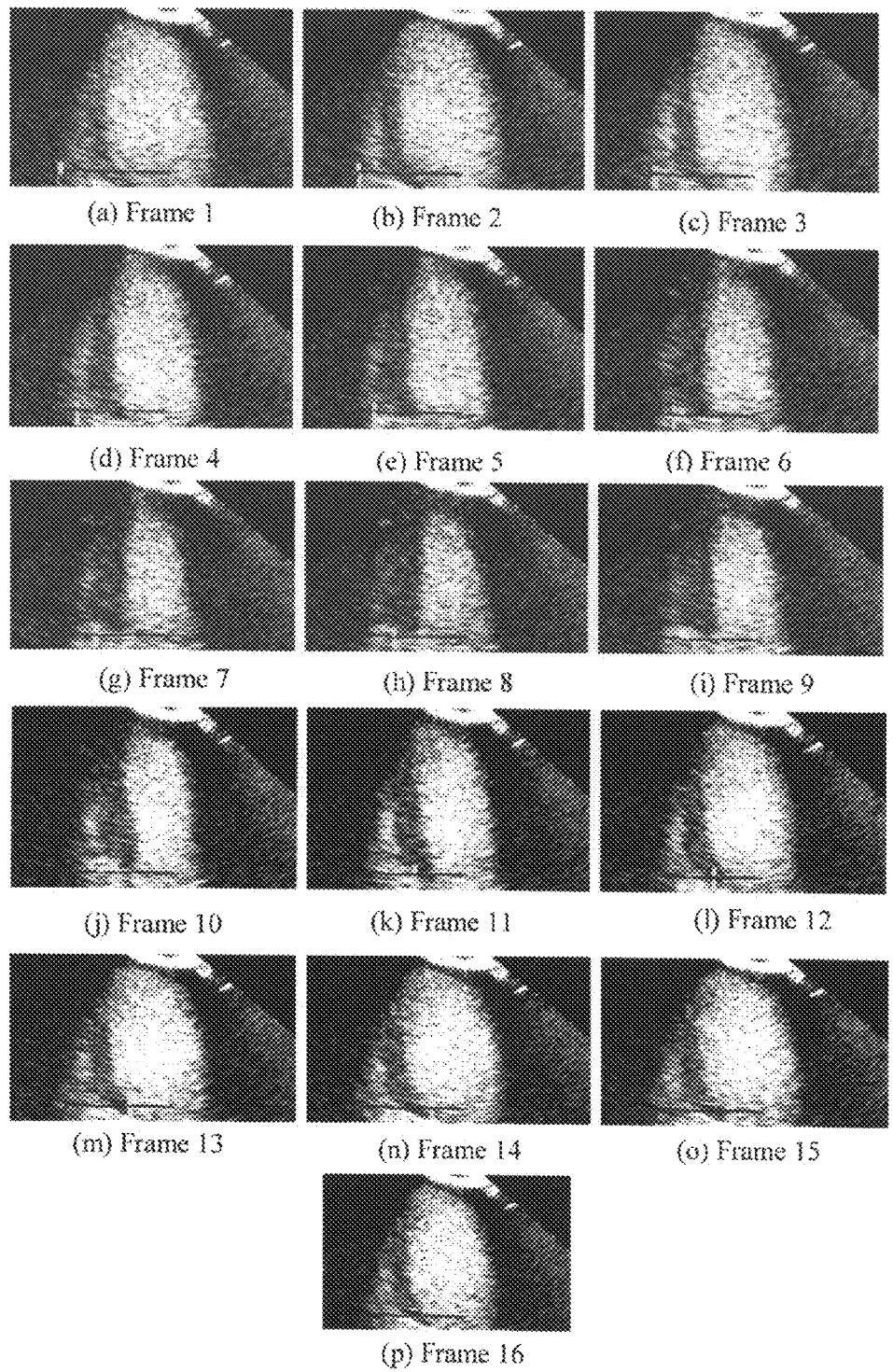
FIG. 9 shows REST frames from ED to ES in accordance with embodiments of the subject invention.
Figure 10:
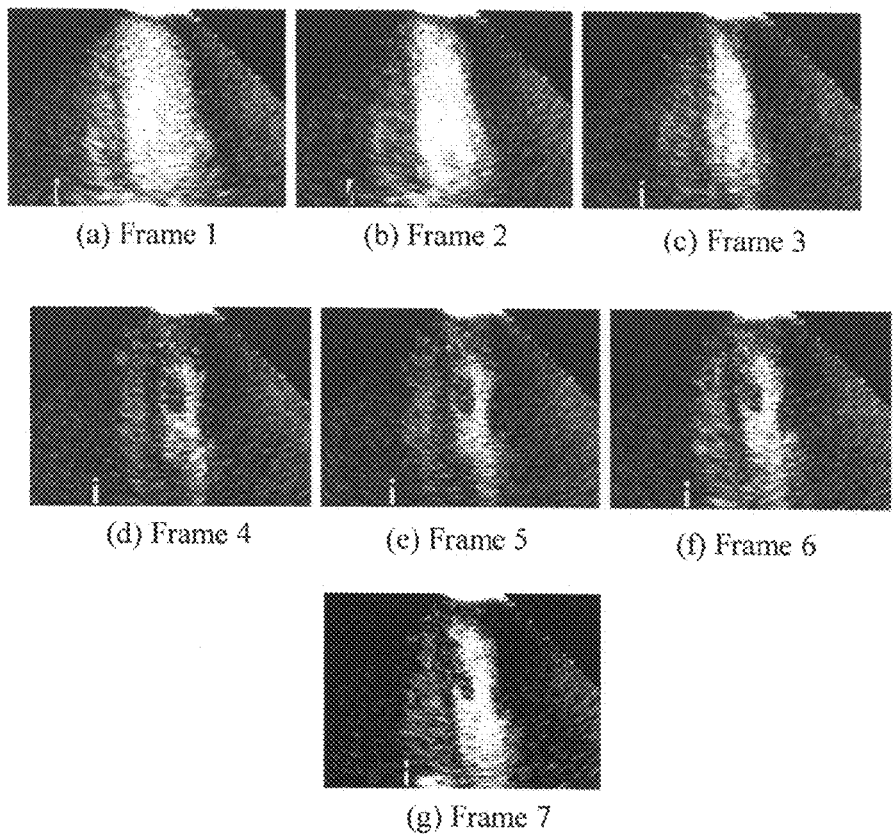
FIG. 10 shows STRESS frames from ED to ES in accordance with embodiments of the subject invention.
Figure 11:
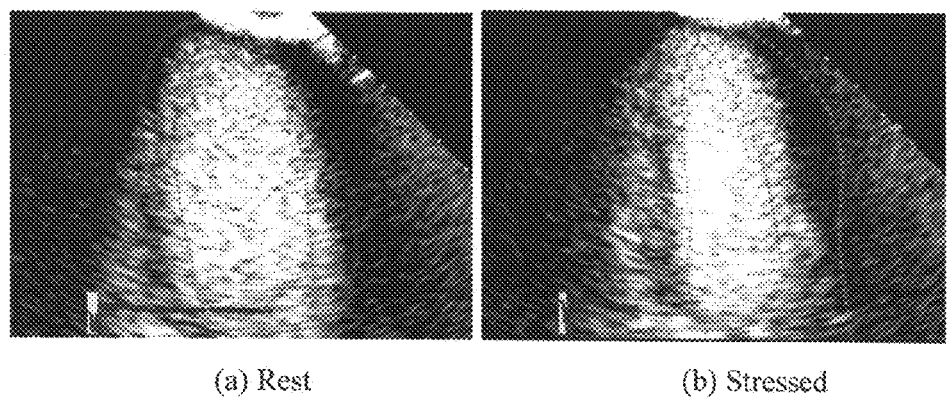
FIG. 11 shows first component from PCA for rest and stress cardiac cycles. Contours represent mean, mean+(SD× Weighting$_{PCA}$) and mean−(SD×Weighting$_{PCA}$) in accordance with embodiments of the subject invention.

In an embodiment, a Principal Components Analysis (PCA), as discussed in K. Pearson. On lines and planes of closest fit to systems of points in space. *Phil Mag*, 2:559-572, 1901, J. O. Ramsay and B. W. Silverman. *Applied Functional Data Analysis: Methods and Case Studies*. Springer-Verlag, 2002, is used to relate features of the LV wall of a heart. In an embodiment, the features are represented by seven landmarks in images of the heart as shown in FIGS. 9 and 10. In an embodiment, the landmarks are identified and/or verified by an expert cardiologist. In an embodiment, a cubic spline curve is used to connect the landmarks. The results from carrying out PCA are shown in FIG. 11 for the first principal component (this accounts for the most variability in the data whilst succeeding components account for reducing variability). The green contour represents the mean cardiac shape in the cardiac cycle from ED to ES, and the red and blue contours are plus and minus one standard deviation of the first principal component respectively. The analysis shows that there is greater shape variation in the LV at stress as the hand between the red and blue contours is wider for the stress case than for the rest. Secondly, the form that the red and blue contours take in stress is quite different to the mean shape whereas for the rest, there are three similarly shaped contours. An embodiment of the subject invention makes no assumptions about the level of motion between frames and allows for this greater variation in shape.

Figure 12:
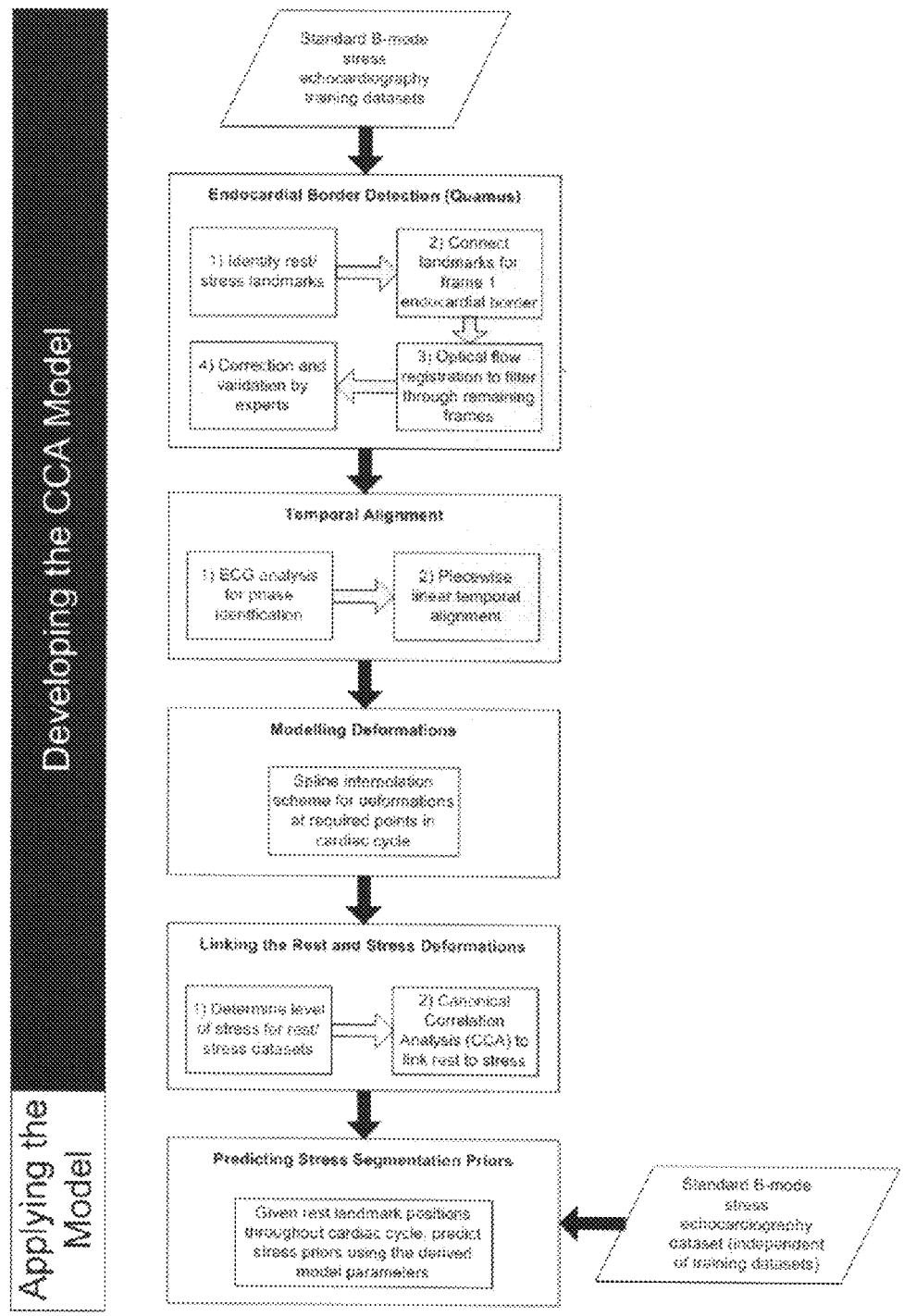
FIG. 12 shows an overview of the processes involved in model development and its application in accordance with embodiments of the subject invention.

In an embodiment of the subject invention, the objective is to track an epicardial and/or endocardial boundary or surface of the LV from standard B-mode US images of the cardiac cycle when the heart is stressed. In an embodiment, the invention operates on one or more datasets, each including a plurality of images of a heart at rest and a plurality of images of the heart in a stress condition. In an embodiment, the invention operates on other types of images as described above. As the specific motion of the stressed heart can potentially vary significantly from patient to patient, in an embodiment, a patient-specific model is developed whereby the segmentations for the stress plurality of images are inferred from the segmentations for the rest plurality of images. The processes involved in developing a model and then applying it to segment/track stress data in one embodiment are shown in the flow chart of FIG. 12. In the embodiment shown, first, the endocardial borders are delineated using a semi-automated tracking software called Quamus®. As discussed above, other methods can be used to identify and/or interpolate features in a plurality of images. Next, in the embodiment shown in FIG. 12, the rest and stress datasets are aligned temporarily so that the deformations of the corresponding points in the cardiac cycle can be modelled. Finally, in the embodiment shown in FIG. 12, the rest and stress deformations are linked using a multivariate regression model, such as Canonical Correlation Analysis (CCA), to arrive at priors for use in segmentation of stressed data.

Figure 13:
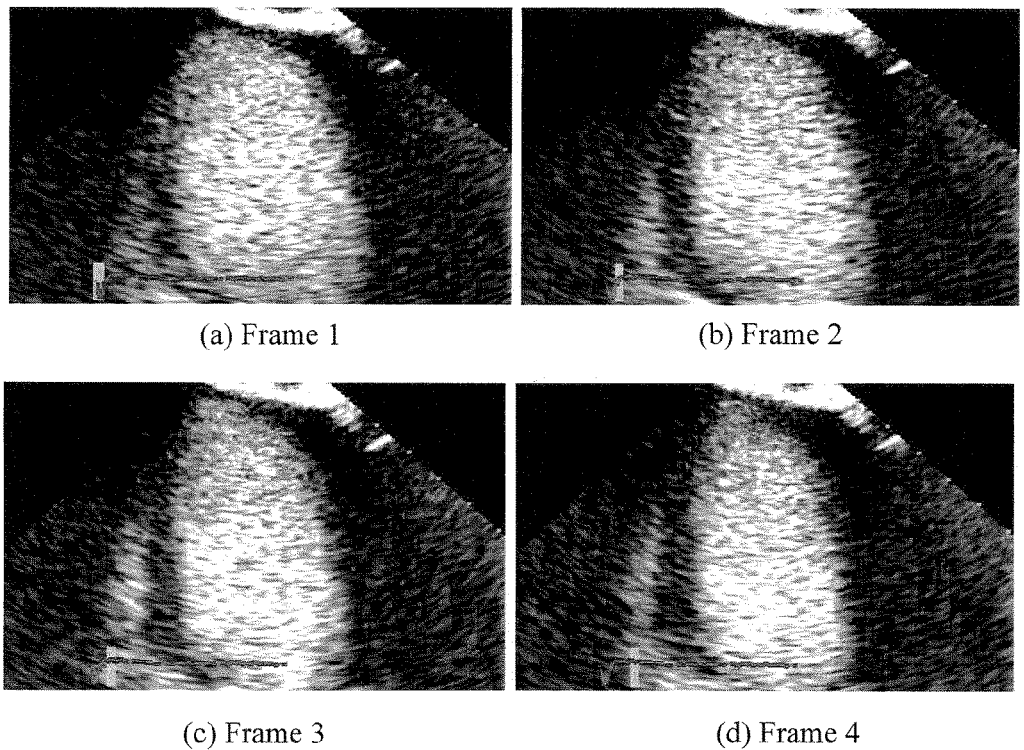
FIG. 13 shows corrected landmarks and resulting contours from semi-automatic segmentation using Quamus® for the first few frames of one rest dataset in accordance with embodiments of the subject invention.

In an embodiment, the Endocardial Border Detection Stage, of the data analysis includes segmenting each image of each dataset. In an embodiment, a software program called Quamus (developed by Mirada Solutions Ltd, Oxford, UK) is used to do this. In an embodiment, for each plurality of images, an ED frame is identified and seven landmarks are marked out in the frame starting from the mitral valve (MV) hinge-point on the left going round to the apex at the top and finishing of at the MV hinge-point on the right (FIG. 13). In other embodiments, other landmarks can be used. In an embodiment, points in between the MV hinge-points and the apex are chosen to represent, as closely as possible, the segment divisions as described by Cerqueira et al. in M. D. Cerqueira, N. J. Weissman, V. Dilsizian, A. K. Jacobs, S. Kaul, W. K. Laskey, D. J. Pennell, J. A. Rumberger, T. Ryan, and M. S. Verani. Standardized myocardial segmentation and nomenclature for tomographic imaging of the heart. *Circulation*, 105(4):539-542, 2002 for the two chamber view (2-CV) (see FIG. 14). Following this step in an embodiment, a quadratic spline is fit through the points. In an embodiment, this first-frame segmentation is then filtered through the remaining frames using an optical flow based registration/motion extraction algorithm. However, due to speckle, missing boundaries caused by shadowing, and noise in ultrasound images, this generally requires correction in later frames as segmentations become progressively worse as the frame number increases. This is typically the case for stress data where there is greater motion between frames than there is for rest data. In an embodiment, the landmarks and segmentations are separately developed for each frame in each plurality of images. In an embodiment, the segmentations (see FIG. 13) are validated by one or more experienced cardiologists before being used to build a model for linking the rest and stress images.

In an embodiment, an ECG signal is used to identify particular phases within the cardiac cycle of the heart. As the heart rate is typically significantly higher in stress, the time period of one cardiac cycle is considerably shorter, fewer frames are acquired in stress, and the stress frames are not aligned with the ones in rest. In an embodiment, in order to compare and relate the segmentations of rest and stress, corresponding frames are found according to known phases in the cardiac cycle. In an embodiment, the ED and ES frames are identified in each of the rest and stress pluralities of images and then use a linear interpolation scheme is used to identify corresponding frames in between the ED and ES frames of each plurality. In another embodiment, as further discussed below, three or more phase images are identified in each plurality and two or more piecewise linear functions are used to temporally align each frame sequences between these phase image. In an embodiment, the rest frames that do not correspond to a frame in stress are discarded. In another embodiment, as further discussed below, all frames can be aligned to a common temporal axis and studied.

Figure 15:
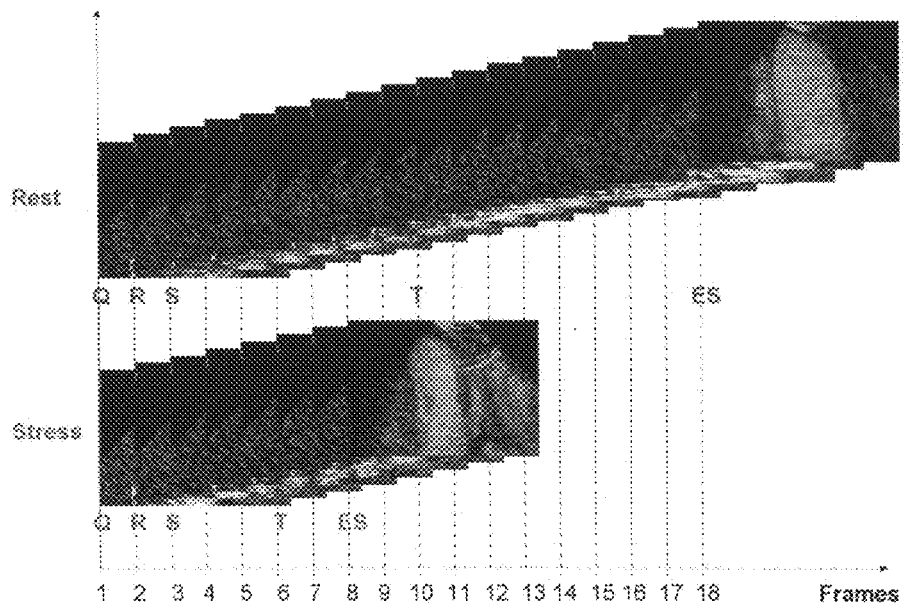
FIG. 15 shows a temporal alignment scheme for one dataset in accordance with embodiments of the subject invention.
Figure 15:
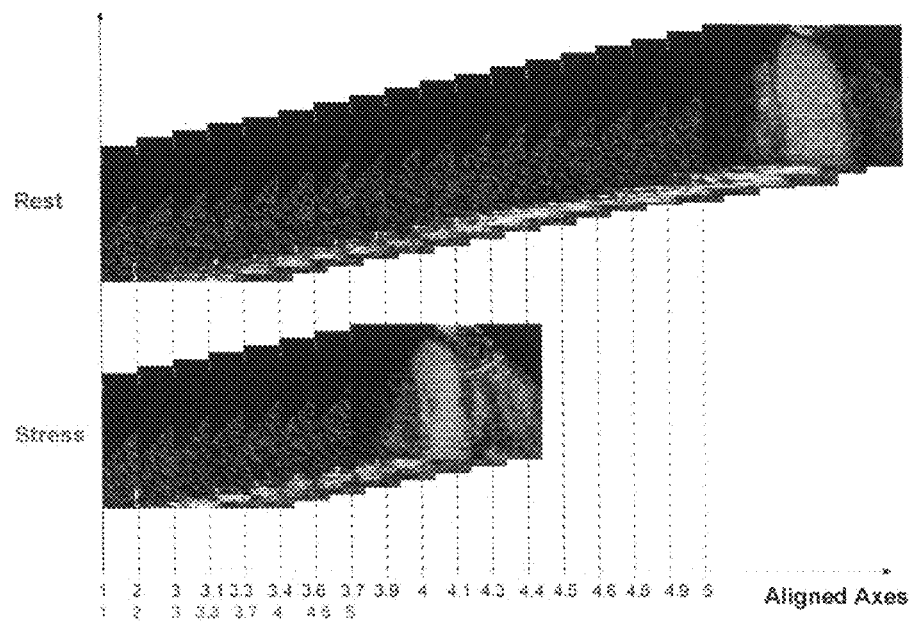

FIG. 15 summarises the stages in carrying out this temporal alignment in an embodiment of the subject invention. In the embodiment shown, the first step is to identify the 'Q', 'R', 'S', 'T' and ES frames from the rest and stress datasets (the 'P' part of the ECG signal is not always recorded), as shown in FIG. 15(a). These phases are then assigned numerical values from one to five respectively and a linear interpolation scheme is then used to identify the aligned axis values for intermediate frames as shown in FIG. 15(b).

Figure 16:
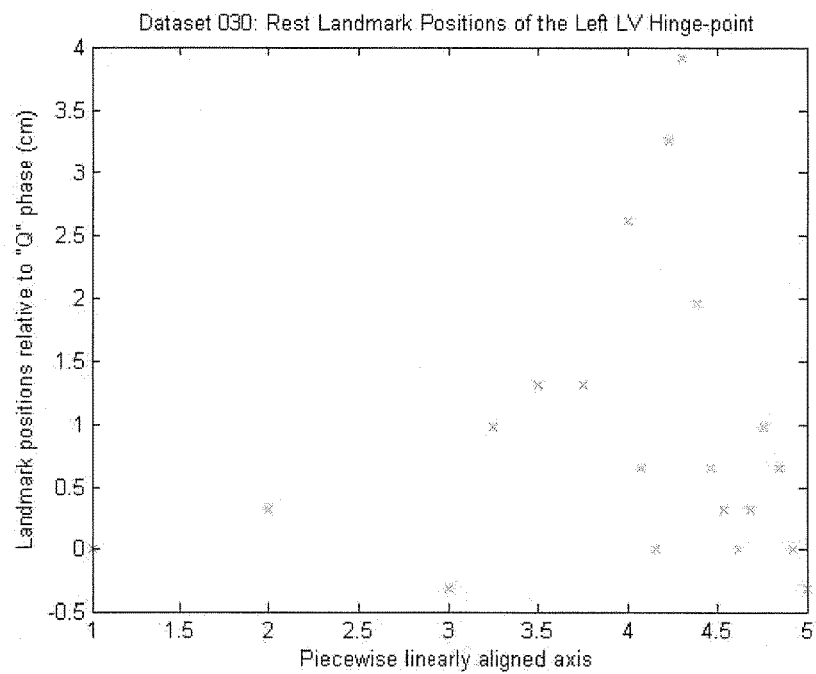
FIG. 16 shows plots of short axis positions of the left MV hinge-point for the rest and stress datasets, against the temporally aligned axis in accordance with embodiments of the subject invention.
Figure 16:
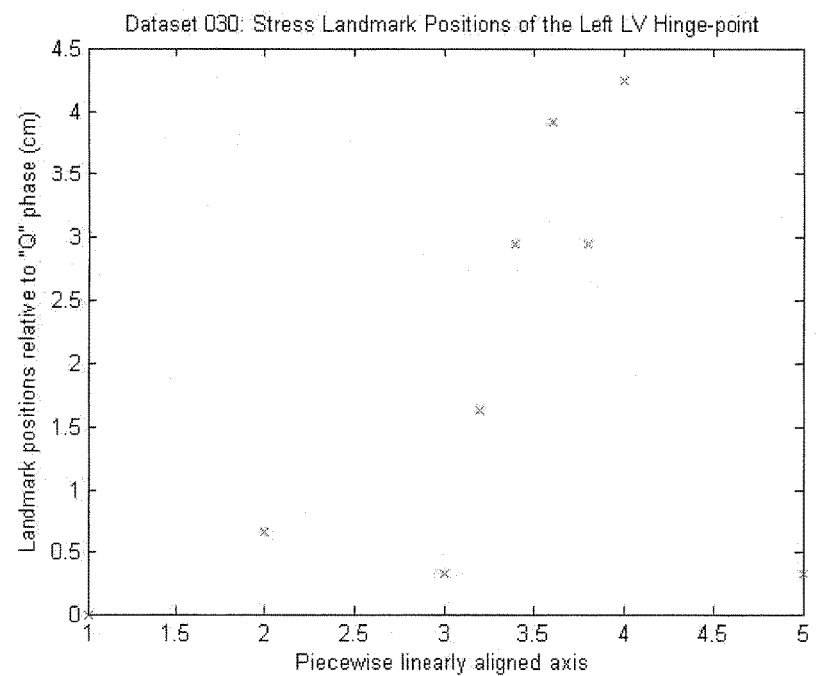
Figure 17:
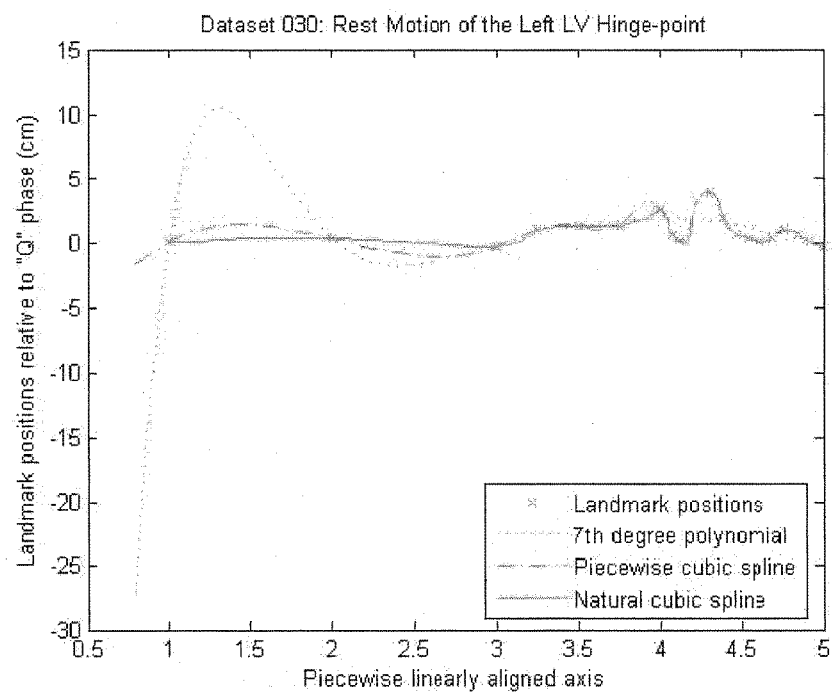
FIG. 17 shows interpolation schemes for short axis positions of the left MV hinge-point for the rest and stress datasets, against the temporally aligned axis in accordance with embodiments of the subject invention.
Figure 17:
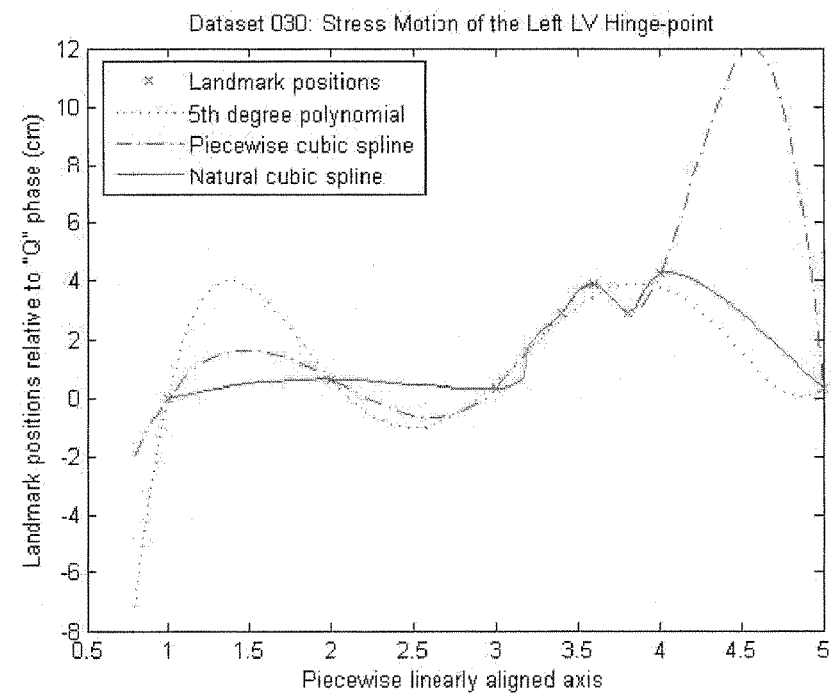

In an embodiment, the aligned temporal axis provides a basic structure by which the deformations in the rest and stress images can be compared. FIG. 16 shows a plot of rest and stress positions for the left MV hinge-point, relative to the position in the 'Q' phase, against the aligned axis. The landmark positions at each frame (marked as crosses) show that the motion for rest and stress is quite similar for the initial part of the cardiac cycle but then there is greater variation between the two after the 'S' phase (equivalent to 3 on the aligned axis). This is when the blood is being pumped out of the LV and the motion in stress is different and greater in order to meet the increased demand for oxygenated blood from the body. For interpolation at the required timepoints of the plots in FIG. 16, various interpolation schemes can be used. FIG. 17 illustrates the results of a polynomial curve, piecewise cubic splines, and a natural cubic spline, for the rest and stress deformations.

In an embodiment, rest and stress images are temporally aligned to a common axis and mutual information based registration is used to spatially align the ED frame in each plurality to a template as described in V. Walimbe, M. Garcia, O. Lalude, J. Thomas, and R. Shekhar. Quantitative real-time three-dimensional stress echocardiography: A preliminary investigation of feasibility and efectiveness. *J. Am. Soc. Echocardiography*, 20(1):13-22, 2007. In an embodiment, the reverse transformation is then applied to the template wire mesh segmentation to arrive at an ED initial segmentation for each plurality. In an embodiment, this segmentation is refined iteratively towards the endocardial boundary by means of mesh smoothness constraints and gradient-based image forces. In an embodiment, this process is then repeated throughout the cardiac cycle for each of the rest and stress pluralities. In this formulation, there is no direct link between the rest and stress segmentations for each corresponding frame in the cardiac cycle other than the temporal alignment.

In another embodiment, a direct relationship between the rest and stress segmentations is developed and then can be used to predict stress segmentations (which can be used as priors for another segmentation technique) given the rest segmentations for another heart. Using one or more of the interpolation methods described above, landmark positions for rest and stress can be found for each of a plurality of timepoints within the cardiac cycle of the heart. In a particular embodiment, 2D rest and stress landmarks are identified in 2-CV images from the ED to ES part of the cardiac cycle. In an embodiment, as further described below, a multivariate regression model, such as CCA, is used to build a model using training datasets. This model can then be applied to predict stress segmentations, given the rest segmentations for the cardiac cycle from ED to ES, for another stress echocardiography dataset not used in developing the model.

Multiple regression analysis is a technique that allows one to predict the value of a (dependent) output variable given a set of (independent) input variables because the output is described as a linear function of the input variables. CCA however, is an example of a multivariate regression model that allows the formulation of a linear relationship between multiple input and multiple output variables. Unlike multiple regression where one variable is predicted using the model, a multivariate model predicts multiple output variables from multiple input variables.

In an embodiment of the subject invention, CCA or another multivariate regression model is applied to the problem of LV segmentation. In an embodiment, the relationship between rest and stress segmentations is modeled using the principle of conservation of energy at each of a plurality of corresponding timepoints, t, in the cardiac cycle. In an embodiment, the internal strain energy (in the heart tissue) at stress. $S_{stress}$, is internal assumed to be the same as the internal strain energy at rest, $S_{rest\_}$, plus some additional work energy, W, required to meet the extra demand on the heart when stressed:

$$S_{stress,t} = S_{rest,t} + W_t. \tag{1.22}$$

The internal strain energy of a body is defined as the internal work done in deforming it by the action of externally applied forces. In the simplest sense, the change in internal energy ΔS is given by:

$$\Delta S = F \Delta u, \tag{1.23}$$

where F is the external force and Δu is the displacement resulting from deformation. However, this assumes a constant force is acting on the endocardial surface which is not typically the case throughout the cardiac cycle. In an embodiment, a linear elastic model is assumed for the myocardium which results in a linearly increasing force/displacement relationship. Consequently, the internal energy, S, is given by:

$$\Delta S = \frac{1}{2} \Delta F \Delta u. \tag{1.24}$$

In either case, the internal strain energy is assumed to be proportional to the deformation displacement resulting from the external force.

In an embodiment, rest and stress displacements for seven landmarks on the endocardial boundary are identified for corresponding timepoints in the cardiac cycle using one or more of the methods discussed above. Equation 1.22 can be rewritten for a timepoint t in terms of these displacements as:

$$\sum_{n=1}^{landmarks} (c_{n,t} \Delta x_{n,t}^{stressed} + d_{n,t} \Delta y_{n,t}^{stressed}) = \qquad (1.25)$$

$$\sum_{n=1}^{landmarks} (a_{n,t} \Delta x_{n,t}^{rest} + b_{n,t} \Delta y_{n,t}^{rest}) + W_t,$$

where a, b, c and d are the coefficients to be deduced, Δx and Δy are the displacements (relative to the position in the 'Q' phase) in the short and long axes of the heart respectively, and W is the additional work energy. In an embodiment, CCA, or another multivariate regression model, is used to compute the coefficients, a, b, c and d that result in a optimal linear relationship (in terms of cross-covariance) as described by equation 1.25. In an embodiment, CCA, or another multivariate regression model, is also used to compute the energy term, W. In an embodiment, the data matrices are defined such that each column represents a variable or measure, and for the rest and stress internal strain terms in equation 1.25, this variable is the displacement. In an embodiment, the difference between the rest and stress percentage maximum heart rate (Δ% MHR) is used for the energy term, W. MHR is defined in the art as the highest number of times a heart can contract in one minute and can be calculated using one of a few well-known equations. In an embodiment, the equation MHR=220−age is used. Other equations can be used as discussed above. For any HR, % MHR can be defined as:

$$\% \, MHR = \frac{HR}{MHR} \qquad (1.26)$$

$$\Delta\% \, MHR = \% \, MHR_{stress} - \% \, MHR_{rest}.$$

In an embodiment, conservation of energy is used as a means of predicting the stress landmark positions given the rest landmark positions by means of CCA, or another multivariate regression model, to model the behaviour at each corresponding timepoint, t.

In an embodiment, the multivariate regression model is implemented using vector representations of the long axis (y) and short axis (x) positions of the landmarks relative to the position in the 'Q' phase. By considering relative positions, differences in US probe positioning that affect the development of the model, are minimised. In an embodiment, for any timepoint in the cardiac cycle, the rest (input) data matrix, X, is defined as a matrix of dimension m×n containing m dataset representations of the positions and the level of stress measure: $[x_1 \, x_2 \ldots x_n \, y_1 \, y_2 \ldots y_n \, \Delta\% \, MHR]_{rest,t}$. Similarly, the stress (output) data matrix, Y, is defined as matrix of dimension m×(n−1) containing m representations of the positions only: $[x_1 \, x_2 \ldots x_n \, y_1 \, y_2 \ldots y_n]_{stress,t}$. In an embodiment, once the model is developed for linking the rest and stress datasets, it is then possible to use equation 1.21 to predict the stress landmark positions given the rest landmark positions for another stress echocardiography dataset which has not been included in the model.

In an embodiment, as shown in FIG. 15(b), two or more phases in the cardiac cycle are assigned integer time values when carrying out the temporal alignment. In an embodiment, the relationship between rest and stress is studied at every 0.5 time units on the temporally aligned scale i.e. at each of the 'Q', 'R', 'S', and 'T' phases and also midway in between them. A more sparse or dense temporal model (e.g. at intervals of every 1 or 0.25 time units) can also be used. In an embodiment, landmark positions at each of the required timepoints are interpolated from the rest and stress images, using a natural cubic spline interpolation scheme or other interpolation method as discussed above. In an embodiment, the interval is chosen to ensure that when the stress landmark positions are predicted, there are enough points to plot these against time and infer the positions corresponding to each of the frames (which are not at studied timepoints) in the stress plurality of images. Pseudo-code for one embodiment of this method, using CCA, is given below:

```
for timepoint = 0.5 to 5 at 0.5 intervals do
    for all Corresponding rest/stress datasets do
        Interpolate landmark positions
        Get Δ%MHR values
    end for
    Run CCA on the input and output data matrices
    Interpolate the rest landmark positions for the rest/stress dataset to
    be predicted
    Compute the predicted stress landmark positions from the CCA model
end for
```

Figure 18:
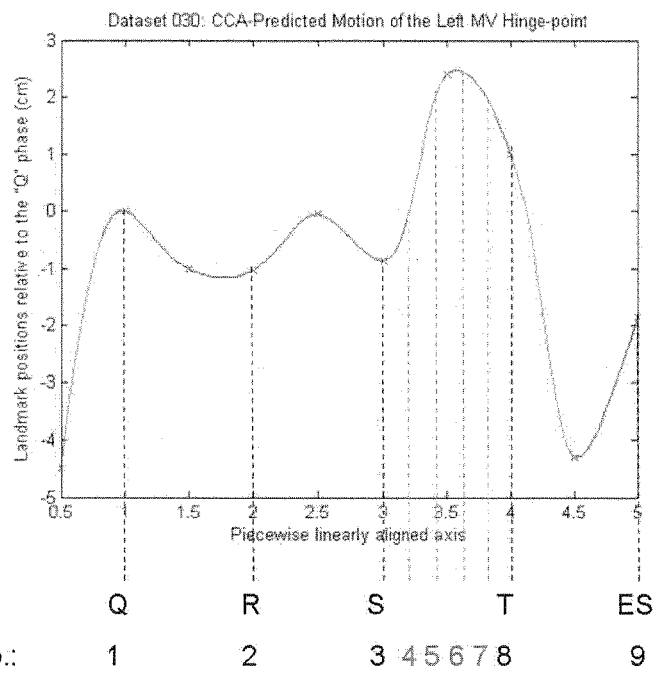
FIG. 18 shows plots of predicted stress motion for the left MV hinge-point. Frame numbers correspond to either exact phases or linearly aligned phases where interpolation is used to compute landmark positions at stress frames in accordance with embodiments of the subject invention.
Figure 18:
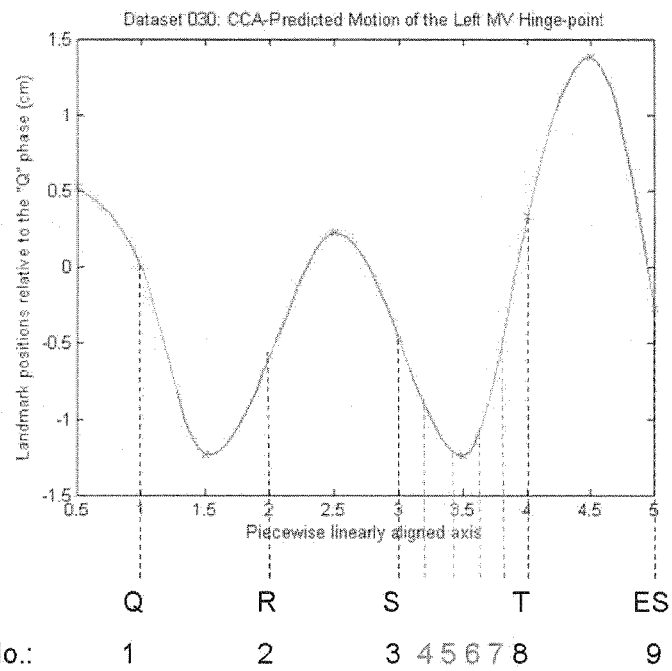

The output from this embodiment is stress landmark positions at every 0.5 time units on the temporally aligned scale. In an embodiment, these timepoints do not correspond exactly to the frames in the stress plurality of images. In an embodiment, therefore, the landmark positions at the frame timepoints are interpolated using a natural cubic spline or other interpolation technique. In embodiment, the positions at the studied time values are plotted against the temporally aligned scale, and then by using the aligned scale values assigned to all the stress frames, the landmark positions at these frames are interpolated (see FIG. 18). In an embodiment, the predicted landmark positions are connected using periodic cubic spline curves.

Figure 19:
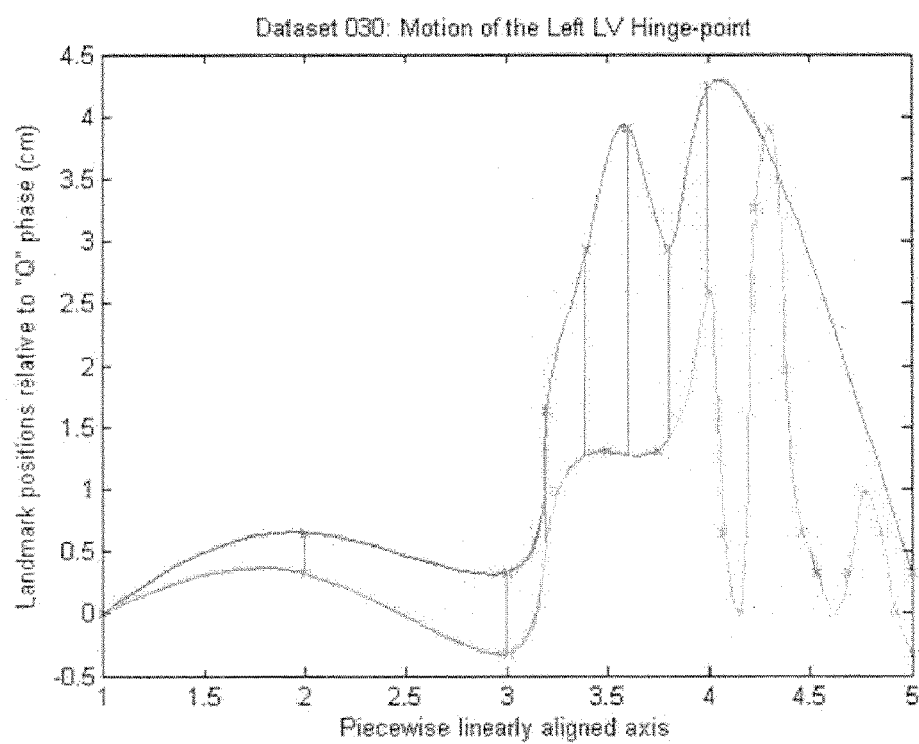
FIG. 19 shows plots of motion in the short axis for the left MV hinge-point for the rest and stress datasets, against the temporally aligned axis. The vertical lines represent stress frame timepoints which are used to interpolate the rest-derived landmark positions in accordance with embodiments of the subject invention.

As a comparative experiment, rest-derived stress landmark positions are compared to rest landmark positions in FIG. 19. The rest landmark positions at each of the studied time values in the cardiac cycle can be interpolated. If the stress datasets were simply a faster version of the rest datasets, the rest-derived landmark positions should follow the true positions very well. However, if the motion at stress consists of (additional) more complex dynamics than at rest, then the rest-derived landmark positions will not be able to follow the true positions as precisely because they are not derived from modelling the changes between rest and stress. This can already be seen in FIG. 19 where the aligned rest and stress curves look very different after the 'S' phase (corresponding to time value 3 on the aligned axis). Embodiments of the subject invention are therefore likely to give comparatively better results because they model the additional dynamics present in stress.

A Gradient Vector Flow (GVF) snakes segmentation algorithm, as proposed in C. Xu, D. L. Pham, and J. L. Prince. Chapter 3: image segmentation using deformable models. *SPIE Handbook on Medical Imaging*, Volume III: Medical Image Analysis:129-174, 2000, was applied to show how the final segmentations compare to when the segmentation for frame n−1 is used as a prior for frame n and also when the rest-derived priors are used instead. GVF snakes segmentation is an edge-based formulation where an edge map is derived from the image to be segmented. The GVF forces are computed by applying generalised diffusion equations to both components of the gradient of the edge map image. This diffusion means that the even if priors are far from the object boundary, they are still drawn toward the edges defined by the edge map. The governing equations with regards to internal (smoothness) and external GVF (image-driven) forces are as shown by Xu et al. in C. Xu and J. L. Prince. Generalized_gradient vector flow external forces for active contours. *Signal Processing*, 71:131-139, 1998 and the energy functional to be minimised is:

$$E = \int_0^1 \frac{1}{2}(\alpha|x'(s)|^2 + \beta|x''(s)|^2 + E_{ext}(x(s))ds, \quad (1.27)$$

where the snake is the curve $x(s)=[x(s),y(s)]$, $s\in[0, 1]$. The weighting parameters, $\alpha$ and $\beta$, control the tension and rigidity of the snake respectively, and $x'(s)$ and $x''(s)$ are the first and second derivatives of $x(s)$ with respect to s. The $E_{ext}(x(s))$ is based on the GVF forces for the snake. In an embodiment, segmentations derived from one or more methods described above are used as a starting point for snakes segmentation.

Figure 20:
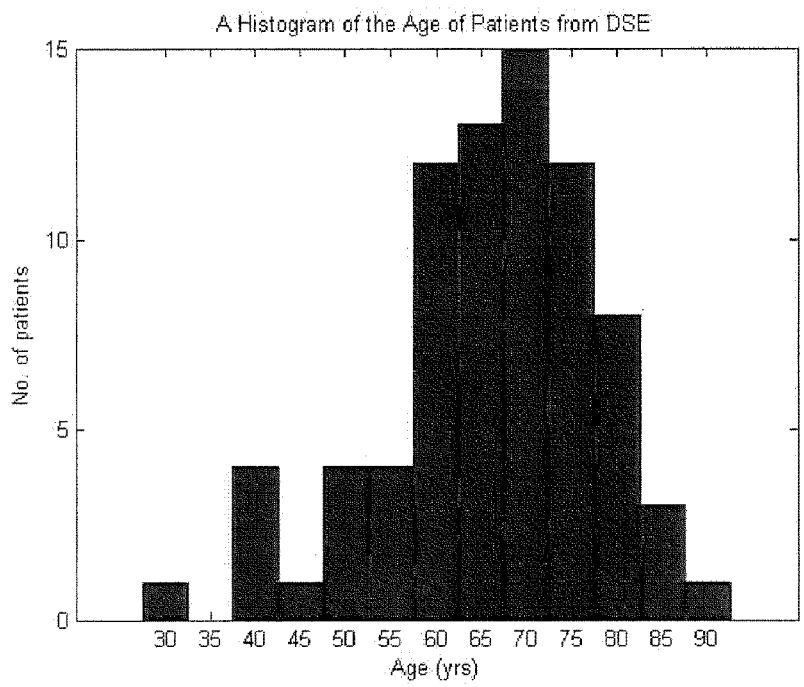
FIG. 20 shows the age distribution of the subjects used in this study in accordance with embodiments of the subject invention.

Embodiments of the subject invention were tested on a database consisting of 78 normal (no apparent abnormalities in the heart motion) dobutamine stress echocardiography (DSE) studies for which ethics approval had been obtained. The data was acquired by two cardiologists as standard B-mode US rest-stress image sequences from ED to ES in 2D for the 2-CV using Sonos7500 or iE33 echocardiography systems. Typical special resolutions are 3.6 mm×3.6 mm and temporal resolutions of 73 ms. The age distribution for the studies is shown in FIG. 20 which shows that the majority of subjects are quite elderly. Cardiologists generally attempt to acquire data for rest and then at peak stress (with a target HR (THR) of 85% of the MHR). This is not always possible to achieve with the sick and elderly for whom it may be difficult or uncomfortable at such a stress level therefore not all datasets are at rest and peak stress. This is one reason for including the Δ% MHR term in the model as it allows the model to account for this variability factor. Although the test was limited to 2D datasets, embodiments of the subject invention can be applied to 3D datasets as well.

The results presented here were obtained by developing a CCA model using a leave-one-out approach for training the model then predicting segmentations for the left-out dataset using the model. Other embodiments of the invention are possible as described above.

Figure 21:
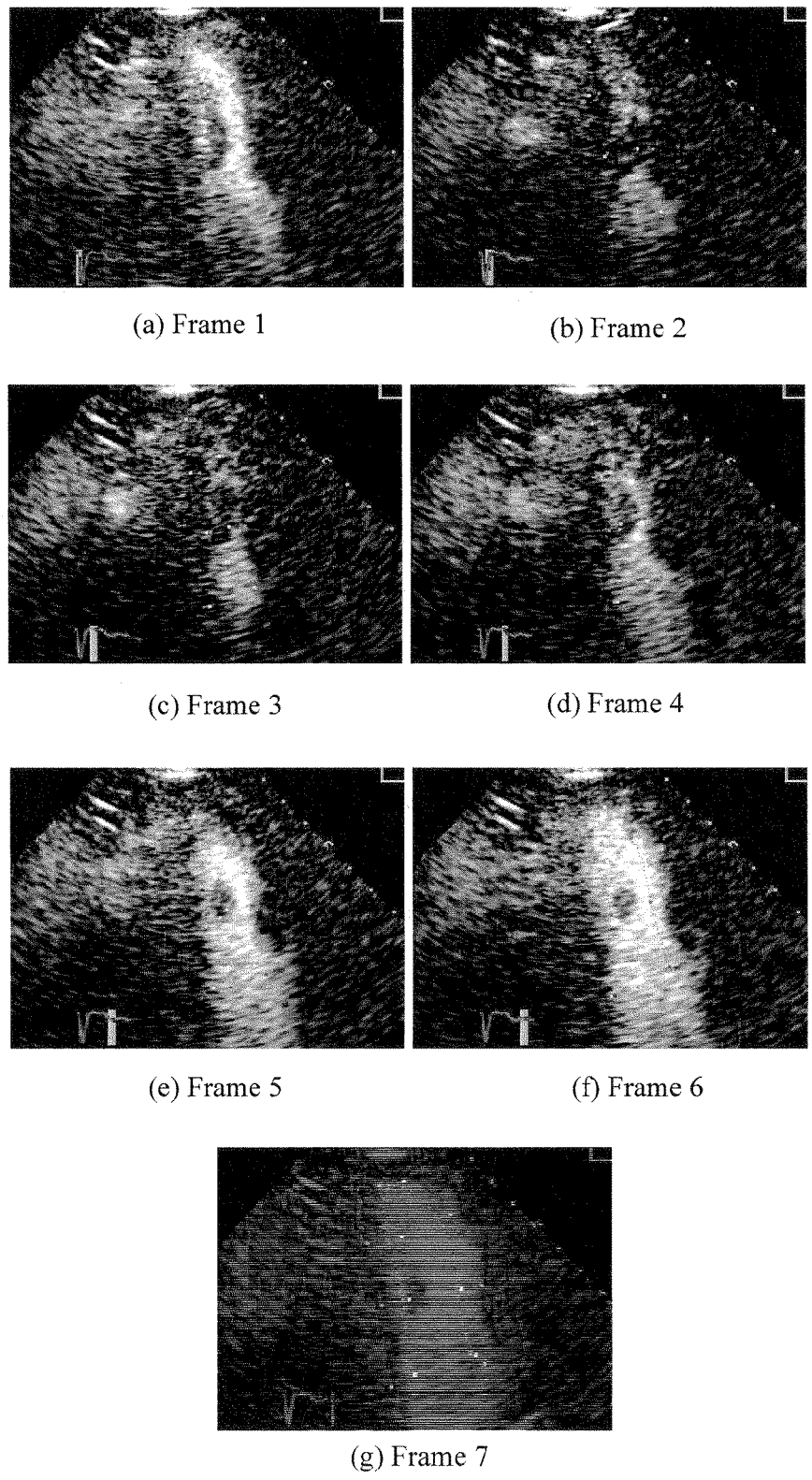
FIG. 21 shows prior segmentations for stress frames from ED to ES showing CCA-derived, rest derived and the true landmark positions in accordance with embodiments of the subject invention.

FIG. 21 shows the results for all of the stress frames of one dataset. The red points are the landmarks identified by the CCA model and have been connected using a natural cubic spline to illustrate the resulting prior segmentation. The yellow points are the rest-derived landmark positions and the green points are the 'true' landmark positions as marked out manually and validated by two expert cardiologists. The results show that the CCA-derived landmarks from this embodiment follow the true landmarks better than the rest-derived landmark positions, particularly from Frame 1 to Frame 5 when the heart is contracting. The last two frames are the recovery frames where the LV is returning to the more relaxed ES phase, and the motion between time-frames is particularly large. The CCA model appears to underestimate the motion and therefore cannot follow the true landmarks as well as before. This effect was observed for most of the left-out datasets and is mainly due to the model formulation and the training data characteristics i.e. the model will only follow the data as well as the training dataset is representative of it. Despite the level of stress having been included in the work energy term, in this embodiment, it was not included with the deformation terms in Equation 1.25 therefore rest-stress datasets where the heart was not at peak stress cause an underestimation of the predicted landmark motion in the peak stress datasets.

It is possible to assess how strong the developed input/output (or rest/stress) relationship is by plotting the Right-Hand Side (RHS) against the Left-Hand Side (LHS) of Equation 1.25 for each of the datasets. This can be done for all the eigenvalue/eigenvector components of the CCA model, but the largest component (i.e. the model coefficients corresponding to the largest eigenvalue) accounts for the most variation in the data. If the coefficients were to exactly define the relationship with no errors, the RHS of the equation would equal the LHS of the equation resulting in all rest/stress datapoints lying along the y=x line. The correlation coefficient, r, indicates the strength (and direction) of the relationship between two variables. r=±1 represents a perfect positive or negative linear relationship and r=0 represents no linear relationship (but does not rule out the possibility of a non-linear relationship or even clusters of data).

Figure 22:
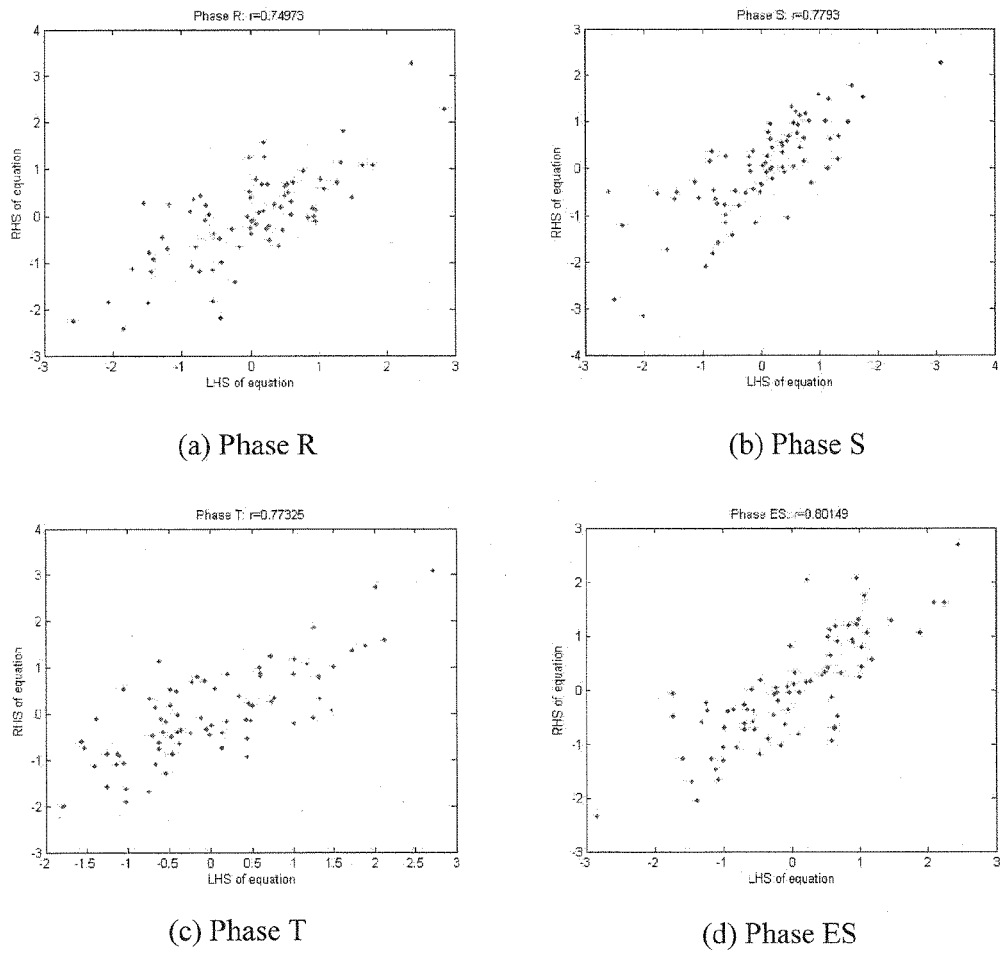
FIG. 22 shows correlations for the LHS and RHS Equation 1.25 at each ECG phase in accordance with embodiments of the subject invention.

The correlation coefficients for all the components of the CCA model are given by the elements of the diagonal matrix, D), as in Equation 1.21. FIG. 22 shows a plot of the RHS against the LHS of Equation 1.25 for the largest component of the CCA model at each phase of the cardiac cycle. The correlation coefficients are also shown. A significance test was also carried out to decide whether or not to reject the null hypothesis, $H_0$: no linear relationship, i.e. r=0. The t-test is commonly performed in assessing the significance of correlation coefficients and the t-statistic is defined as:

$$t = r\sqrt{\frac{n-2}{1-r^2}}, \quad (1.28)$$

TABLE 1.1

The t-statistic values for each of the cardiac phases

| Phase | R | S | T | ES |
|---|---|---|---|---|
| R | 0.74973 | 0.77930 | 0.77325 | 0.80149 |
| t- statistic | 9.8117 | 10.770 | 10.561 | 11.607 |

TABLE 1.2

A table showing the percentage points for the t-distribution for 28 degrees of freedom

| | % | | | | | | | | |
|---|---|---|---|---|---|---|---|---|---|
| | 20 | 15 | 10 | 5 | 2.5 | 1 | 0.5 | 0.1 | 0.05 |
| % Points | 0.8546 | 1.056 | 1.313 | 1.701 | 2.048 | 2.467 | 2.763 | 3.408 | 3.674 | where n is the number of datasets. 77 rest-stress training datasets were used to build the model therefore n=77, and the r-values are as shown on the plots. For each of the cardiac phases, the t-statistics have been summarised in Table 1.1. In the tested embodiment, with 28 degrees of freedom for 7 landmarks as described in Equation 1.25, the levels of significance for a one-tailed test are given in Table 1.2. Since all t-statistic values in Table 1.1 exceed the critical values from Table 1.2, the null hypothesis, $H_0$, can be rejected.

In conclusion, a strong correlation between the rest and stress energy conservation formulation was observed which is why the correlation coefficients were high. The t-statistics show that the correlation coefficients are sufficiently high to disprove the null hypothesis, $H_0$. Thus, a strong linear relationship exists between the rest and stress energies as described by Equation 1.25.

Figure 23:
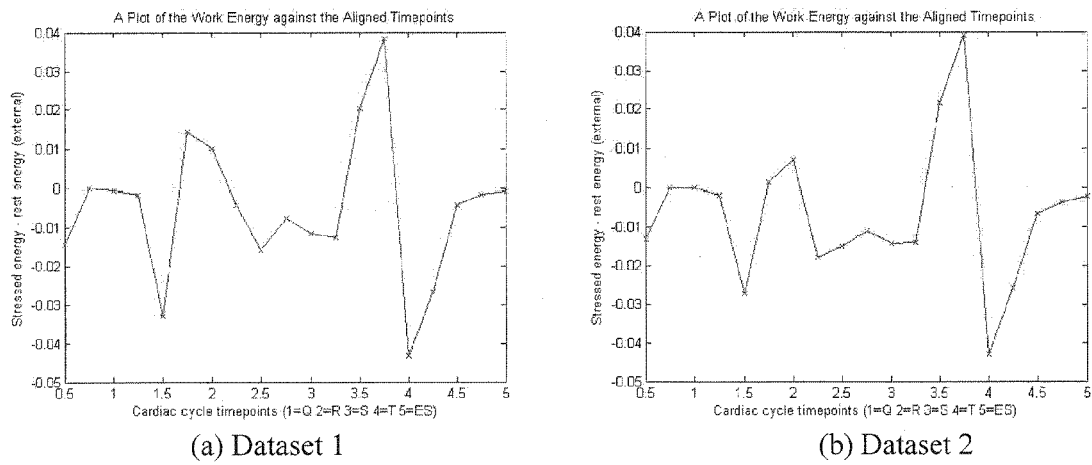
FIG. 23 shows the work energy term (the difference between the rest and stress external energies) for the cardiac cycle for ED to ES in accordance with embodiments of the subject invention.

FIG. 23 shows how the work energy term from Equation 1.25 varies temporally within the ED to ES part of the cardiac cycle for two different datasets, the first of which corresponds to the results shown in FIG. 21. The things to note here are the main dips and peaks; the first occurs just before the 'R' phase i.e. the peak of the ECG signal. In terms of the cardiac cycle, this is when the LV volume is high and although the LV pressure is low, it is about to very quickly start increasing as the LV is preparing to contract. The dip in energy difference here shows that there is a delay in the start of the contraction in stress compared to at rest. Once the contraction starts in stress however, the work energy plot peaks as more energy is required for the more powerful contraction in stress. The other interesting area in the plots is the large peak followed by an equally large dip near the 'T' phase. This peak corresponds to the point of highest LV pressure and when blood is leaving the LV fastest. In the stress case, due to the increased HR, the rate at which blood leaves is higher than in the rest case therefore the difference in energy peaks here. Following this powerful contraction, the LV goes back to its more relaxed state quicker in the stress case than in the rest case hence the dip in energy.

These results show that there is a strong qualitative link between the work energy term and what happens in the cardiac cycle at stress compared to at rest. The extra work energy term is another reason why the prior segmentation results from using the CCA model are better than the rest-derived ones, because it accounts for the energy differences between rest and stress which are not included in the deformation-based energy terms in Equation 1.25.

Figure 24:
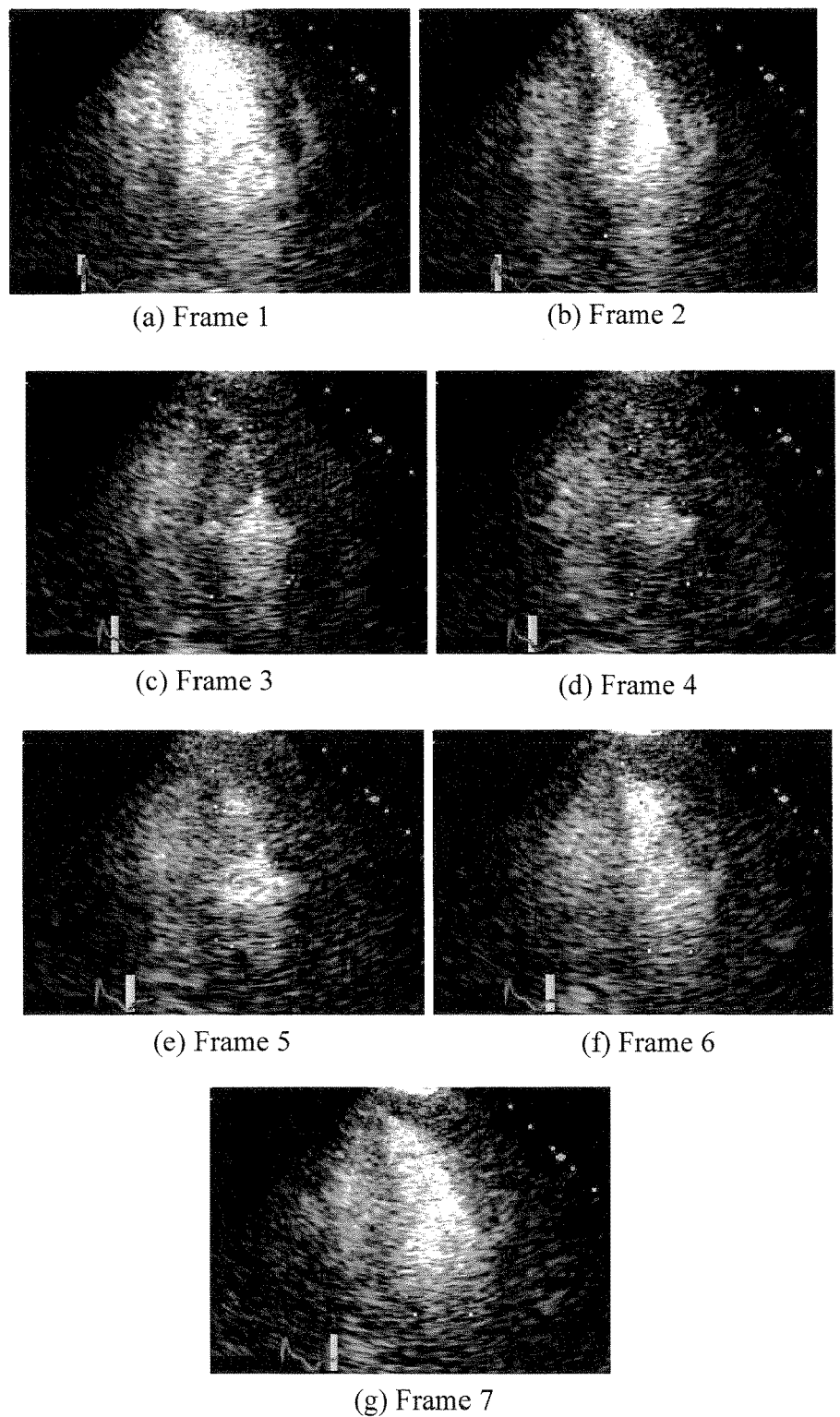
FIG. 24 shows prior segmentations for stress frames from ED to ES showing CCA-derived, rest derived and the true landmark positions in accordance with embodiments of the subject invention.
Figure 25:
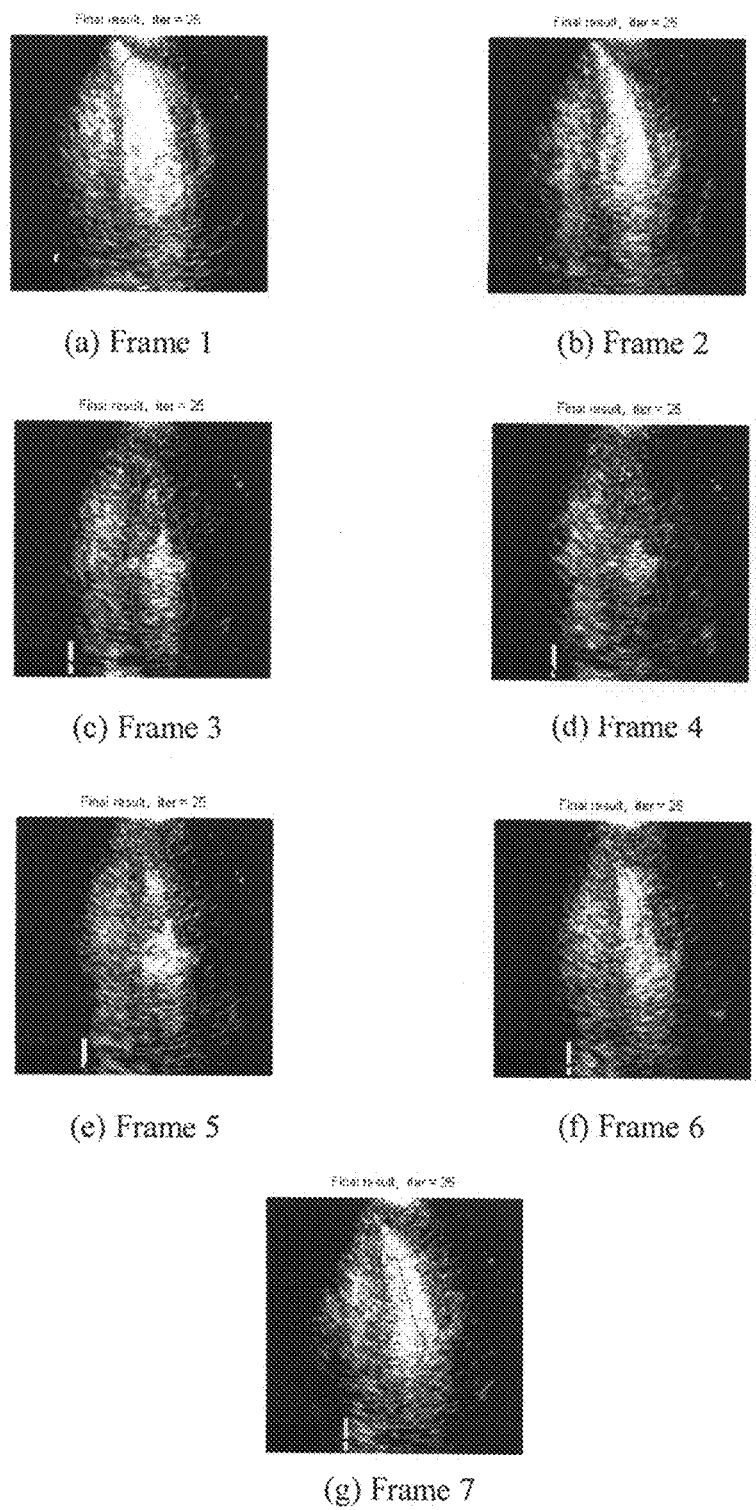
FIG. 25 shows GVF snakes segmentations for stress frames from ED to ES for CCA-derived priors and true manual segmentations in accordance with embodiments of the subject invention.
Figure 26:
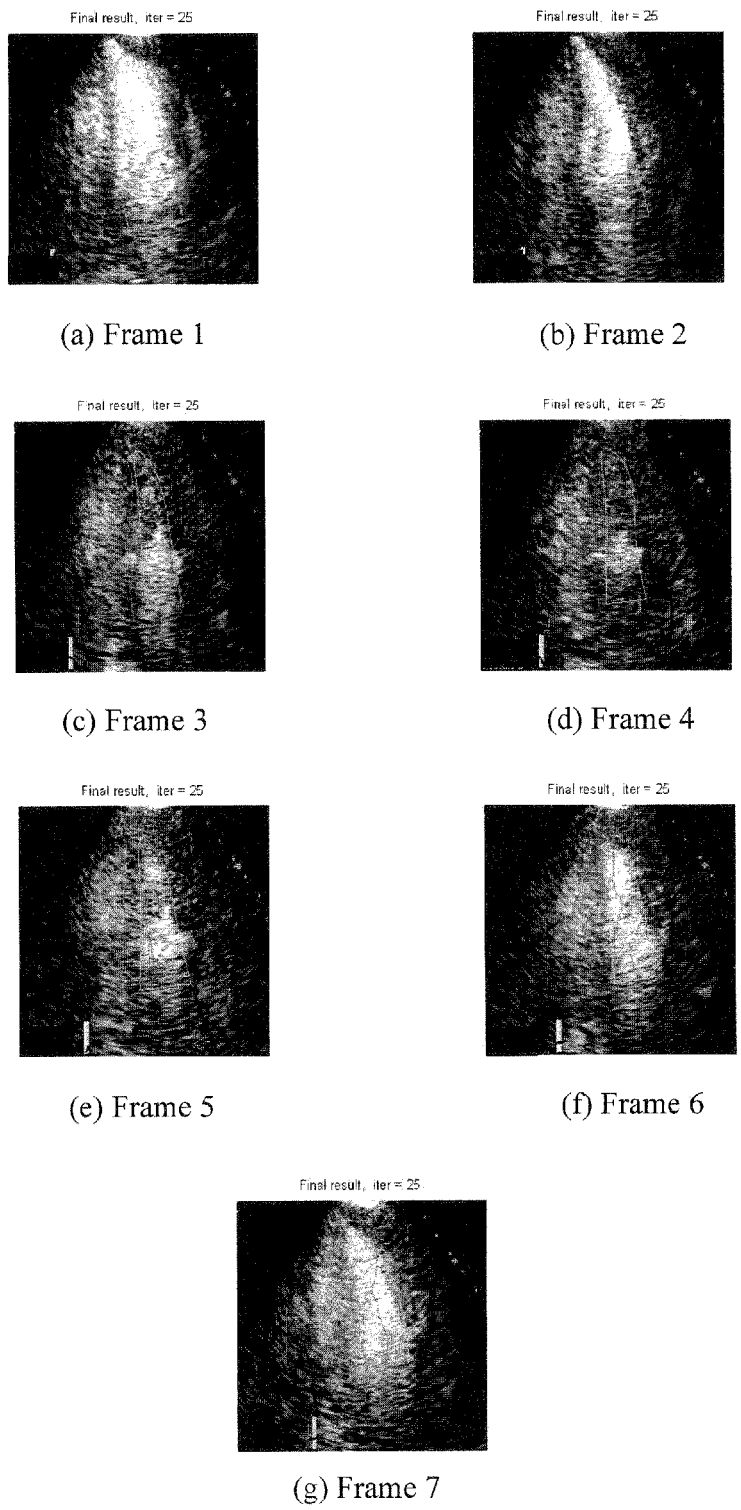
FIG. 26 shows GVF snakes segmentations for stress frames from ED to ES for rest-derived priors and true manual segmentations in accordance with embodiments of the subject invention.
Figure 27:
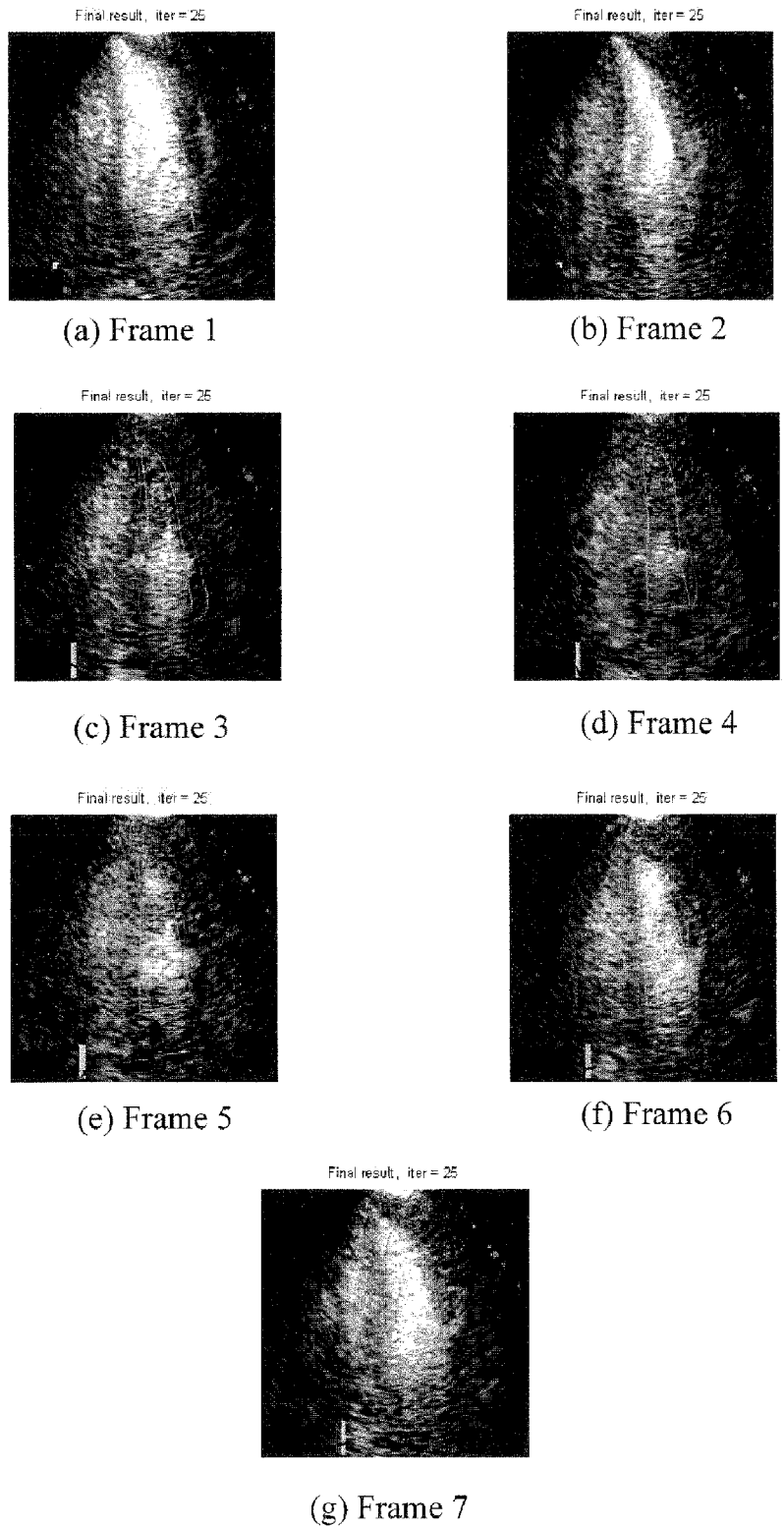
FIG. 27 shows GVF snakes segmentations for stress frames from ED to ES for previous frame manual segmentations as priors and true manual segmentations in accordance with embodiments of the subject invention.

The CCA priors shown in FIG. 21 match the true segmentation very well, particularly for the first 5 frames of the stress dataset. However, the CCA priors were not as precise for all datasets which is why our method is more useful for computing segmentation priors and not the final LV segmentations. FIG. 24 shows the priors for another dataset where although the CCA priors are still better than the rest-derived priors, they do not match the true segmentations as well as shown previously. The GVF-based snakes segmentation was carried out at each frame of this dataset using CCA priors, rest-derived priors, and the true segmentation from the previous frame as priors. The results for this are shown in FIGS. 25-27. The settings for the GVF-based snakes were $\{\alpha=3, \beta=0, \kappa=0.6\}$ which define the snake's tension, rigidity and the weighting, respectively, for the external forces.

The results in FIG. 25 show that the CCA-derived segmentation priors provide a very good starting point for snakes segmentation and the final segmentations are therefore much better than using the rest-derived priors. When compared to using the previous frame's manual segmentation as a prior (see FIG. 27), the segmentations resulting from CCA-derived priors are poorer in the last two frames because the priors are also not as good in these frames. The previous frame priors are the manual segmentations of the previous frame i.e. the best case scenario is used whereby we assume that for any frame the true segmentation is found before using this as a prior for the next frame. This is often not the case if boundaries are unclear such as in US images so errors tend to accumulate as they are passed along in the frames. In reality therefore, segmentations are likely to get worse further from the starting frame. In terms of consistency, it appears that CCA-derived priors are better as they are independent of previous frames and are based on a motion model that can potentially provide very accurate priors.

The accuracy of the predicted segmentations were analyzed by looking at false positive (Type I) and false negative (Type II) error rates in terms of pixel assignment. False positive and false negative errors were identified by comparing the predicted segmentations to delineations of the LV verified by experts. If a positive instance is defined as a pixel being labeled part of the LV, then a false positive error is when a pixel is incorrectly labeled part of the LV when in fact it is not part of the LV. The converse is true for false negatives. The false positive rate, $\alpha$, and the false negative rate, $\beta$, are defined as follows:

$$\alpha = \frac{\text{Number of false positives}}{\text{Total number of negative instances}} \quad (1.29)$$

$$\beta = \frac{\text{Number of false negatives}}{\text{Total number of positive instances}}.$$

and are related to specificity and sensitivity by: specificity=$1-\alpha$; sensitivity=$1-\beta$. An overall measure (to be minimised), which takes into account both the sensitivity and specificity, is a weighted sum of the error rates, $\hat{e}$, defined as: $\hat{e}=e_1\alpha+e_2\beta$ where $e_1+e_2=1$ and $0\leq\hat{e}\leq1$.

Figure 28:
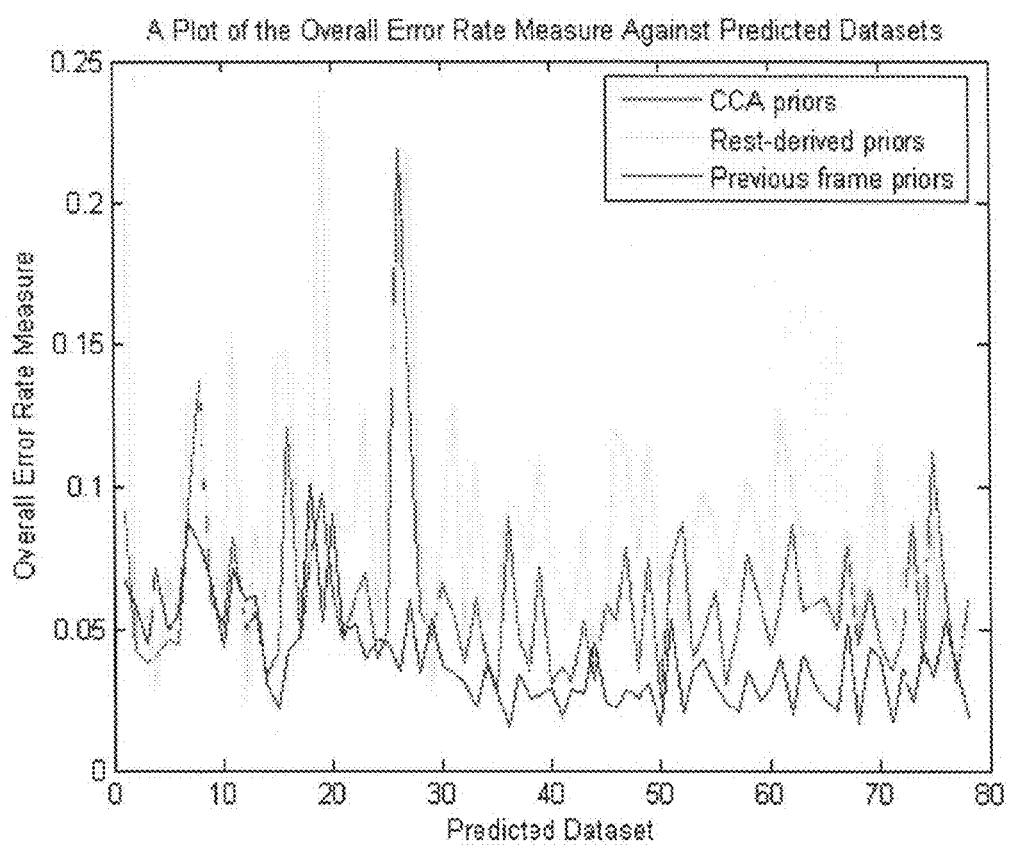
FIG. 28 shows the error rate measure, ê, plotted against the predicted dataset in a leave-one-out approach for CCA, rest-derived and previous frame priors in accordance with embodiments of the subject invention.

There is generally a trade-off between sensitivity and specificity depending on the application. In disease diagnosis for example, where a positive instance is defined as a patient having the disease/condition, it is acceptable to have a lower specificity provided there is very high sensitivity i.e. it is better to have fewer false negatives than fewer false positives. When comparing the $\hat{e}$ values of different techniques for disease diagnosis, $e_1$ would be set to a smaller value than $e_2$ such that greater emphasis is placed on minimising false negatives than false positives. In the case of LV segmentation, it is equally important to minimise false positive and false negatives therefore in this study $e_1=e_2=0.5$. FIG. 28 shows a plot of the $\hat{e}$ values for all the datasets when the prior segmentations for each were predicted in a leave-one-out approach. These validation results show that the CCA model performs significantly better than the rest-derived model in minimising both Type I and Type II error rates. The results are comparable to the best case previous frame priors (i.e. where one assumes that the true segmentation of a frame is found before being passed as a prior segmentation for the next frame). This makes the CCA model a very useful tool in defining segmentation priors, particularly as it is faster to run and it gives the prior segmentations for all frames in one go, rather than being heavily dependent on the full segmentation of one frame being completed before considering the next.

It is evident from the use of the CCA-derived priors in snakes segmentation that the methodology provides a very good global prior, defined primarily by seven landmarks. It is because of this definition by landmarks that the algorithm takes seconds to apply to a new dataset once the model has been built. Model computation time is dependent on the number of datasets used in developing it and is typically one second per dataset which is also computationally inexpensive. As discussed above, the methodology can be easily extended to 3D stress echocardiography datasets whereby corresponding meshpoints or landmarks that define a 3D surface can be used to build the model.

In an embodiment of the subject invention, a rest image of a subject is linked to a stressed image of the subject. This relationship can be accomplished as described above. In a further embodiment, information derived from the rest image is then used to refine a feature in the stressed image. In a particular embodiment, segmentation of the stress image is refined. In an embodiment, image texture information near a segmentation of the rest image is used to refine the segmentation of the stressed image. In a particular embodiment, the rest image is identified in a plurality of ultrasound images of a heart in a rest condition and the stressed image is identified in a plurality of ultrasound images of the heart in a stressed condition.

In an embodiment, the output from a CCA model, or other methodology described above, provides the prior boundaries for the LV for the sequence of images from ED to ES. In an embodiment, the priors follow the true LV boundaries well but because they are defined solely by the seven landmarks, they cannot follow the more local variations in the boundary. Consequently, in an embodiment, an update step is applied to follow the CCA model predict step. In an embodiment, the update step incorporates the image-derived information from a linked rest image. In an embodiment, the update step is applied to boundaries or other feature priors derived by other means. In an embodiment, the update step is based on the fact that rest data can provide reference parameter estimation for the characteristics of the endocardial boundary for the stress data. In an embodiment, the update step can overcome some of the system dependent effects of the data acquisition when the rest and stress images are acquired in the same session. In an embodiment, texture or other rest image-derived information around the rest endocardial boundary is used as a basis for texture or other stressed image-derived information expected around the stress endocardial boundary. In an embodiment, the best match is found through a maximum likelihood estimation which identifies the most likely correspondence on the stress boundary given the texture or other rest image-derived information on the rest boundary.

Figure 29:
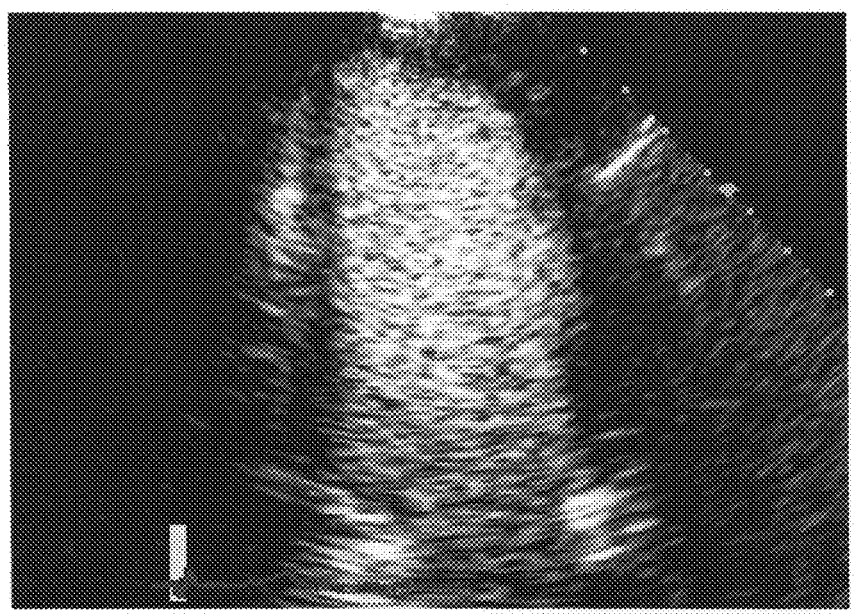
FIG. 29 shows endocardial boundaries in corresponding rest and stress frames in accordance with embodiments of the subject invention.
Figure 29:
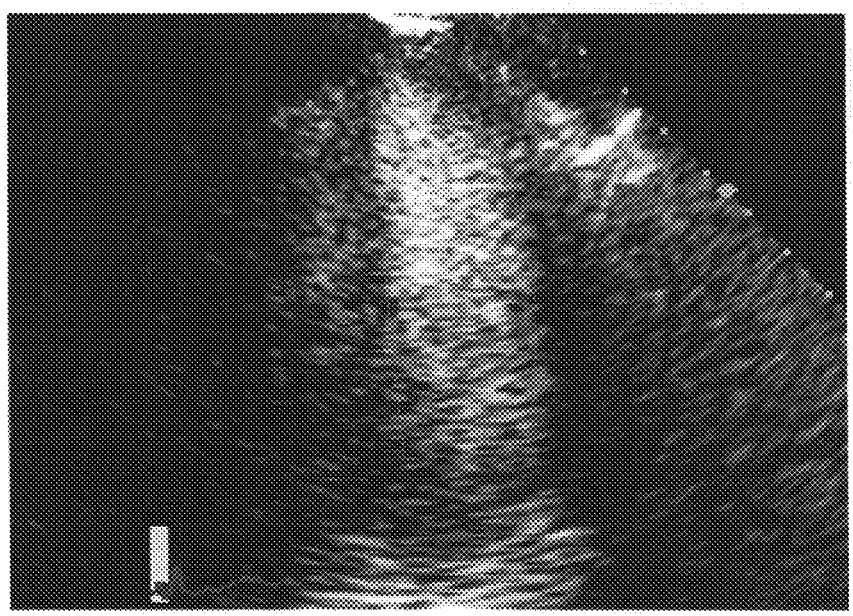

The speckle distribution observed for one subject throughout a stress echocardiography session is likely to be similar for rest and stress, therefore, in an embodiment, properties such as grey-level distributions and textures within rest are used as prior information to aid segmentation in the stress case. In an embodiment, a technique called speckle tracking is used, which is typically used between consecutive frames, to link the textures around the endocardial boundary within corresponding rest and stress frames. Generally, texture-based features at corresponding points along the endocardial boundary in rest and stress should be similar because the surrounding tissue is the same, but in a different state. FIG. 29 shows that the appearance of the endocardial boundary in rest closely resembles the appearance in stress in terms of pixel intensities for the same subject. The myocardium is a dark band around the blood pool and regions around the marked boundary near structures such as the mitral valve hinge-points and papillary muscles look similar in rest and stress.

Figure 30:
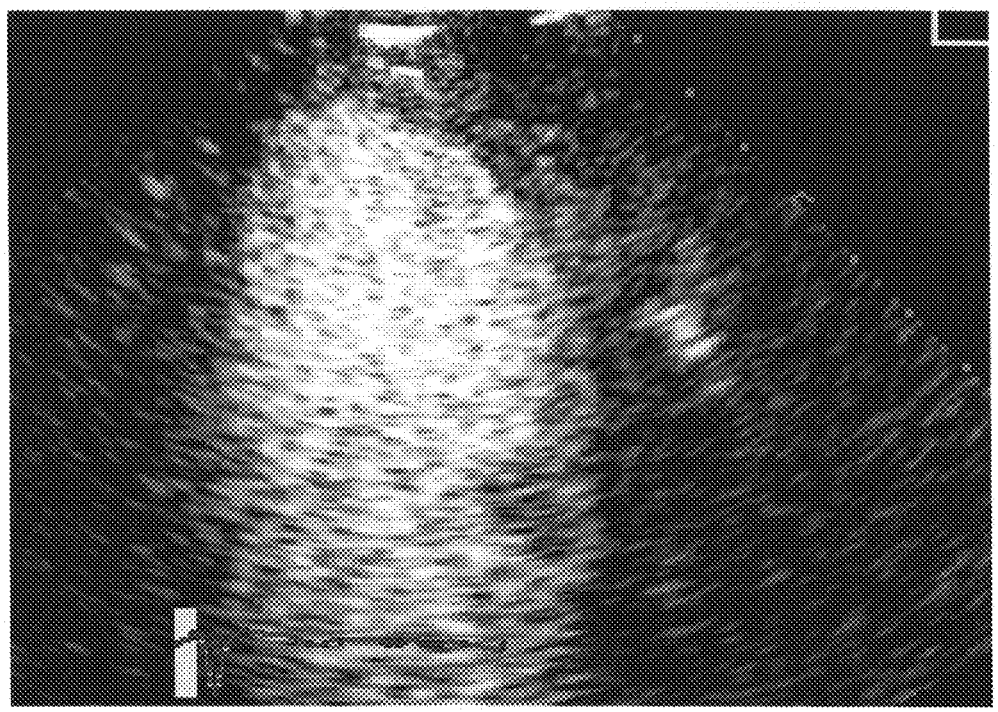
FIG. 30 shows a long-axis view of the LV in accordance with embodiments of the subject invention.

In US imaging, scatter is caused by small imperfections or scatterers within a tissue, which result in reflection and refraction of the sound wave. The result is a random, deterministic, interference pattern which decreases the image quality i.e. signal to noise level, by creating speckle in the tissue and blurring impedance boundaries as shown for the LV in FIG. 30. The scatterer density determines the statistics of the speckle, and in the case of fully developed speckle, it is assumed that the majority of the randomly located scatterers follow a Rayleigh distribution. Different statistical models may be considered in cases where the speckle is not assumed to be fully developed. Speckle tracking is one of the methods applied to B-mode US images when carrying out motion estimation. It works on the basis that the movement of speckle can be tracked through a sequence of images by implementing region-based matching.

Strintzis and Kokkinidis [M. G. Strintzis and I. Kokkinidis. Maximum likelihood motion estimation in ultrasound image sequences. *IEEE Signal Processing Letters*, 4(6):156-157, 1997.] implemented speckle tracking as a block-matching motion estimation method where they introduced a maximum likelihood (ML) estimation technique to optimise the block-matching. They used matching probability density functions based on Rayleigh-distributed statistics for motion estimation and used the resulting motion fields to carry out motion compensation. They showed that this produced a greater signal-to-noise ratio when the images were reconstructed than if the probability density function had been Gaussian distributed. Yeung et al. [F. Yeung, S. F. Levinson, and K. J. Parker. Multi-level and motion modelbased ultasonic speckle tracking algorithms. *Ultrasound in Med. & Biol.*, 24(3): 427-441, 1998.] used a similar block-based algorithm but through a multi-level approach whereby large matching blocks and search window sizes were used for initialisation, and were iteratively made smaller to converge at a finer resolution for the final motion field.

In an embodiment, the coarse-to-fine technique has the advantage of reducing computation time because of the larger blocks used initially, it benefits from the immunity to noise associated with large matching blocks, and at the same time keeps the higher resolution of the motion field associated with small matching blocks.

The aforementioned classical block-matching algorithms are based on the fact that a noiseless reference image is available. Cohen and Dinstein [B. Cohen and I. Dinstein. New maximum likelihood motion estimation schemes for noisy ultrasound images. *Pattern Recog.*, 35:455-463, 2002.] have approached the speckle tracking in a similar way as Strintzis and Kokkinidis [M. G. Strintzis and I. Kokkinidis. Maximum likelihood motion estimation in ultrasound image sequences. *IEEE Signal Processing Letters*, 4(6):156-157, 1997.] but by assuming that each US image has an independent Rayleigh-distributed noise element, and taking into account that the displayed US images are log-compressed. They found that the resulting probability density function gave ML estimates of the motion that were significantly more accurate than using the probability density function described in [M. G. Strintzis and I. Kokkinidis. Maximum likelihood motion estimation in ultrasound image sequences. *IEEE Signal Processing Letters*, 4(6):156-157, 1997.].

Figure 31:
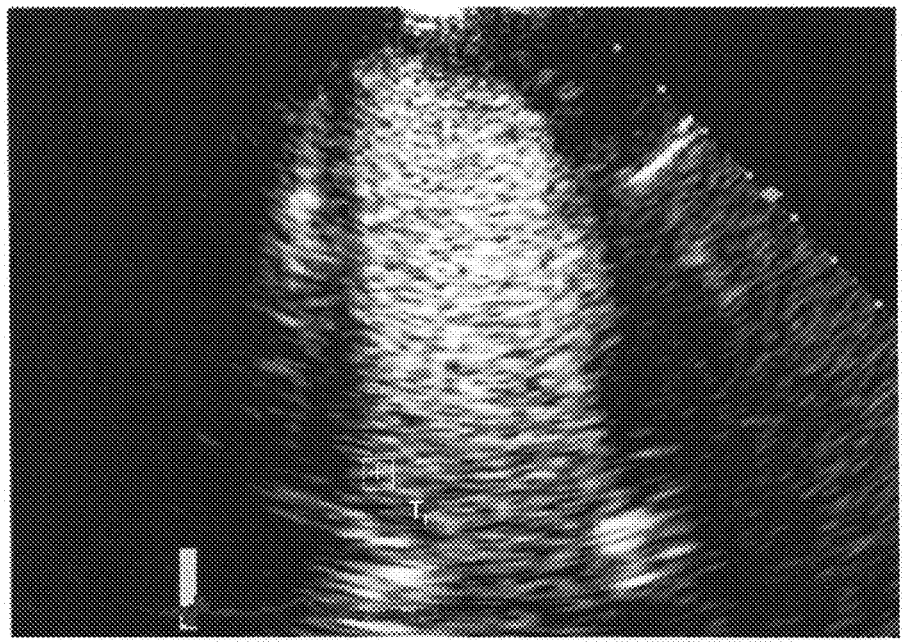
FIG. 31 shows block matching between rest and stress boundaries in accordance with embodiments of the subject invention.
Figure 31:
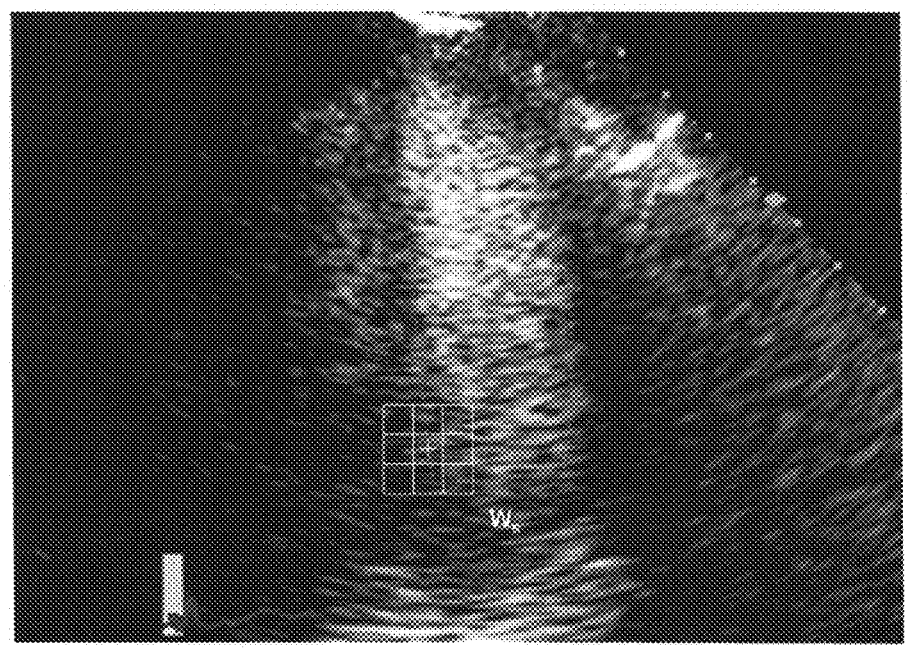

To date, speckle tracking has typically been used in motion estimation between consecutive frames. It considers speckle as a feature that is useful, unlike algorithms which may try to smoothe/filter it out. In embodiments, it is also fast to run computationally which makes speckle tracking based algorithms ideal for use in a clinical environment. In an embodiment of the subject invention, one or more speckle tracking methods described above are used between corresponding rest and stress frames from 2D stress echocardiography. In other embodiments, the concept is applied to 3D images. In an embodiment, a template block (or set) of pixels is centered at a point on the endocardial boundary in the rest frame, and the search window is centered at the corresponding point on the endocardial boundary in the corresponding stress frame (see FIG. 31). In other embodiments, as discussed above, the template or search window need not be centered on the point and/or the corresponding point. In an embodiment, the ML displacement estimate gives the location of the best rest-stress match on the stress boundary i.e. the update required to refine the prior endocardial boundary in the stress frame.

Various similarity measures can be used to measure the similarity of the pixel intensities in the template block and the overlapping part of the search window. In an embodiment, a similarity measure that accurately represents US image statistics is required. Standard block-matching for the purposes of motion estimation is often based on the $L_1$ and $L_2$ norms, where the matching criterion of sum of absolute differences (SAD) [C. Kontogeorgakis. M. G. Strintzis, N. Maglayeras, and I. Kokkinidis. Tumor detection in ultrasound b-mode images through motion estimation using a texture detection algorithm. *Proceedings* 1994 *Computer Cardiology Conference*, pages 117-120, 1994.; J. Crosby, B. H. Amundsen, T. Hergum, E. W. Remme, S. Langeland, and H. Torp. 3d speckle tracking for assessment of regional left ventricular function. *Ultrasound in Med. & Biol.*, 35(3):458-471, 2009.] and the sum of squared differences (SSD) [F. Yeung, S. F. Levinson, and K. J. Parker. Multi-level and motion model-based ultasonic speckle tracking algorithm. *Ultrasound in Med. & Biol.*, 24(3): 427-441, 1998.] between the luminance values of two blocks are used respectively. Normalised Cross Correlation (NCC) is also based on the $L_2$ norm where the normalisation is carried out by subtracting the mean and dividing by the standard deviation of each image. The normalised cross correlation for a template t(x,y) with a subimage i(x,y) is:

$$\frac{1}{n-1} \sum_{x,y} \frac{(t(x,y) - \bar{t})(i(x,y) - \bar{i})}{\sigma_t \sigma_i} \quad (2.1)$$

where n is the number of pixels in t(x,y) and i(x,y), $\bar{t}$ and $\bar{i}$ are the mean of the intensity values in t(x,y) and i(x,y) respectively, and $\sigma_t$ and $\sigma_i$ are the standard deviations of the intensity values in t(x,y) and i(x,y) respectively. If the numerator terms are redefined as:

$$I(x,y) = (i(x,y) - \bar{i}); T(x,y) = (t(x,y) - \bar{t}), \quad (2.2)$$

then the summation term in Equation 2.1 can be re-written as:

$$\left\langle \frac{I}{\|I\|}, \frac{T}{\|T\|} \right\rangle \quad (2.3)$$

where $\langle \bullet, \bullet \rangle$ is the inner product and $\|\bullet\|$ is the $L_2$ norm. NCC has been used for motion estimation as the sole similarity measure [C. C-B. Wang, J-M. Deng, G. A. Ateshian, and C. T. Hung. An automated approach for direct measurement of two-dimensional strain distributions within articular cartilage under unconfined compression. *Biomech. Eng.*, 124:557-567, 2002.] or combined with other measures e.g. NCC is used in high signal-to-noise level regions whereas another similarity measure which takes into account the noise model of the image is used for regions with low signal-to-noise levels [J. Revell, M. Mirmehdi, and D. McNally. Ultrasound speckle tracking for strain estimation. *Technical Report CSTR*-04-005, Dept. of Computer Science, Univ. of Bristol, 2003.].

Although $L_1$ and $L_2$ norm based block-matching similarity measures have been successfully used to estimate motion in many applications, they are more suited for images that are characterised by Laplacian or Guassian statistics, and therefore may not be optimal for US images. Typically, speckle interference patterns are best represented by multiplicative Rayleigh distributed noise, and Strintzis and Kokkinidis [M. G. Strintzis and I. Kokkinidis. Maximum likelihood motion estimation in ultrasound image sequences. *IEEE Signal Processing Letters*, 4(6):156-157, 1997.] combined this with signal dependent additive noise to estimate motion fields in US images. They found that the motion-compensated reconstructed images using the Rayleigh distribution model gave better signal-to-noise ratios than using the $L_1$ norm. Cohen and Dinstein [B. Cohen and I. Dinstein. New maximum likelihood motion estimation schemes for noisy ultrasound images. *Pattern Recog.*, 35:455-463, 2002.] extended this idea for two US images (i.e. one is not a noiseless reference image as implemented by Strintzis and Kokkinidis) and presented two similarity measures; $CD_1$ and $CD_2$. $CD_1$ is based on a similar model as described by Strintzis and Kokkinidis but with the noise from both images. $CD_2$ includes nonlinear natural logarithm compression based on the ultrasound image formation model, and they found that this significantly outperformed both of the similarity measures used by Strintzis and Kokkinidis, and also the $CD_1$ similarity measure. The $CD_2$ measure has also been used by Boukerroui et al. [D. Boukerroui, J. A. Noble, and M. Brady. Velocity estimation in ultrasound images: A block matching approach. *Lecture Notes in Computer Science*, 2732: 586-598, 2003.] for the purpose of optimizing various parameters in the ML estimation, depending on the properties of the images for which the motion is to be estimated.

More recently, Myronenko et al. [A. Myronenko, X. Song, and D. J. Sahn. Maximum likelihood motion estimation in 3d echocardiography through non-rigid registration in spherical coordinates. *Lecture Notes in Computer Science*, 5528:427-436, 2009.] introduced a similarity measure called MS, which is a more generalised measure than the $CD_2$. This is because $CD_2$ is derived by assuming that the Rayleigh-distributed noise in both images is independent whereas the MS measure is based on assuming there is some correlation between the noise in both images i.e. $CD_2$ is a special case of MS. For this correlation assumption to hold, there must be a sufficiently high frame rate otherwise the noise in consecutive frames will be independent. They also incorporate a model for blurred speckle which results in a Nakagami distribution; a generalised form of the Rayleigh distribution, to arrive at another similarity measure, $MS_2$. In applying MS and $MS_2$ to raw data in spherical coordinates, their results showed a slight improvement in the accuracy of motion estimation when compared to $CD_2$, with $MS_2$ being better than MS.

In an embodiment directed to LV segmentation, the corresponding rest and stress images are paired instead of the current and next frames or the previous and current frames as in standard speckle tracking. In an embodiment, similarity measures based on Rayleigh distributed speckle being present in both images i.e. $CD_1$, $CD_2$, MS, and $MS_2$, are best suited for matching textures between the rest and stress images. In an embodiment, $CD_2$ is likely to prove just as useful as the MS and $MS_2$ measures because the rest and stress images are not linked in the same way as consecutive frames therefore the Rayleigh distributed noise can be assumed independent.

In an embodiment, block-matching based motion estimation is applied with an ML estimator. In an embodiment, corresponding blocks (or sets) of pixels are sought in each image within a predefined search area. In an embodiment, for each block, the estimated motion vector is one which maximises a likelihood function, which is derived from the similarity measure most suited to the image properties. In an embodiment, in the case of echocardiography, the images are assumed to be contaminated by multiplicative Rayleigh distributed noise.

In an embodiment, $X_t$ is defined as a set of coordinates in an image at a time instance t, $I_t(x_t)$ as the intensity of a pixel at coordinates $x_t$, $x_t \in X_t$, and $I_t = \{I_t(x_t)\}_{x_t \in X_t}$ as the intensity image at time t. The motion of a pixel between t−1 and t is described by the vector $v_t(x_t)$, $x_t \in X_t$. If $x_{t-1} \in X_{t-1}$ corresponds to the pixel $x_t \in X_t$, then:

$$v_t(x_t) = x_t - x_{t-1}. \tag{2.4}$$

Let $v_t = \{v_t(x_t)\}_{x_t \in X_t}$ represent the vector field describing the motion of pixels $X_t$ between t−1 and t. In an embodiment, the ML estimate of $v_t$, $\hat{v}_{ML}$ is obtained by the maximization of the conditional probability density function (derived from the maximum likelihood method for parameter estimation [A. Papoulis. Probability, *Random Variables, and Stochastic Processes*. New York: McGraw-Hill, 1991.]):

$$\max_{v_t} p(I_{t-1} \mid I_t, v_t) \text{ at } v_t = \hat{v}_{ML}. \tag{2.5}$$

In an embodiment, in the case of non-rigid motion, $v_t$ is not constant therefore local estimation is required. Now assume that $X_t$ is composed of non-overlapping sets $B_i$, i=1; 2 … N, of pixels with uniform motion:

$$X_t = \bigcup_{i=1}^{N} B_i, \; B_i \cap B_j = \emptyset, \; i \neq j, \tag{2.6}$$

$$v_t(x_t) = v_i \text{ for all } x_t \in B_i. \tag{2.7}$$

Let $A_i$ be the corresponding sets of pixels in $X_{t-1}$ such that:

$$A_i = \{x_{t-1} : x_{t-1} = x_t - v_i, x_t \in B_i\}. \tag{2.8}$$

The sets $A_i$ can be overlapping and need not cover the entire $X_{t-1}$ if the motion is not constant over the whole image. In an embodiment, the pixel sets $A_i$ and $B_i$ represent square "blocks" of pixels or more irregularly shaped "objects" whose criterion for selection is the uniformity of their motion and practical considerations with regards to efficient implementation of the motion estimation algorithm. Let $a_i = [a_{i1} \ldots a_{ik}]^T$ represent the vector for all intensities $I_{t-1}(x_{t-1})$, $x_{t-1} \in A_i$, and $b_i = [b_{i1} \ldots b_{ik}]^T$ the corresponding vector of intensities for $I_t(x_t)$, where $x_{t-1} = x_t - v_i$. The maximisation in Equation 2.5 is equivalent to the maximisation for each i of the following probability density function:

$$\max_{v_i} p(a_i \mid b_i, v_i) \text{ at } v_i = \hat{v}_{ML}. \tag{2.9}$$

Deriving the $CD_1$ and $CD_2$ measures: A commonly used model for ultrasound images where only one image is noisy is [C. Kotropoulos, X. Magnisalis, I. Pitas, and M. G. Strintzis. Nonlinear ultrasonic image processing based on signal-adaptive filters and self-organizing neural networks. *IEEE Trans. Image Proc.*, 3(1):65-77, 1994.]:

$$a_{ij} = n_{ij} b_{ij} \tag{2.10}$$

where $n_{ij}$ is multiplicative noise with a Rayleigh density:

$$p_n(n) = \frac{n}{\sigma^2} \exp\left\{-\frac{n^2}{2\sigma^2}\right\}, n > 0 \tag{2.11}$$

with independent elements $n_{ij}$, of variance $\sigma^2$. Using this model, the conditional probability density function can be derived as [M. G. Strintzis and I. Kokkinidis. Maximum likelihood motion estimation in ultrasound image sequences. *IEEE Signal Processing Letters*, 4(6):156-157, 1997.]:

$$p(a_i \mid b_i, v_i) = \frac{1}{b_{ij}} \prod_{j=1}^{k} p_n\left(\frac{a_{ij}}{b_{ij}}\right) = \prod_{j=1}^{k} \frac{a_{ij}}{b_{ij}^2} \exp\left\{-\frac{a_{ij}^2}{2\sigma^2 b_{ij}^2}\right\} \tag{2.12}$$

because the probability density function of a vector with independent elements is the product of each of the individual probability density functions.

In an embodiment, for the case of two noisy images, and again under the assumption of multiplicative Rayleigh noise with the probability density function given in Equation 2.11, if the noiseless value of the jth pixel in "block" i at time t is $s_{ij}$, then the model for the observed pixel at time t, $b_{ij}$, is:

$$b_{ij} = n_{ij}^1 s_{ij}. \tag{2.13}$$

Similarly, the model for the observation of the transformed pixel at time t−1, $a_{ij}$, is:

$$a_{ij} = n_{ij}^2 s_{ij}, \tag{2.14}$$

where $n^1_{ij}$ and $n^2_{ij}$ are two independent noise elements with the Rayleigh density function as given in Equation 2.11. Isolating $s_{ij}$ from Equations 2.13 and 2.14 and combining gives:

$$a_{ij} = \eta_{ij} b_{ij}, \text{ where } \eta_{ij} = \frac{n_{ij}^2}{n_{ij}^1} \tag{2.15}$$

As $\eta_{ij}$ is a division of two Rayleigh distributed random variables, it has the density function of the following form [A. Papoulis. Probability, *Random Variables, and Stochastic Processes*. New York: McGraw-Hill, 1991.]:

$$p_\eta(\eta) = 2\sigma^2 \frac{\eta}{(\eta^2 + 1)^2}, \eta > 0 \tag{2.16}$$

The conditional probability density function for this density function, using the same properties as for deriving Equation 2.12, is:

$$p(a_i \mid b_i, v_i) = \prod_{j=1}^{k}\left[\frac{1}{b_{ij}} p_\eta\left(\frac{a_{ij}}{b_{ij}}\right)\right] \tag{2.17}$$

$$= \prod_{j=1}^{k}\left\{\frac{2a_{ij}}{b_{ij}^2[(a_{ij}/b_{ij})^2 + 1]^2}\right\}$$

The maximisation of this equation is equivalent to the maximisation of Equation 2.9 and the motion estimated based on this equation is known as $CD_1$ [B. Cohen and I. Dinstein. New maximum likelihood motion estimation schemes for noisy ultrasound images. *Pattern Recog.*, 35:455-463, 2002.].

Taking the natural logarithm of both sides of Equation 2.15, to take into account that the displayed ultrasound images are log-compressed, and defining $\alpha_{ij} = \ln(a_{ij})$ and $\beta_{ij} = \ln(b_{ij})$ gives:

$$\alpha_{ij} = \beta_{ij} + \hat{\eta}_{ij}, \text{ where } \hat{\eta}_{ij} \ln(\eta_{ij}). \tag{2.18}$$

In this case, the probability density function of the additive noise $\hat{\eta}_{ij}$ is given by:

$$p(\hat{\eta}) = 2\sigma^2 \frac{\exp(2\hat{\eta})}{(\exp(2\hat{\eta}) + 1)^2} \quad (2.19)$$

The conditional probability density function is therefore given by:

$$p(\alpha_i \mid \beta_i, v_i) = \prod_{j=1}^{k} 2 \frac{\exp(2(\alpha_{ij} + \beta_{ij}))}{(\exp(2(\alpha_{ij} - \beta_{ij})) + 1)^2} \quad (2.20)$$

The maximisation of this equation is equivalent to the maximisation of Equation 2.9 and the motion estimated based on this equation is known as $CD_2$ [B. Cohen and I. Dinstein. New maximum likelihood motion estimation schemes for noisy ultrasound images. *Pattern Recog.*, 35:455-463, 2002.]. Alternatively, the following similarity function can be maximised [D. Boukerroui, J. A. Noble, and M. Brady. Velocity estimation in ultrasound images: A block matching approach. *Lecture Notes in Computer Science*, 2732: 586-598, 2003.]:

$$E_i^{CD_2}(v_i) = \prod_{j=1}^{k} \alpha_{ij} - \beta_{ij} - \ln(\exp(2(\alpha_{ij} - \beta_{ij})) + 1) \quad (2.21)$$

to arrive at the same result.

The MS and $MS_2$ measures: Myronenko et al. [A. Myronenko, X. Song, and D. J. Sahn. Maximum likelihood motion estimation in 3d echocardiography through non-rigid registration in spherical coordinates. *Lecture Notes in Computer Science*, 5528:427-436, 2009.] looked at the more general case of correlated speckle in the two images which is quite likely in the case of high frame rates. The bivariate Rayleigh distribution of two random variables $n_1$ and $n_2$ with equal variance $\sigma2$ is given by:

$$p_n(n_1, n_2) = \frac{n_1 n_2}{(1-\rho)\sigma^4} \exp^{-\frac{n_1^2 + n_2^2}{2\sigma^2(1-\rho)}} I_0\left(\frac{\sqrt{\rho}\, n_1 n_2}{(1-\rho)\sigma^2}\right) \quad (2.22)$$

where $$I_0(z) = \sum_{k=0}^{\infty} \frac{z^{2k}}{2^{2k}(k!)^2}$$

$I_0$ is a modified Bessel function of the fist kind with zero order, $0 \leq \rho \leq 1$ is the correlation coefficient and $n_1 \geq 0$, $n_2 \geq 0$. Using this, they arrive at a similarity measure:

$$E_i^{MS}(v_i) = \sum_{j=1}^{k} \frac{3}{2}\log\left(\cosh^2\left(\frac{a_{ij} - b_{ij}}{D}\right) - \rho\right) - \quad (2.23)$$

$$\frac{1}{2}\log\left(\cosh^2\left(\frac{a_{ij} - b_{ij}}{D}\right)\right) + const,$$

where D is a scaling constant from the log-compression. This measure is referred to as the MS similarity measure, and it reduces to the $CD_2$ similarity measure in the case of D=1 and $\rho=0$.

In an embodiment, by including a model of blurred speckle, Myronenko et al. have also derived a similarity measure based on a bivariate Nakagami distribution, which is a generalized form of the Rayleigh distribution. The similarity measure for blurred and correlated speckle was derived as:

$$E_i^{MS_2}(v_i) = \sum_{j=1}^{k} \frac{2m+1}{2}\log\left(\cosh^2\left(\frac{a_{ij} - b_{ij}}{D}\right) - \rho\right) - \quad (2.24)$$

$$\frac{1}{2}\log\left(\cosh^2\left(\frac{a_{ij} - b_{ij}}{D}\right)\right) + const,$$

where m−1 is the order of the Bessel function in the bivariate Nakagami distribution. This is referred to as the $MS_2$ similarity measure, and in the case of m=1, it reduces to the MS similarity measure.

In an embodiment, speckle tracking is used in an update step for refining a prior segmentation of the LV or an initial placement of the boundary in a stress sequence of images. In an embodiment, speckle tracking is used only along the boundary to search for the best match of a template within a predefined search window. In an embodiment, a set of coordinates, $X_r$, along the endocardial boundary in the rest frame and a corresponding set of coordinates, $\hat{X}_s$, along the prior endocardial boundary in the stress frame are studied, where the rest and stress frames are at the same point in the cardiac cycle. In an embodiment of the subject invention, the objective of the update step is to get as close as possible to the set of coordinates, $X_s$, which define the true endocardial boundary in the stress frame. In an embodiment, the points within $X_r$ define the true endocardial boundary in rest. In an embodiment, the points within $X_r$ are approximations of the true endocardial boundary in rest. In an embodiment, template blocks centered at the points $X_r$ are used for matching within search windows around corresponding points in the stress frame (see FIG. 31). In an embodiment, template blocks centered at the points $X_r$ are used for matching within search windows around corresponding points in $\hat{X}_s$, under the assumption that structures around the LV boundary have a similar appearance in both the rest and stress states.

In an embodiment, a multiresolution approach is used whereby the search is carried out over three resolution levels to allow for a larger regional search without compromising computational speed; something which is particularly important in clinical applications. In an embodiment, to allow for varying degrees of attenuation between the rest and stress frames, when carrying out matching between the template blocks and the search windows, the log-compressed intensities within them are normalised to have the same mean and variance. In other words, the log-compressed intensities are transformed by subtracting the mean and dividing by the standard deviation of all the pixels in the block/window. The resulting similarity measure is referred to as $CD_{2bis}$ [D. Boukerroui, J. A. Noble, and M. Brady. Velocity estimation in ultrasound images: A block matching approach. *Lecture Notes in Computer Science*, 2732: 586-598, 2003.].

In an embodiment, the ML estimation is not simply carried out in terms of estimating the motion that gives the maximum similarity measure within the search window, but instead we apply Singh's approach [A. Singh. Image-flow computation: An estimation-theoretic framework and a unified perspective. *CGVIP: Image Understanding*, 65(2):152-177, 1992.]. In such a formulation, the similarity measure, $E^{CD_{2bis}}$, is computed for each possible displacement, (u, v), of the template block from the rest frame, $W_r$, within the search window in the stress frame, $W_s$. Then a confidence measure is assigned to each possible displacement by computing a response, $R^{CD2bis}$, derived from $E^{CD2bis}$, which represents the likelihood of such a displacement. In an embodiment:

$$R^{CD2bis}(u,v) = \frac{1}{Z}\exp\{-kE^{CD2bis}(u,v)\} - N \leq u, v \leq N. \quad (2.25)$$

In an embodiment, Z is defined such that all probabilities sum to one, k is chosen to ensure the maximum response from $W_s$ is close to unity, and 2N+1 is the search window size. In Singh's approach, the displacement which results in the best texture match is therefore:

$$u_c = \begin{pmatrix} u_c \\ v_c \end{pmatrix} = \begin{pmatrix} \sum_u \sum_v R^{CD2bis}(u,v)u \\ \sum_u \sum_v R^{CD2bis}(u,v)v \end{pmatrix} \quad (2.26)$$

An embodiment is applied to paired frames from rest and stress sequences that are at corresponding phases in the cardiac cycle. In an embodiment, prior segmentations from a CCA model or other methodology described above are defined as points on the endocardial boundary. In an embodiment, the segmentations are obtained using other methods known in the art. In an embodiment, every point on the boundary in the rest dataset frame, $x_r \in X_r$, has a corresponding point on the boundary in the corresponding stress dataset frame, $\tilde{x}_s \in \tilde{X}_s$. In an embodiment, there is not a one-to-one correspondence between $X_r$ and $\tilde{X}_s$. In an embodiment, not all frames in $\tilde{X}_s$, are refined. In an embodiment, by carrying out block matching, the aim is to improve the delineation of the endocardial boundary at a more localized level. In a particular embodiment, for any point along the boundary in rest frame, $x_r^i$, a template block of size 3×3 pixels centered at $x_r^i$ is used to search a block of size 5×5 pixels centered at its corresponding point, $\tilde{x}_s^i$, in the stress frame. The similarity measure and weighted displacement for the normalised log-compressed intensity blocks are computed as described in Equations 2.21 and 2.26, respectively, in a three level multi-resolution coarse-to-fine approach.

Pseudo-code for carrying out an embodiment of this texture matching between rest and stress frame endocardial boundaries is as follows:

```
for all Corresponding rest/stress frames do
    for all Coarse to fine resolution levels do
        for all Endocardial boundary points do
            Define a template block in the rest image frame
            Define a search window in the stress image frame
            for all Possible displacements of the template in the search
            window do
                Compute E^CD2bis
                compute R^CD2bis
            end for
            Compute the probability weighted displacement (Equation 2.26)
            Apply the displacement to the stress boundary point
        end for
    end for
end for
```

The most closely related work involving segmentation of stress echocardiography sequences is that by Shekhar et al. [R. Shekhar, V. Zagrodsky, M. J. Garcia, and J. D. Thomas. Registration of realtime 3-d ultrasound images of the heart for novel 3-d stress echocardiography. *IEEE Trans. Med. Imag.*, 23(9):1141-1149, 2004.; V. Zagrodsky, V. Walimbe, C. R. Castro-Pareja, J. X. Qin, J.-M. Song, and R. Shekhar. Registration-assisted segmentation of real-time 3-d echocardiographic data using deformable models. *IEEE Trans. Med. Imag.*, 24(9)1089-1099, 2005.; V. Walimbe, M. Garcia, O. Lalude, J. Thomas, and R. Shekhar. Quantitative real-time three-dimensional stress echocardiography: A preliminary investigation of feasibility and effectiveness. *J. Am. Soc. Echocardiography*, 20(1):13-22, 2007.]. Firstly, they make use of the ECG signal to pair up corresponding rest and stress frames i.e. the temporal alignment of the two sequences. For the segmentation, their approach is to have a segmented template 4D dataset for which the segmentations are already defined as a wiremesh. They align the ED frame of the template to the ED frame of the dataset to be segmented, which could be either the rest sequence or the stress sequence, using Mutual Information (MI)-based affine registration. They then transform the template wiremesh (using the transformation derived from the registration step) to arrive at an initial placement of the mesh in the ED frame of the dataset to be segmented. Finally, the transformed mesh is refined using a Sobel edge gradient vector flow deformable model. This process is then repeated using frame n and frame n+1 instead of the template ED frame and the ED frame of the dataset to be segmented, throughout the corresponding frames. In a feasibility study for the clinical application of thus work, they present the corresponding rest and stress segmentations side by side to aid clinical decisions.

In an embodiment, the Shekhar method or other methods are used to refine segmentations derived according to the subject invention. In a comparative study, the Shekhar method was implemented using MI-based affine registration between images and instead of using a wiremesh. The resulting transformation was applied to the boundary points to arrive at an initial boundary placement. This was then updated using the Sobel edge gradient vector flow deformable model in 2D i.e. snakes. The only difference in this implementation and the one in V. Zagrodsky, V. Walimbe, C. R. Castro-Pareja, J. X. Qin, J.-M. Song, and R. Shekhar. Registration-assisted segmentation of real-time 3-d echocardiographic data using deformable models. *IEEE Trans. Med. Imag.*, 24(9):1089-1099, 2005, is that the wiremesh forces in between nodes (which serve as an additional smoothness constraint to the mesh) have not been included.

A comparison of the $CD_{2bis}$ and $MS_2$ similarity measures for the purposes of updating the prior segmentations from the CCA model is presented here. The results for the final segmentations from the predict and update process are then presented before being compared to the segmentations from repeating the MI-based registration/snakes procedure described by Shekhar et al.

Figure 32:
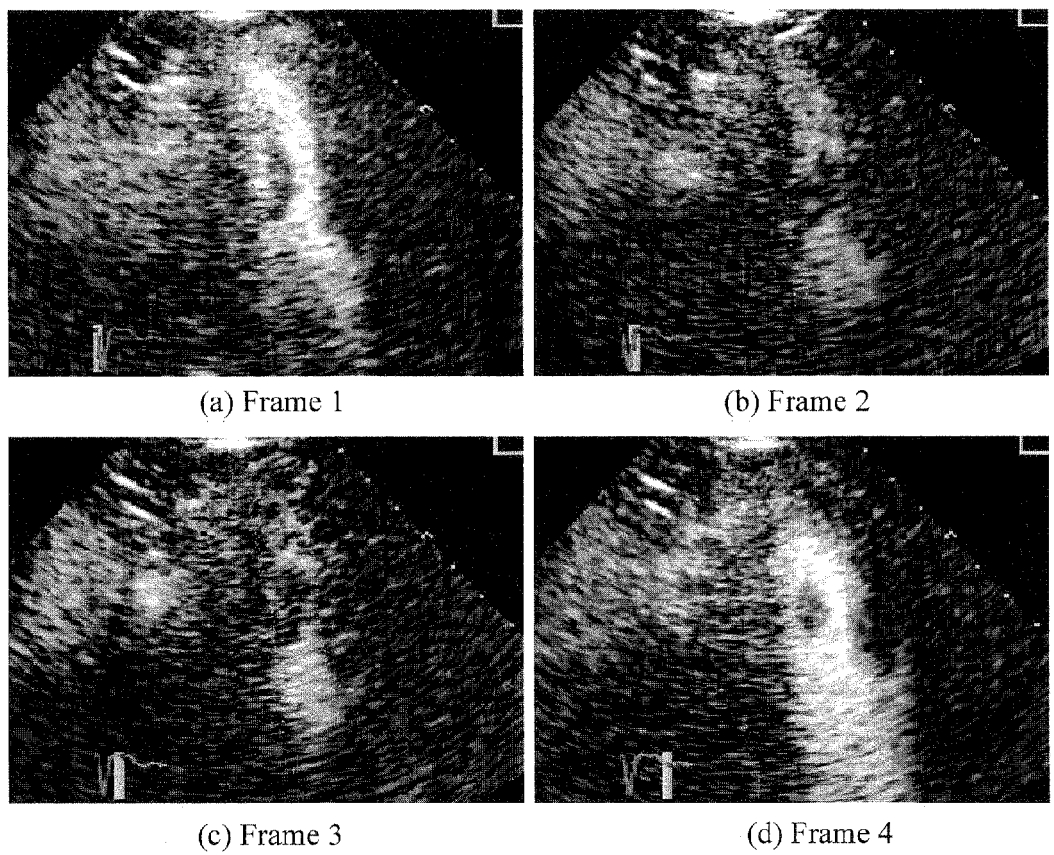
FIG. 32 shows segmentations of the stress frames showing the true, CCA model prior and the texture matched update when the $CD_{2bis}$ similarity measure is used in accordance with embodiments of the subject invention.
Figure 33:
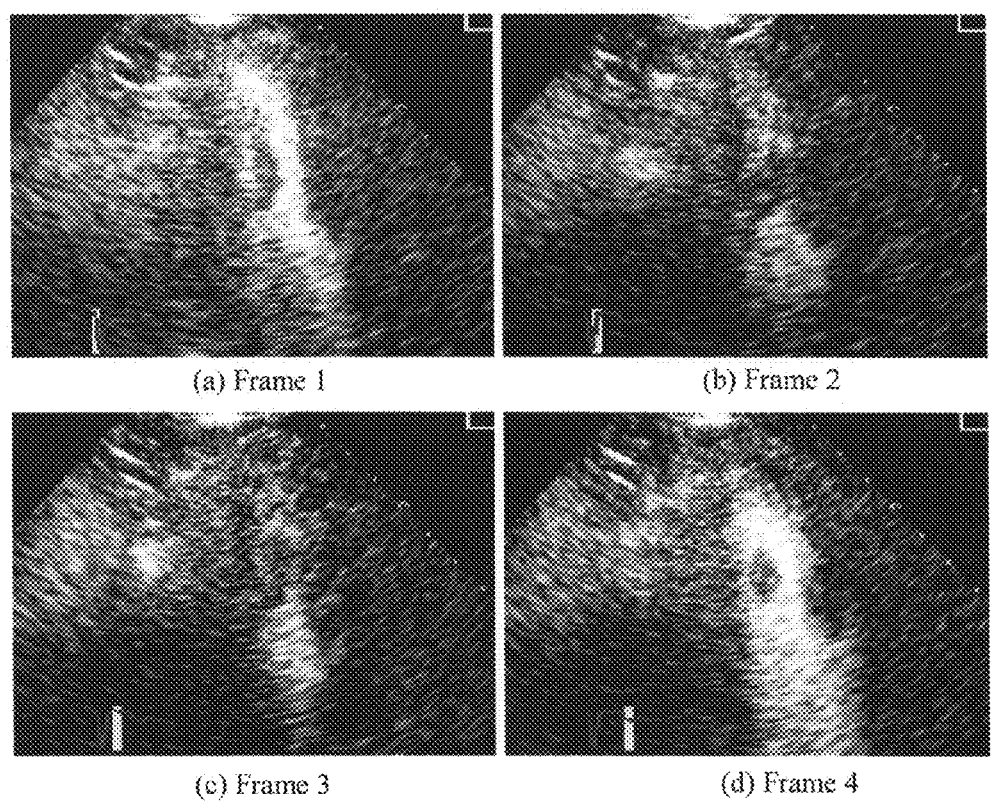
FIG. 33 shows segmentations of the stress frames showing the true, CCA model prior and the texture matched update when the $MS_2$ similarity measure is used in accordance with embodiments of the subject invention.

The update step was tested using both the $CD_{2bis}$ similarity measure and the $MS_2$ similarity measure (using Singh's approach for smoothing displacement estimates in both). In other embodiments, other similarity measures are used. FIG. 32 shows the results from using $CD_{2bis}$ and FIG. 33 shows the results from using $MS_2$, with D=1, ρ=0.8 and m=0.5 as given in [A. Myronenko, X. Song, and D. J. Sahn. Maximum likelihood motion estimation in 3d echocardiography through non-rigid registration in spherical coordinates. *Lecture Notes in Computer Science*, 5528:427-436, 2009.], when applied to the same stress dataset. Only the stress frames which had corresponding rest frames are shown and the first frame is the ED frame which is initialised to the true boundary for the priors, hence the red/green boundary overlap in those frames.

Figure 34:
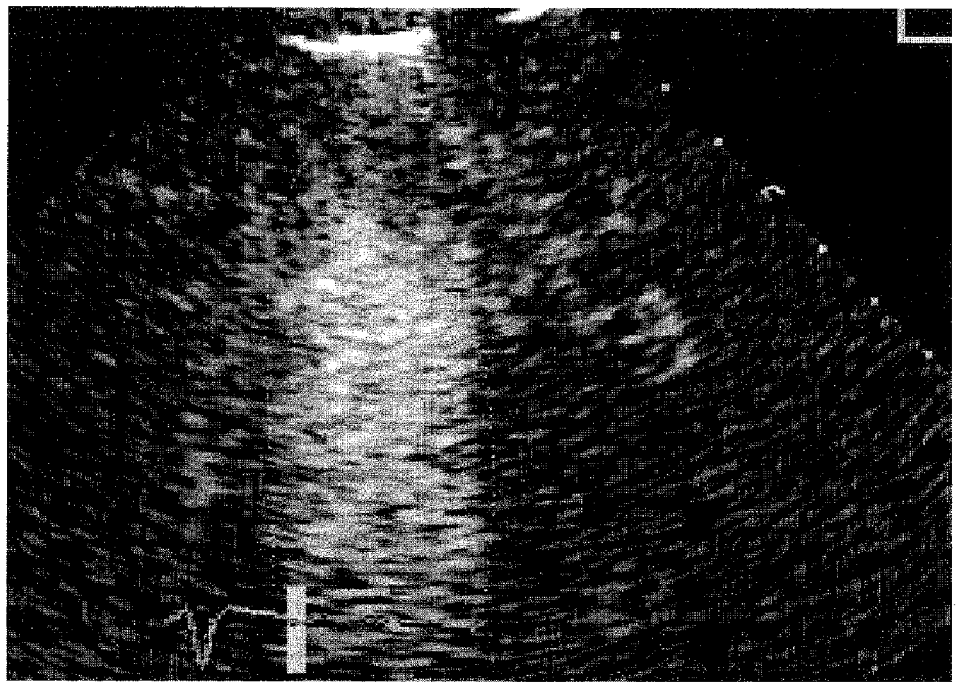
FIG. 34 shows segmentation of the rest frame with the true endocardial boundary, and the stress frame showing the true, CCA model prior and the texture matched update in accordance with embodiments of the subject invention.
Figure 34:
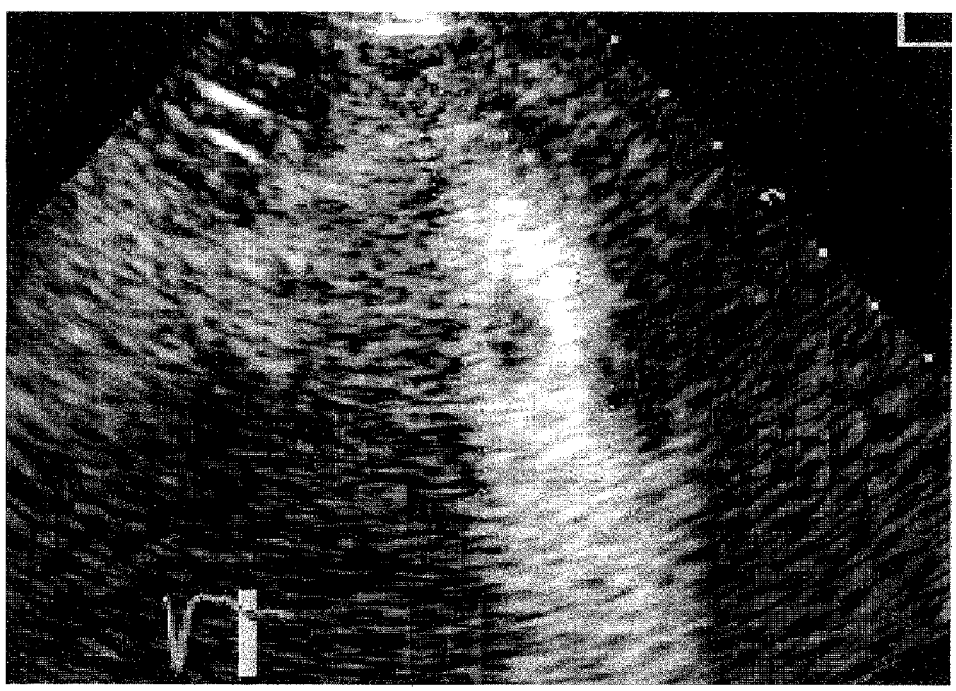

In an embodiment, whereas the prior segmentation from the CCA model gives a good general location of the endocardial boundary, the texture matching allows for the finer details at the boundary to be captured because each point is moved individually according to the rest-stress texture matching. FIG. 34 shows corresponding rest and stress frames with their segmentations. It shows that along some areas of the endocardial boundary, the update step corrects the prior boundary very well and moves it closer to the true boundary e.g. close to the mitral valve hinge points at the bottom. This is because the dark regions to the left and right of the mitral valve hinge points act as a contrast against the blood pool inside the LV. In other areas, particularly around the apex at the top, the update step is not as good and this is because the texture is quite similar in the region around the apex and it is therefore more difficult to define the exact location of the boundary. This illustrates the main weakness of the update step; in areas with little detectable features such as a clear boundary, the update step does not have much to base the match on, and therefore can only be as good as the prior.

Figure 35:
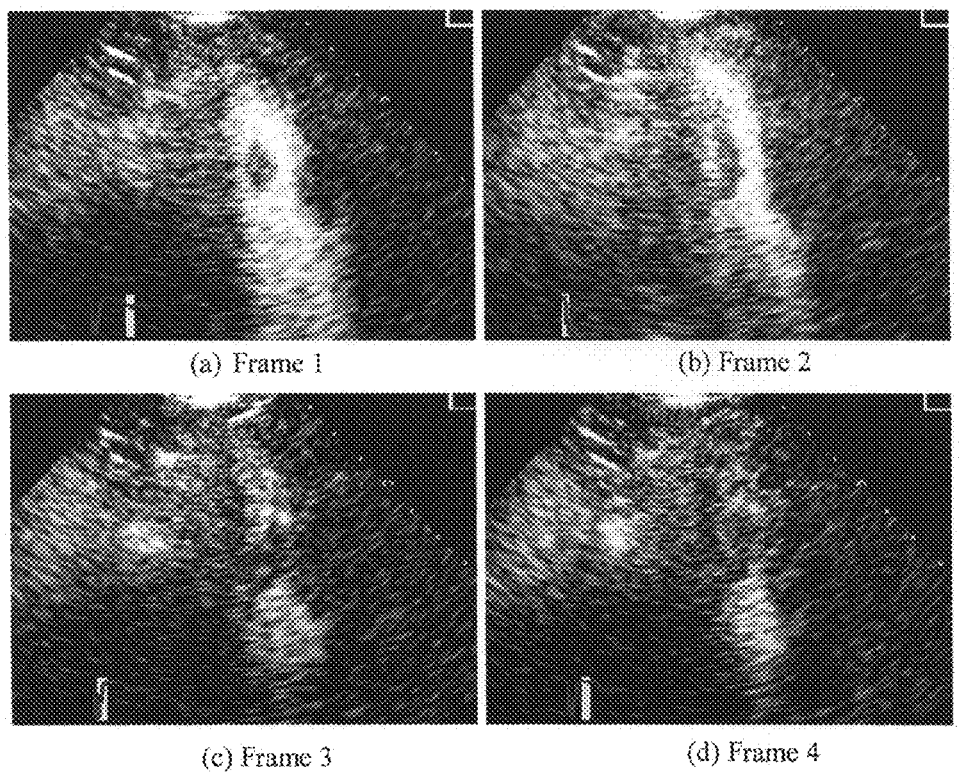
FIG. 35 shows segmentations of the stress frames showing the true, MI-registration/snakes scheme and our texture matched update in accordance with embodiments of the subject invention.

FIG. 35 shows a comparison of the segmentations from embodiments of the subject invention and those that result from using a similar technique to the one described by Shekhar et al. whereby MI-based affine registration is used to initially place the boundary points and then the refinement is carried out by snakes. Again, only the frames with corresponding rest frames are shown and the initialisation in the first frame is the true segmentation. The red boundaries are not very smooth because the distance preserving boundary smoothing constraints which Shekhar et al. did were not included. However, it is evident that a lack of strong edges results in poor segmentation as the snakes implementation is based on the assumption that there are strong edges at boundaries. In fact, out of 15 datasets that were initially analysed in V. Zagrodsky, V. Walimbe, C. R. Castro-Pareja, J. X. Qin, J.-M. Song, and R. Shekhar. Registration-assisted segmentation of real-time 3-d echocardiographic data using deformable models. *IEEE Trans. Med. Imag.*, 24(9):1089-1099, 2005, only 10 resulted in acceptable segmentations. The segmentations from according to the subject invention appear to be more robust to low quality or missing boundaries because of the prior information from the training data used to build the CCA model.

Figure 36:
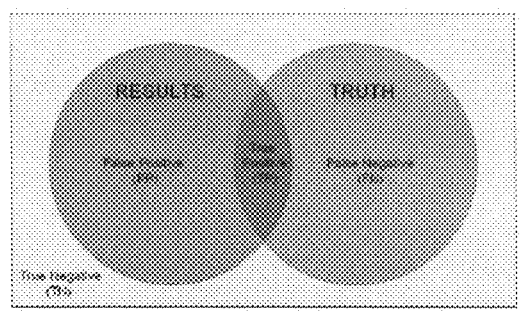
FIG. 36 shows an illustration of the union of results and truth in terms of segmentation validation in accordance with embodiments of the subject invention.

Next, results of embodiments of the subject invention were validated against the MI-based affine registration/snakes approach, using the entire database of datasets using the dice coefficient described below. The level of agreement between two segmentations can be (globally) measured by computing the dice coefficient:

$$D = \frac{2TP}{(FP+TP)+(TP+FN)}, \quad (2.27)$$

Where TP, FP and FN are defined as shown in FIG. 36. The dice coefficient was used to measure the results of embodiments of the subject invention against the 'true' segmentations i.e. those which were marked and verified by two expert clinicians.

Figure 37:
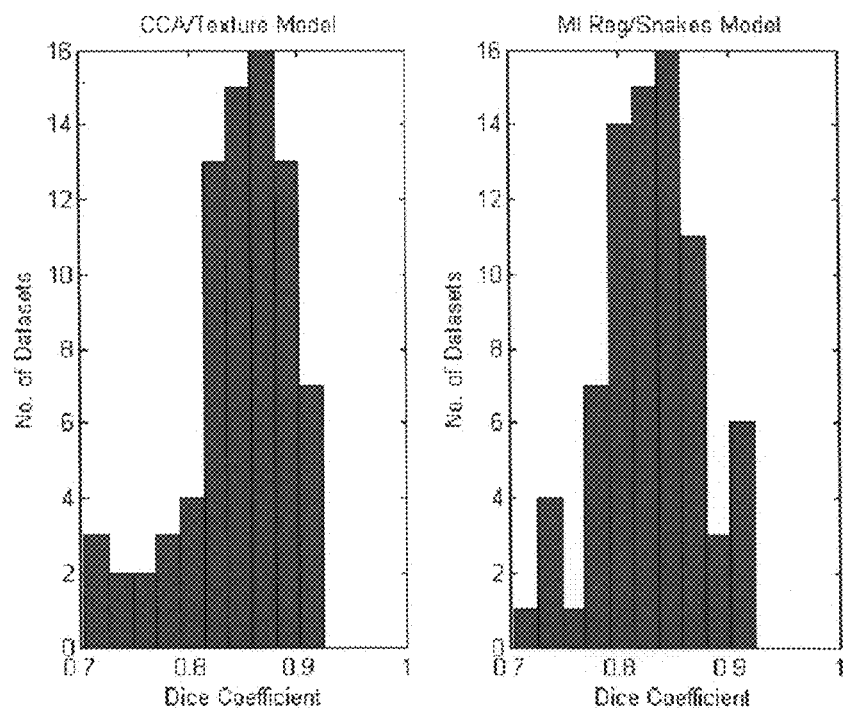
FIG. 37 shows Histograms of the dice coefficients for the stress dataset segmentations. For the CCA/Texture model; mean, $\mu_{CCA}$=0.844 and standard deviation, $s_{CCA}$=0.049, and for the MI registration/Snakes model; mean, $\mu_{MIS}$=0.829 and standard deviation, $s_{MIS}$=0.045 in accordance with embodiments of the subject invention.

In evaluating the results for the segmentation of all the available datasets ($n_{datasets}$=78 as in the previous chapter), the dice coefficients were computed for the results of embodiments of the subject invention against the truth, and also from the MI-based registration/snakes scheme described by Shekhar et al. against the truth. The dice coefficients for the subject invention were better for 52 out of 78 datasets when compared to those from the MI-based registration/snakes scheme. FIG. 37 shows the histograms for the dice coefficients from each method.

In an embodiment, rest and stress segmentations derived using one or more of the methodologies described above are used to classify the behavior of the image subject. In an embodiment, the subject is a heart and the behavior is classified as normal or abnormal. In an embodiment, a particular class of abnormal behavior is identified. In an embodiment, the classifications aide diagnosis of cardiac disease. In an embodiment, the classification highlights subjects for further review by experts or otherwise.

Current analysis by clinicians typically consists of manually looking at rest and stress sequences to link the behaviour between the two and identify any regions that are a cause for concern. The LV wall segments are typically divided as shown in FIG. 14 and a segment scoring scheme is used for describing the motion as 1=normal, 2=kinetic, 3=akinetic and 4=dyskinetic. Automating this process of cardiac analysis is very difficult because of the number of variables that clinicians consider in the evaluation, and even then, only the very experienced clinicians are able to deduce some of the more subtle abnormalities. Consequently, there is very little literature on the subject of automated classification of the LV from stress echocardiography [R. M. Peters. Fuzzy cluster analysis of positive stress tests: Comparison with stress echocardiography and nuclear perfusion imaging in patients with triple vessel and left main coronary disease. *Cardiology*, 91:66-68, 1999.; S. Mansor, N. P. Hughes, and J. A. Noble. Wall motion classification of stress echocardiography based on combined rest-and-stress data. *Lecture Notes in Computer Science*, 5242:139-146, 2008.]. Discussions with clinical collaborators (Dr Becher and Dr Szmigielski of the John Radcliffe Hospital Cardiology Department, Oxford) reveal that even the automated classification into normal/abnormal for the purpose of highlighting which subjects require further investigation would be of tremendous use as it could significantly reduce the time spent on analysis.

Various classification techniques can be used with embodiments of the subject invention. Here, two illustrative examples (naive Bayes' and random forests) are described. In an embodiment, these or other techniques can be used in determining whether a heart is normal or abnormal. The inputs to these are measures (or features) that have been derived from rest and stress segmentations of images. In an embodiment, the segmentations are produced using one or more of the methods described above. Classifications resulting from embodiments of the subject invention were tested, compared, and validated against recent work carried out by others and also compared to the specificity/sensitivity values achieved clinically. In embodiments, results are promising and have the advantage that they are much quicker to derive for the purpose of highlighting which patient datasets require further analysis.

In an embodiment, datasets are classified into normal (clinical scoring scheme value of 1) or abnormal (clinical scoring scheme values 2-4) depending on the characteristics measurable from the rest and/or stress segmentations. Classification can be carried out using a variety of features.

In an embodiment, a supervised classification technique is used wherein a machine learning technique learns a function for classification from training data, which consists of features upon which to base the classification (inputs) paired with their corresponding classes (outputs). In an embodiment, when applying this to a new object (for which the class is unknown), the object features are used as inputs to the function and the most likely class is then assigned to it. In an embodiment, hearts are classified into normal or abnormal. Two possible supervised classification techniques; the naive Bayes' classifier and random forests, are described here. These were found to be among the worst and best classification techniques respectively when their performance was evaluated alongside many other supervised classification techniques [R. Caruana and A N.-Mizil. An empirical comparison of supervised learning algorithms. *Proceedings of the 23rd International Conference on Machine Learning*, 148, 2006.]. The naive Bayes' classifier is based on Bayes' theorem and makes strong independence assumptions about the input features and also assumes that all the features are equally powerful in their ability to distinguish between classes. Random forests can produce a very accurate classifier in many datasets because of its ability to estimate the importance of variables in the classification i.e. all features are not thought to be equally important as in the naive Bayes' classifier. Both of these machine learning classification techniques will now be discussed in more detail.

In an embodiment using the naive Bayes' classifier, the problem is considered as that of computing the class probability of a binary event (normal/abnormal) given a set of independent features (based on measurements from stress echocardiography segmentations). Let the classifier, Y, be a binary random variable where Y equals 1 for abnormal and 0 for normal and $X_1, \ldots, X_p$ be a set of feature variables. If the features are conditionally independent given Y, the conditional joint probabilities can be written as:

$$P(X_1, \ldots, X_p \mid Y) = \prod_{j=1}^{p} P(X_j \mid Y). \quad (3.1)$$

From Bayes' theorem, the conditional probability for the classifier can be written:

$$\text{posterior} = \frac{\text{prior} \times \text{likelihood}}{\text{evidence}} \quad (3.2)$$

$$P(Y \mid X_1, \ldots, X_p) = \frac{P(Y)P(X_1, \ldots, X_p \mid Y)}{P(X_1, \ldots, X_p)} \quad (3.3)$$

$$= \frac{1}{Z} P(Y) \prod_{j=1}^{p} P(X_j \mid Y),$$

where Z (the evidence) is a scaling factor which is dependent only on $X_1, \ldots, X_p$, and it is constant if the feature variables are known. Hence, once the probability distributions of the feature vectors for each class are known from the training data, it is possible to compute the likelihood. The classification is then made by picking the class that is the most probable given the data i.e. a maximum a posteriori decision.

One advantage that the naive Bayes' classifier offers is that it only requires a small number of training datasets to estimate the parameters of the classification model. The decoupling of the class conditional feature distributions (Equation 3.1) means that each distribution can be independently estimated as a one dimensional distribution, so the number of datasets required does not increase exponentially with the number of features used in the model.

In an embodiment using a random forests classifier, classification trees are used to compute the membership of objects in each of the possible classes depending on the values of the set of feature variables. A classification tree is a model with a tree-like structure and contains nodes and edges (see FIG. 38).

The nodes are one of two types; intermediate nodes and leaf nodes. The intermediate nodes are labeled as feature variables and the edges extending from these nodes are predicates on these features. A leaf node is a node which has one incoming edge and no outgoing edges and is labeled with one class. Once the model is built using training data, the classification for new datasets can be determined by going down the classification tree from root to leaf. Typically, the features that appear at the top of the tree are those that are more important in making the classifications.

Figure 39:
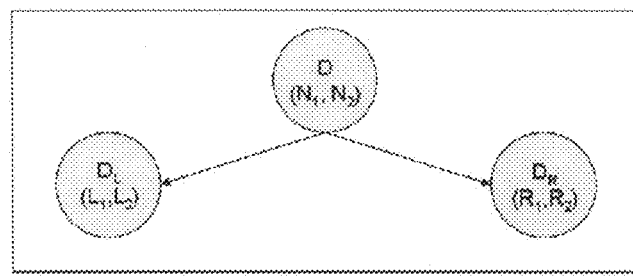
FIG. 39 shows a split at node D in accordance with embodiments of the subject invention.

In a binary classification tree, there are only two outgoing edges from the intermediate nodes, which we shall refer to as the left ($\leq$) and right ($>$). From the training datasets, D, at any particular node, the classes (1 or 2) have occurrences $N_1$ and $N_2$ respectively. After the split, the left side $D_L$ has the class occurrences, $L_1$ and $L_2$ and the same analogy can be applied for the right side as shown in FIG. 39.

Ideally, one would like all class 1 occurrences on the left side and all class 2 occurrences on the right side (or vice versa) following the split i.e. no misclassification. More generally, there is misclassification and at a node $D_L$, if the ratio of $L_1$ and $L_2$ as:

$$P_1 = P(1 \mid D_L) = \frac{L_1}{L_1 + L_2} \quad (3.4)$$

$$P_2 = P(2 \mid D_L) = \frac{L_2}{L_1 + L_2},$$

then the Gini index (of diversity) which is defined as:

$$\text{gini}(P_1, P_2) = P_1^2 P_2^2 \quad (3.5)$$

can be used as a measure of the quality of classification. If there is no diversity at that node i.e. the split is pure so there are no misclassifications, then the Gini index equates to zero. Another commonly used measure is that of entropy, which for k number of classes is defined:

$$\text{entropy}(P_1, \ldots P_i, \ldots P_k) = -\sum_{i=1}^{k} P_i \ln(P_i). \quad (3.6)$$

and is minimised when the split is pure. These measures allow the ideal split conditions to be determined for the training dataset when deriving the structure of the classification tree.

Ensemble learning methods are ones that generate many classification trees i.e. classifiers, and then aggregate their results. The idea behind this is that the ensemble is generally more accurate than any one of the individual classifiers that make up the ensemble. One such method is known as boosting and another is bagging. In boosting methods, the training datasets (typically a feature vector for each dataset) used for each successive classifier are chosen based on the performance of the earlier classifiers. Datasets that are incorrectly classified by the earlier classifiers are chosen more often than those that are correctly classified. In this way, the boosting method attempts to produce new classifiers that are better able to classify the types of datasets for which classification is poor in the current ensemble of classifiers. Adaptive boosting [Y. Freund and R. E. Schapire. Experiments with a new boosting algorithm. *Proceedings of the Thirteenth International Conference on Machine Learning*, pages 148-156, 1996.], otherwise known as Ada-boosting, uses the approach of selecting datasets based on their probabilities, or by using all the datasets but by weighting the error of each dataset by the probability of that dataset. If the first of these approaches is considered; if the number of datasets is N, then for the initialisation, the probability of picking any one dataset is 1/N (this is later modified after each trained classifier is added to the ensemble). Let $E_k$ be the sum of dataset probabilities of the misclassified instances for the currently trained classifier $C_k$. The dataset probabilities for the next trial are modified such that the probabilities for the misclassified instances are multiplied by the factor:

$$B_k = \frac{1 - E_k}{E_k}, \qquad (3.7)$$

and then all the dataset probabilities are normalised to sum to 1. In Ada-boosting, the classifiers, $C_1, C_2, \ldots, C_k$, are then aggregated using a weighted voting scheme where each $C_k$ has the weight $\log(B_k)$. These weights allow for the process to discount classifiers that are not very accurate on the overall problem. Boosting can, however, result in overfitting of the training data as emphasis in the later stages may be on datasets that are just noise.

Figure 38:
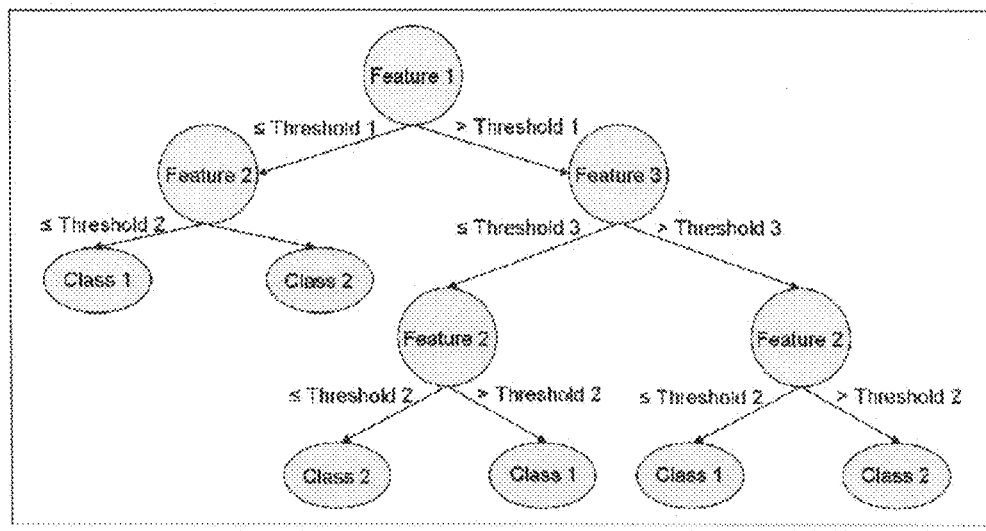
FIG. 38 shows an example structure of a three feature classification tree in accordance with embodiments of the subject invention.

In bagging methods [L. Breiman. Bagging predictors. *Machine Learning*, 24:123-140, 1996.], each classifier is trained on a random redistribution of the training datasets. N datasets are randomly drawn, with replacement, from the original N training datasets and consequently, some datasets may be drawn more than once while others are not drawn at all. Each classifier is therefore generated using a different random sampling of the training datasets and the aggregation of these gives the final ensemble of classifiers in the model. The majority vote is then often taken as the aggregated classification. Breiman showed that bagging is effective on unstable learning algorithms where small changes in the training dataset could result in large changes in the final classification, and that decision trees such as the one in FIG. 38 are of this type. Also, bagging methods are generally more resilient to overfitting noise when compared to boosting methods.

Many classification trees are also grown in random forests and for each tree, N training datasets are randomly drawn with replacement from the N available datasets just as in bagging. If there are M input variables for each dataset (or feature vector), a number m<M is specified such that at each node in the classification tree, m variables are selected at random and the variable that gives the best split out of these m is the one used to split the node.

Most features that have been derived for the purpose of assessment of cardiac motion analysis are based on the motion of the endocardial border and myocardial thickening e.g. changes in LV area/volume, radial shortening, ejection fraction, velocities; from blood flow and endocardial motion, and myocardial thickness around the LV. One reason behind this is that it is easier to track the endocardial border because there is a better contrast between the blood/tissue boundary than for example a tissue/tissue boundary, particularly in US images. Consequently, embodiments of the subject invention use features based on measurements derived from the endocardial boundary.

One reason that clinicians carry out stress echocardiography is that the stress state provides information that may not be clearly visible in the rest state e.g. where there are only mild abnormalities in motion in rest, the abnormalities are likely to be exaggerated in stress, therefore the ability to distinguish abnormal from normal behaviour is better from stress. One of the most-used and well-validated quantitative measures that are used clinically is ejection fraction (EF) which is the difference in LV volume between the ED and ES phases in the cardiac cycle. It provides a good global measure of heart function because it measures the amount of blood pumped out from the heart in the systole part of the cardiac cycle. Clearly, if not enough oxygenated blood is being pumped out to the body, then the myocardial muscle is not moving as it should be. The 2D equivalent of the EF is the change in LV area between the ED and ES frames. In an embodiment, this feature is used to classify a heart as described below.

Typically, the combined analysis of rest and stress states is very powerful and through this combined analysis, clinicians can infer even more information on heart function. Discussions with clinical collaborators on this subject reveal that another important aspect that they look out for in corresponding rest/stress frames is that the endocardial boundary in stress must lie inside the endocardial boundary in rest in the ED to ES stage of the cardiac cycle. In an embodiment, a measure is derived for this feature. In an embodiment, the feature is used for classification of a heart.

In an embodiment, the magnitude of update required in the previously described update step is measures and used to classify a heart. In embodiments, the CCA model, or other method used to derive image segmentations, is trained on normal heart data. Thus, the model's prediction for abnormal hearts is generally poor and would require a larger update to take it to the endocardial boundary. In embodiments, this level of update is included as a feature in the classification of a heart. Each of the features will now be discussed in further detail. These features are illustrative examples. In embodiments, other features can be used in classification.

In an embodiment, feature 1 is measured. Feature 1 is the change in area between the ED and the ES frames relative to the area in the ED frame:

$$\Delta A_{rel} = \frac{A_{ED} - A_{ES}}{A_{ED}}. \qquad (3.8)$$

In an embodiment, feature 1 is calculated for the stress state because it gives better normal/abnormal distinguishing properties than the rest.

Figure 40:
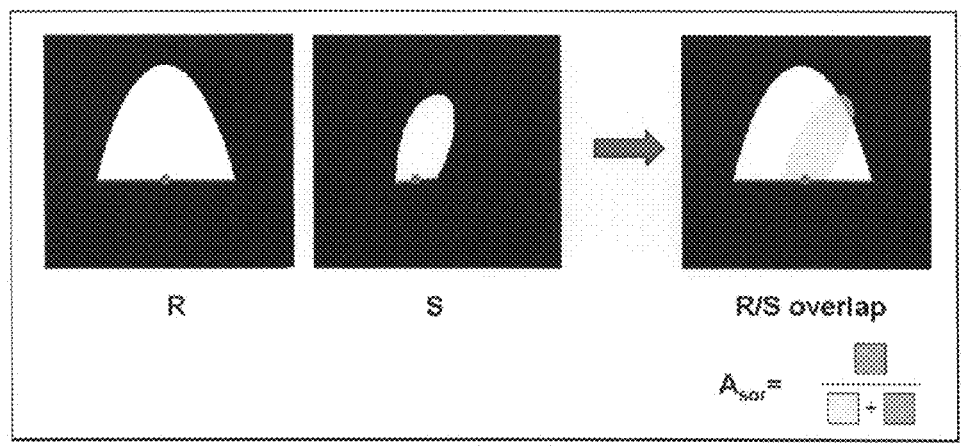
FIG. 40 shows an illustration of the calculation of the stress-outside-rest measure in accordance with embodiments of the subject invention.

In an embodiment, feature 2 measures the amount of stress LV that lies outside of the rest LV at corresponding points in the cardiac phase. Let R represent a rest frame consisting of binary pixels that are labelled 1 inside the endocardial boundary and 0 outside of the endocardial boundary. Similarly, S represents the corresponding stress frame with binary pixels that are labelled 1 inside the endocardial boundary and 0 outside of the endocardial boundary. Then the stress-outside-rest measure, $A_{sor}$, is given by:

$$A_{sor} = \frac{\sum S \,\&\, \overline{R}}{\sum S}, \qquad (3.9)$$

where the summation is over the entire image and is the equivalent of the illustration in FIG. 40. In an embodiment, a rigid alignment of the rest and stress contours is applied using a line through the MV points in each to ensure against errors resulting from different probe positioning.

In an embodiment, feature 3 measures the level of update made by the block matching technique described above. In an embodiment, a level of update produced via another update technique is measured. In an embodiment, feature 3 is determined by considering the level of agreement between the prior and updated segmentations. One way this can be achieved is by calculating the dice coefficient as described in the previous chapter. An alternative to this method is the Cohen's Kappa coefficient, κ, which is usually considered more robust as it takes into account that there could be agreement resulting from purely random factors [J. Cohen. A coefficient of agreement for nominal scales. *Educational and Psychological Measurement*, 1(37):37-46, 1960.]. If the table of frequencies of pixels classified as inside/outside the LV is as shown in Table 2.1, for the prior and updated segmentations, then:

$$p_o = \frac{25870 + 64912}{92160} = 0.985 \quad (3.10)$$

$$p_c = 0.285 \times 0.291 + 0.175 \times 0.709 = 0.590,$$

where probability $p_o$, is the proportion of agreement between the two segmentations and $p_c$ is the proportion of agreement that would be expected by chance. Then κ can be calculated as follows:

$$\kappa = \frac{p_o - p_c}{1 - p_c} = \frac{0.985 - 0.590}{1 - 0.590} = 0.963. \quad (3.11)$$

According to this definition, $-1 \leq \kappa \leq 1$, and a value of $\kappa=0$ represents agreement that could result purely by chance while more positive values represent agreement less likely to be due to chance.

TABLE 2.1

A table of pixel frequencies according to inside/outside LV classifactions made by the prior and update segmentations.

| Update | Prior | | |
|---|---|---|---|
| | In | Out | Pin/out Update |
| In | 25870 | 986 | $\frac{25870 + 986}{92160} = 0.291$ |
| Out | 392 | 64912 | $\frac{392 + 64912}{92160} = 0.709$ |
| Pin/out Update | $\frac{25870 + 392}{92160} = 0.285$ | $\frac{986 + 64912}{92160} = 0.715$ | $\Sigma p = 1.000$ |

In an embodiment, once the feature values have been calculated for all the datasets a classifier is applied. Here, the naive Bayes' classifier and the random forests classifier is applied using a raw data matrix with one row per dataset, of the form [feature 1; feature 2; feature 3; classification]. The classifier was first trained using all but one dataset i.e. a leave-one-out approach. When this trained classifier is applied, the feature values for the left-out dataset are the inputs to the classifier and the output is the class assigned. For the naive Bayes' classifier, the probabilities are determined from the frequencies in the training dataset. For the random forests classifier, matlab code produced by Abhishek Jaiantilal [A. Jaiantilal. Random forest implementation for matlab. http://code.google.com/p/randomforest-matlab/, 2009.] which is based on the algorithms described by Breiman et al. [L. Breiman. Random forests. *Machine Learning*, 45(1):5-32, 2001.] was used. This embodiment, makes use of the Gini index for determining optimal node-splitting. Random forests was run with m=1, m=2 and m=3 with the three described features with 500 trees in each ensemble.

Figure 41:
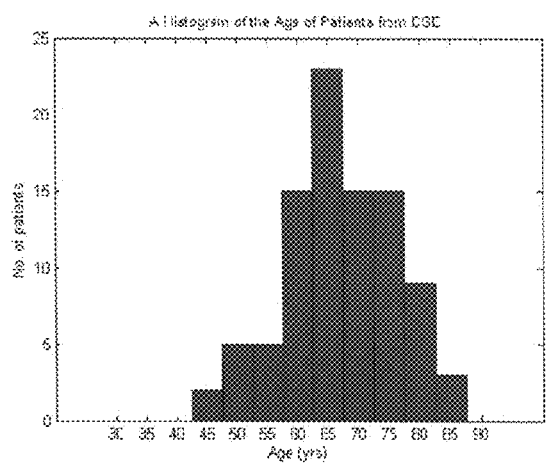
FIG. 41 shows the age distribution of the subjects with abnormalities used in this study in accordance with embodiments of the subject invention.

The tested database consisted of the aforementioned 78 normal studies plus 92 abnormal studies for which ethics approval had been obtained. The age distribution for the abnormal studies is shown in FIG. 41 which again shows that the majority of subjects are quite elderly.

In order to determine the effectiveness of each of the features in terms of their ability to distinguish normal from abnormal hearts, we considered their values for all the datasets as frequency distributions. This gives a very good overview of the separation of the feature values for normal and abnormal datasets.

Figure 42:
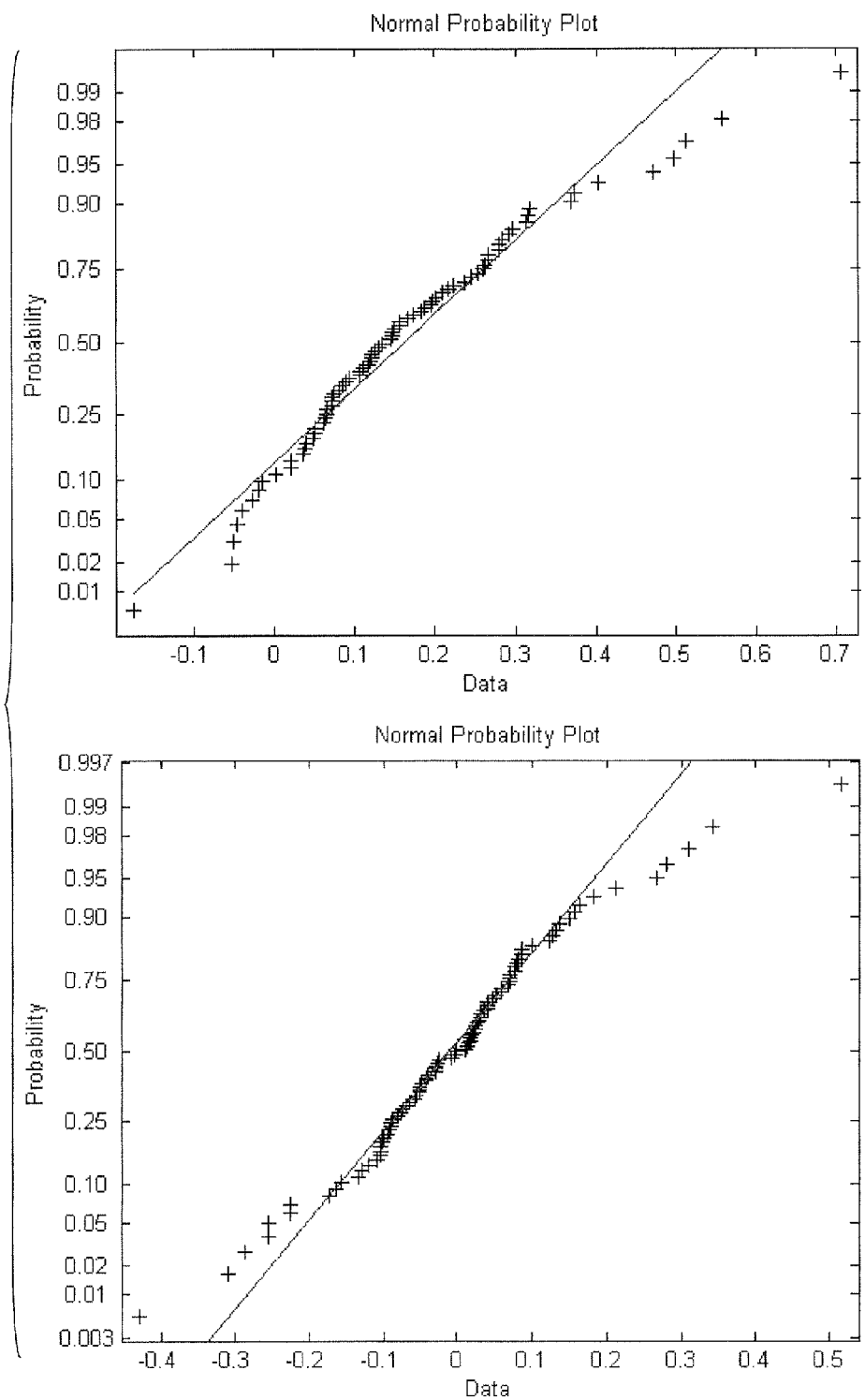
FIG. 42 shows the normal distribution probability plots for $\Delta A_{rel}$ in accordance with embodiments of the subject invention.
Figure 43:
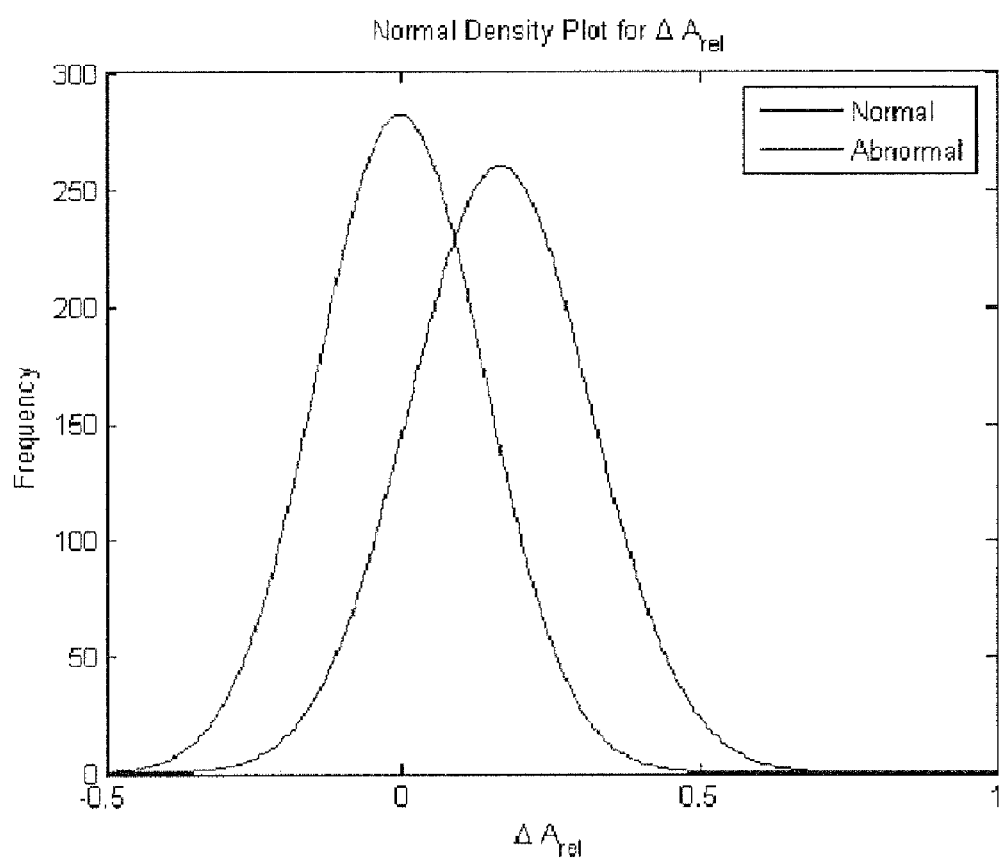
FIG. 43 shows the normal distribution for $\Delta A_{rel}$ for the normal and abnormal datasets in accordance with embodiments of the subject invention.

FIG. 42 shows the normal distribution probability plots for $\Delta A_{rel}$ for the normal and abnormal datasets. The proximity of the datapoints to the red normal distribution line shows that a normal distribution is a good approximation to the data. FIG. 43 shows a plot of the normal density plots for the $\Delta A_{rel}$ distribution for both normal and abnormal datasets. It shows that there is a difference between the two distributions and although the peaks are well separated, there is an overlap between the two curves. Using solely this feature with a cut-off point for classification of datasets into normal/abnormal would result in many erroneous classifications because of the overlap. Hence, in an embodiment, more information has been incorporated into the classification algorithm from the other features for more accurate and robust classifications.

Figure 44:
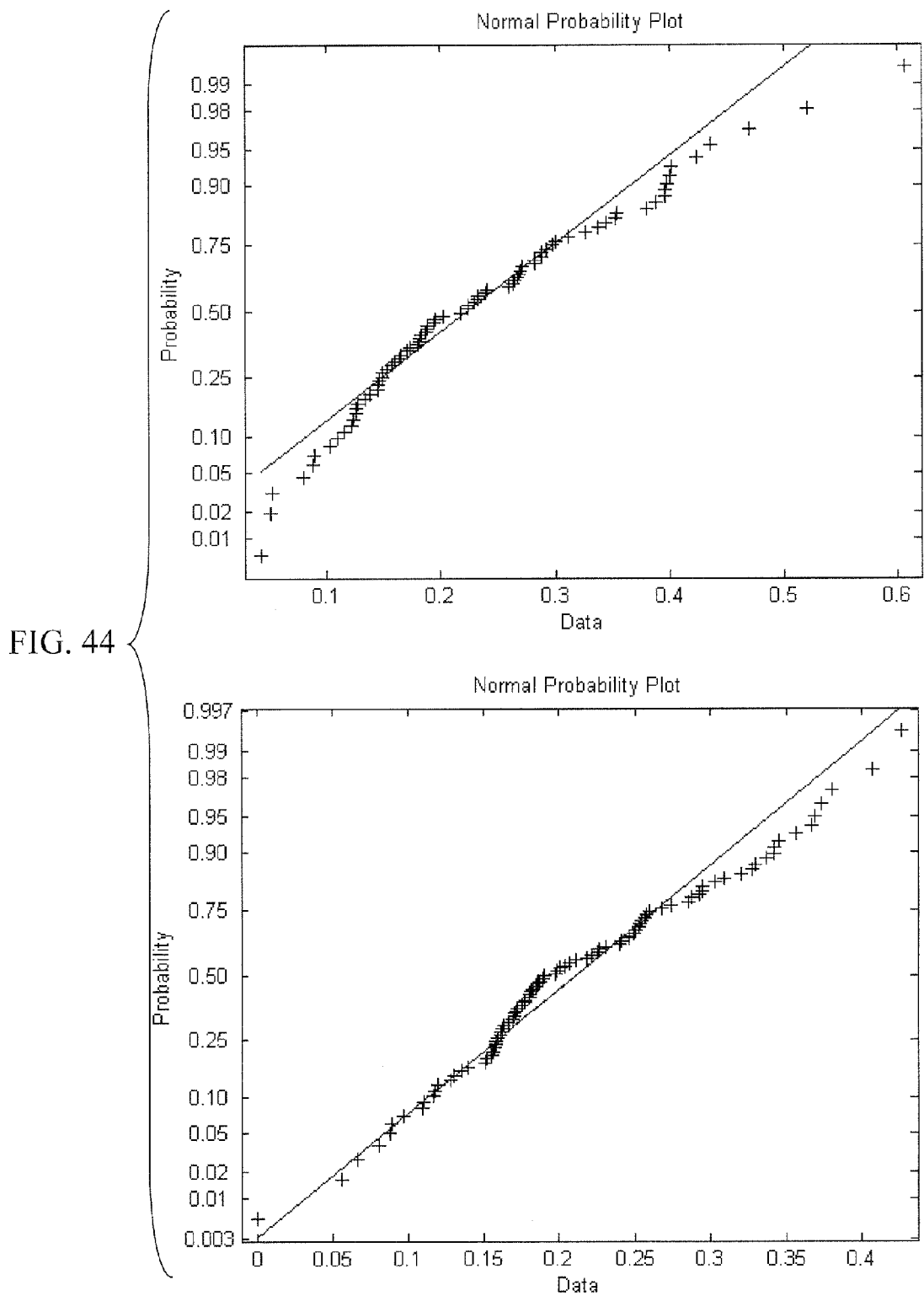
FIG. 44 shows the normal distribution probability plots for $A_{sor}$ in accordance with embodiments of the subject invention.
Figure 45:
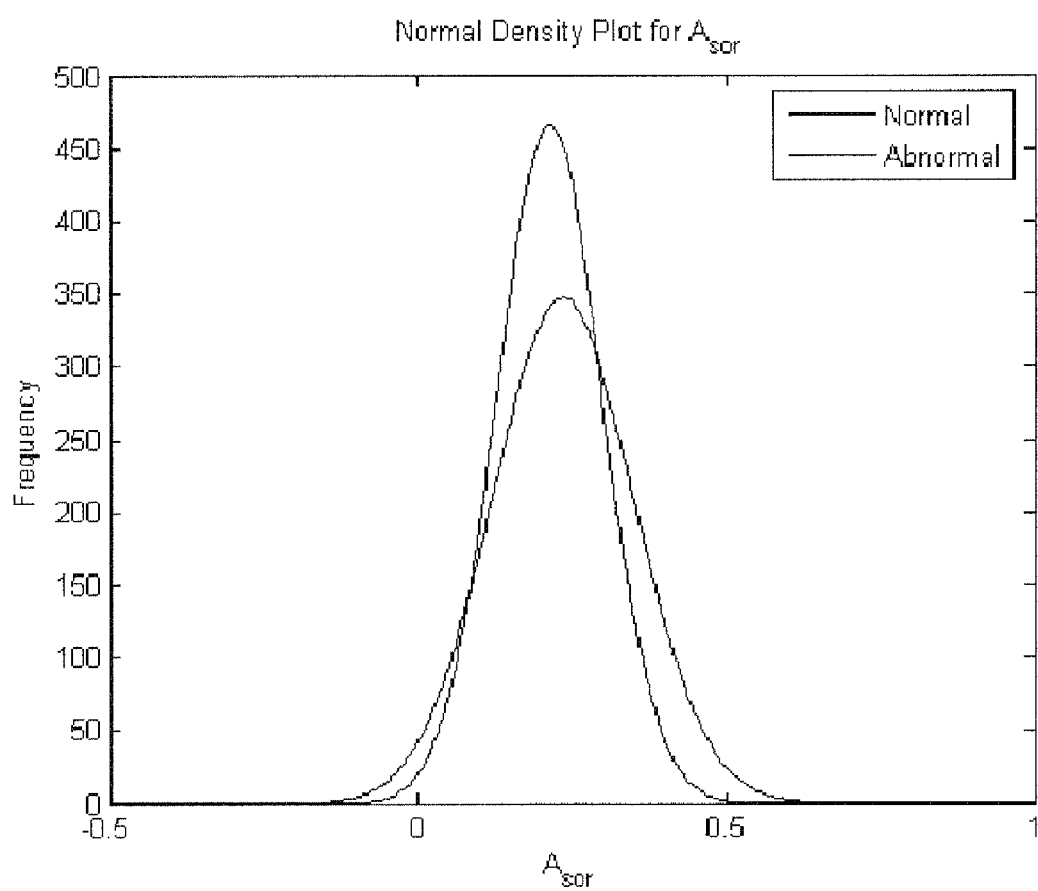
FIG. 45 shows the normal distribution for $A_{sor}$ for the normal and abnormal datasets in accordance with embodiments of the subject invention.

FIG. 44 shows the normal distribution probability plots for $A_{sor}$ and FIG. 45 shows a plot of the normal density plots for the $A_{sor}$ distribution for both normal and abnormal datasets. In this case, there is only a slight difference in the peak positions along the x-axis suggesting that although there is a difference in the normal and abnormal distributions for this feature, it may only provide limited information for the purpose of classification.

Figure 46:
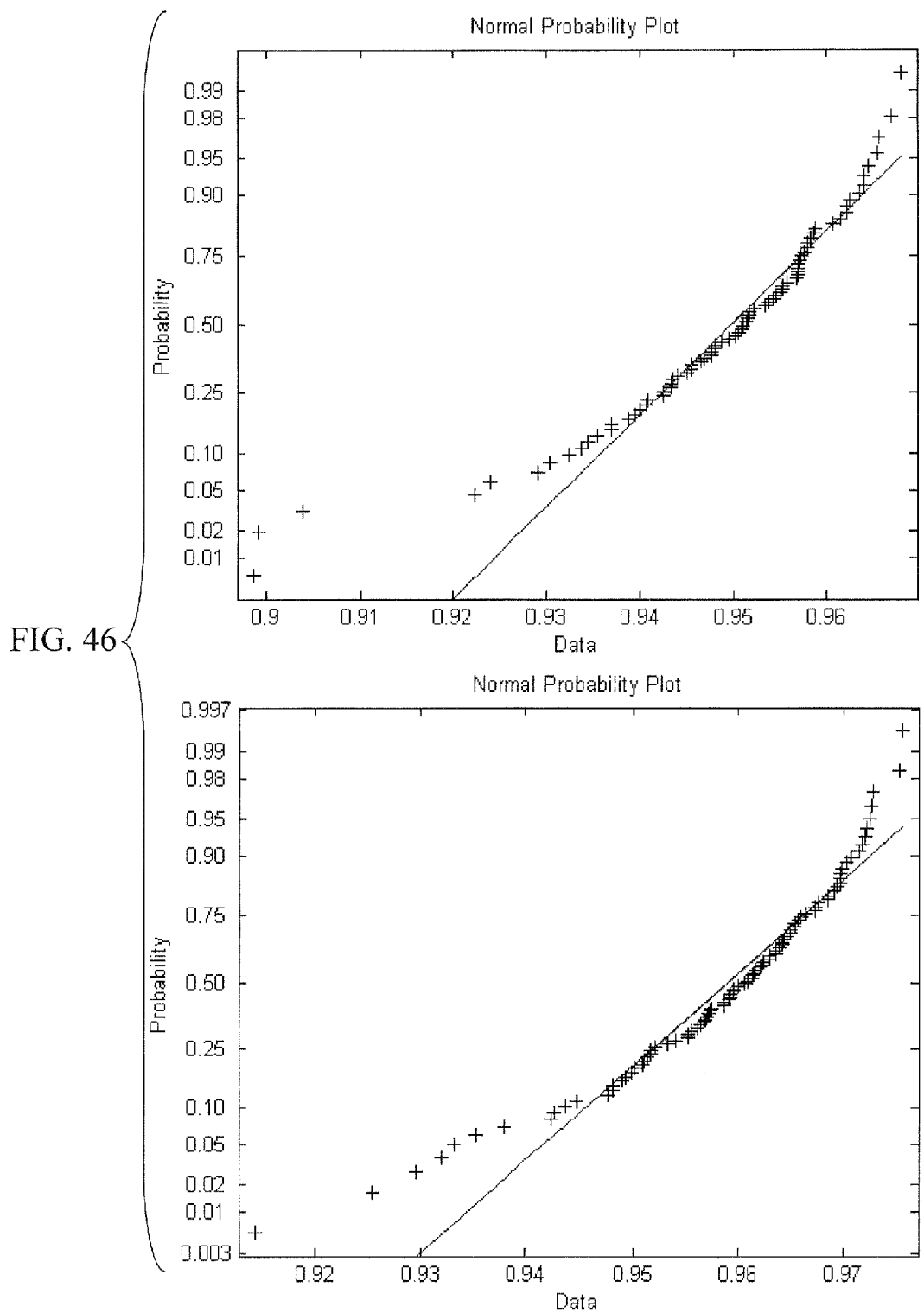
FIG. 46 shows the normal distribution probability plots for the dice coefficients between the prior and update segmentations in accordance with embodiments of the subject invention.
Figure 47:
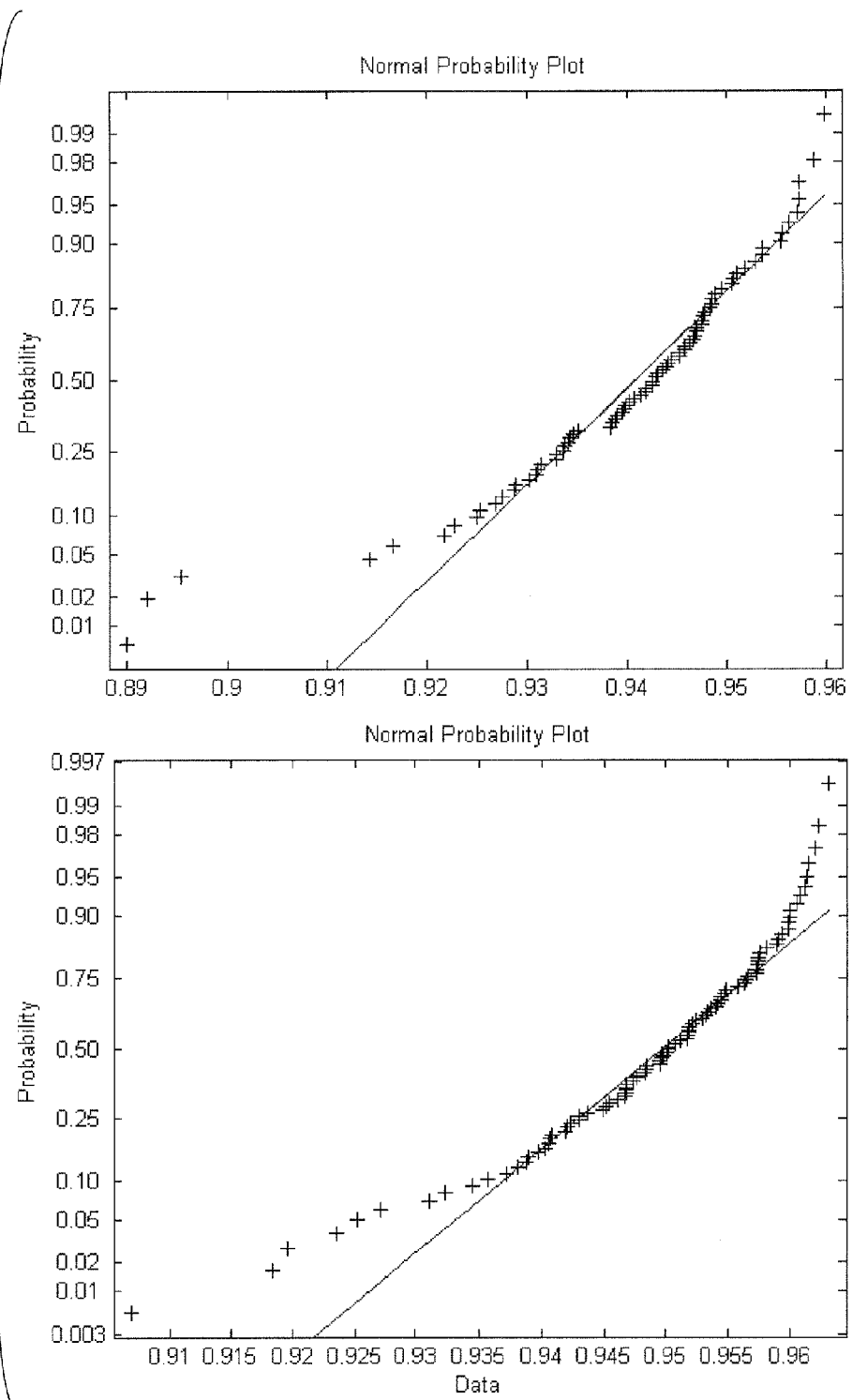
FIG. 47 shows the normal distribution probability plots for the Cohen's Kappa coefficients between the prior and update segmentations in accordance with embodiments of the subject invention.
Figure 48:
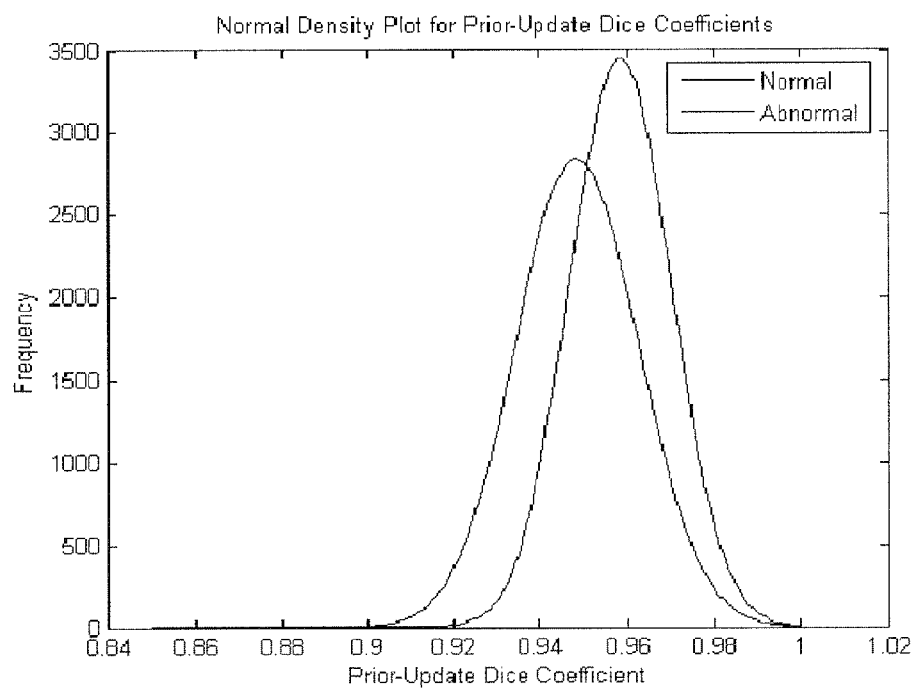
FIG. 48 shows the normal distributions for the dice coefficients between the prior and update segmentations for the normal and abnormal datasets in accordance with embodiments of the subject invention.
Figure 49:
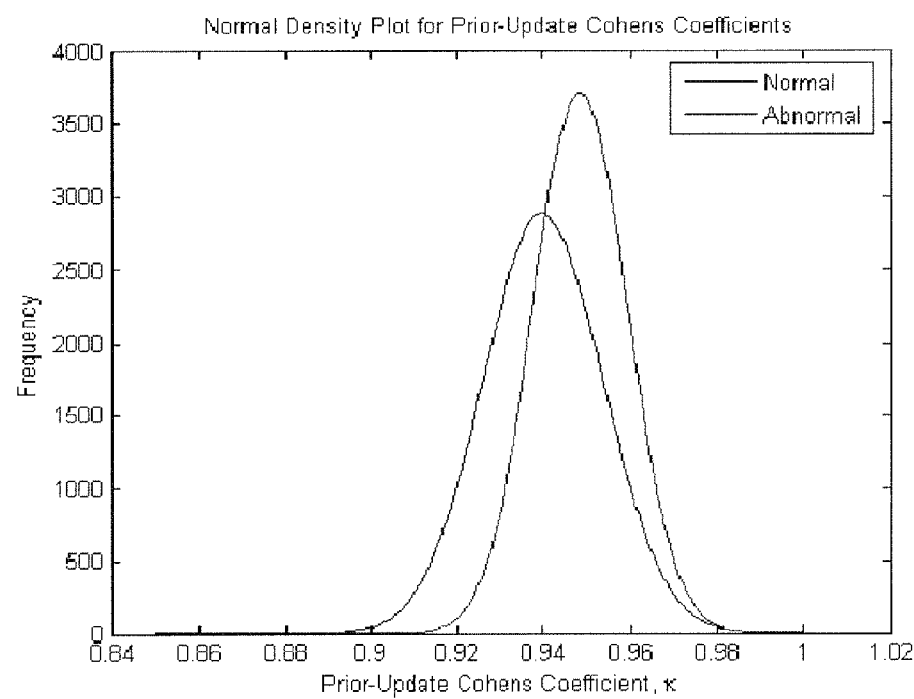
FIG. 49 shows the normal distributions for the Cohen's Kappa coefficients between the prior and update segmentations for the normal and abnormal datasets in accordance with embodiments of the subject invention.

For the level of update feature, we considered two measures; the dice coefficient and Cohen's Kappa coefficient, κ. The normal distribution probability plots for these are shown in FIGS. 46 and 47, and the normal density plots for the coefficients' distributions are given in FIGS. 48 and 49. Both coefficients give very similar results where the separation between the normal and abnormal curves is not very large, especially when one considers that they span a very narrow band of coefficient values.

Naive Bayes' and random forest classification were carried out using each feature individually, and also by using various combinations to show which ones were useful in classification and what the optimal combination was. Table 2.2 outlines the results as the percentage of datasets correctly classified over the total number of datasets, CC (%).

| Method Features Used | NB | RF (m = 1) | RF (m = 2) | RF (m = 3) |
|---|---|---|---|---|
| 1 | 59.3 | 68.3 | — | — |
| 2 | 56.3 | 52.1 | — | — |
| 1 & 2 | 58.1 | 68.3 | 67.7 | — |
| 3D | 55.7 | 42.5 | — | — |
| 1 & 3D | 56.9 | 69.5 | 70.7 | — |
| 2 & 3D | 55.7 | 5.03 | 51.5 | — |
| 1, 2 & 3D | 57.5 | 74.3 | 73.7 | 74.3 |
| 3κ | 55.7 | 47.9 | — | — |
| 1 & 3κ | 56.9 | 72.5 | 70.7 | — |
| 2 & 3κ | 55.7 | 54.5 | 54.5 | — |
| 1, 2 & 3κ | 57.5 | 74.3 | 72.5 | 71.3 |

The results show that the random forest classifier gives a significantly higher percentage of correct classifications compared to the naive Bayes' classifier for all combinations of the features in the model. This is because the naive Bayes' classifier assumes that all features are equally capable at distinguishing between normal and abnormal hearts, but this assumption is clearly violated because the level of overlap in the normal distributions is not the same for all the features that we have considered. In the random forests implementation, using m=2 or m=3 did not necessarily result in an improvement in the percentage of correct classifications because of the random nature of selection of variables used in node-splitting when building the classification trees. Looking more closely at the results from random forests with m=1 shows that feature 1 (the difference in area between the ED and ES states) is better when it is the sole feature for classification (CC=68.3%) compared to features 2 (CC=52.1%), 3D (CC=42.5%) and 3κ (CC=47.9%). When combining two features, the best combination is features 1 and 3κ which give correct classification 72.5% of the time. Unlike in naive Bayes' where using feature 3D or 3κ gives the same results, 3κ gives better classification than 3D in random forests because these features are not considered equally important. As expected, the more useful information there is available, the better the classifier can be trained and consequently using 3 features gives the best results (CC=74.3%).

The results so far are for testing data where the tested dataset is independent to the training datasets. Next classification results where the tested dataset is one of the training datasets is presented. This can be interesting to consider because the classifier is typically only as good as the data used to train it. If the training data is only for one type of dataset, the classifier's use is limited to datasets of that type as it cannot accurately represent anything outside of this scope. For better general classification, it is best to train the classifier on as large a variety of datasets as possible to encompass as much variation in data as possible. In an embodiment, a clarifier is trained on a specific type of data and then used to classify that type of data. Table 2.3 shows the results for training data and shows that the correct classification percentages are significantly higher than those given in Table 2.2 with the best classifiers using two or more features to get CC=100%.

Clinical accuracies for determining whether a heart is normal or abnormal are not well-established for stress echocardiography because of the many degrees of variation that can be seen in both normal and abnormal dataset groups. Generally, a group consensus is obtained by at least two doctors in determining whether a heart is healthy. Next, sensitivity/specificity values for classifications produced by embodiments of the subject invention are compared to those by clinicians. Using random forests on testing data with m=1 and features 1, 2, and 3κ gave a specificity of 67.1% and a sensitivity of 74.7% where a positive instance is defined as an abnormal classification. This is close to the 70-80% sensitivity/specificity ranges achieved clinically (from discussions with our clinical collaborators).

TABLE 2.3

A table of the percentage of datasets correctly classified using various combinations of features in random forest (RF) classification. 3D is feature 3 with the dice coefficient and 3κ is feature 3 with Cohen's kappa coefficient as the level of segmentation agreement measure

| Features Used | RF (m − 1) |
|---|---|
| 1 | 98.8 |
| 2 | 99.4 |
| 1 & 2 | 100 |
| 3D | 88.0 |
| 1 & 3D | 100 |
| 2 & 3D | 100 |
| 1, 2 & 3D | 100 |
| 3κ | 89.8 |
| 1 & 3κ | 100 |
| 2 & 3κ | 100 |
| 1, 2 & 3κ | 100 |

The most related published work on classification is by Mansor et al. [S. Mansor, N. P. Hughes, and J. A. Noble. Wall motion classification of stress echocardiography based on combined rest-and-stress data. *Lecture Notes in Computer Science*, 5242:139-146, 2008.; S. Mansor. Wall motion classification of stress echocardiography. *DPhil Thesis*, 2009.] where regional wall motion classification is made using Hidden Markov Models (HMMs) and they achieved correct classifications in the range 70-80% for testing data and 80-90% for training data. Embodiments of the subject invention give a similar accuracy for testing data but a significantly higher accuracy for training data.

The results are promising for testing data (74% correct classification) and considerably better for training data (100% correct classification). This shows that provided the training dataset can encompass the variations that are likely to be present in any new (unseen) datasets, very accurate classification results can be obtained. One way to do this is by training the classifier using very large numbers of diverse training datasets which is likely to be a more time-consuming process (in an embodiment, training the classifier using 170 datasets and then applying to one dataset takes about 30 seconds). However, when pre-determined classifiers are applied to a dataset, the process is very fast and therefore ideal for the purpose of clinical use, where only the application step is required. Accurate determination of normal/abnormal hearts means that clinicians can then focus on the ones that are flagged as abnormal on the system and this can potentially significantly reduce the time spent on analysis.

Aspects of the invention may be described in the general context of computer-executable instructions, such as program modules, being executed by a computer. Generally, program modules include routines, programs, objects, components, data structures, etc., that perform particular tasks or implement particular abstract data types. Such program modules can be implemented with hardware components, software components, or a combination thereof. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media. Methods, data structures, interfaces, and other aspects of the invention described above can be embodied in such a computer-program product.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. In an embodiment, non-transitory media are used.

The invention may be practiced in distributed-computing environments where tasks are performed by remote-processing devices that are linked through a communications network or other communication medium. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

Numbered Embodiments

1. A method of determining a plurality of relationships between a first condition and a second condition, comprising:

receiving at least one training dataset, wherein each of the at least one training dataset comprises a first plurality of images of a subject and a second plurality of images of the subject, wherein the first plurality of images comprises images of the subject at a corresponding first plurality of timepoints within a first period of time and the second plurality of images of the subject comprises images of the subject at a corresponding second plurality of timepoints within a second period of time, wherein during the first period of time the subject is in a first condition and during the second period of time the subject is in a second condition;

identifying, in each image of the first plurality of images of each of the at least one training dataset and each image of the second plurality of images of each of the at least one training dataset, at least one position corresponding to at least one landmark in the image, wherein each of the at least one landmark in the image corresponds to a corresponding at least one structure in the subject;

aligning each image of the first plurality of images of each of the at least one training dataset to a common timescale, such that, for each of the at least one training dataset, each image of the first plurality of images is assigned a time value within the common timescale based on the timepoint of the first plurality of timepoints corresponding to the image;

aligning each image of the second plurality of images of each of the at least one training dataset to the common timescale, such that, for each of the at least one training dataset, each image of the second plurality of images is assigned a time value within the common timescale based on the timepoint of the second plurality of timepoints corresponding to the image;

generating at least one first relative position corresponding to the at least one landmark for each of the plurality of studied time values within the common timescale for each of the at least one training dataset, wherein for each studied time value of the plurality of studied time values, if the studied time value is within a certain range of the time value assigned to an image in the first plurality of images, the first relative position of the landmark is determined based on the position of the landmark in the image, and, if the studied time value is not within the certain range of the time value assigned to an image in the first plurality of images, the first relative position of the landmark is interpolated from the position of the landmark in two or more images of the first plurality of images;

generating at least one second relative position corresponding to the at least one landmark for each of the plurality of studied time values within the common timescale for each of the at least one training dataset, wherein for each studied time value of the plurality of studied time values, if the studied time value is within a certain range of the time value assigned to an image in the second plurality of images, the second relative position of the landmark is determined based on the position of the landmark in the image, and, if the studied time value is not within the certain range of the time value assigned to an image in the second plurality of images, the second relative position of the landmark is interpolated from the position of the landmark in two or more images of the second plurality of images; and determining, for each of the at least one training dataset, a plurality of relationships corresponding to the plurality of studied time values, wherein for each studied time value of the plurality of studied time values, the relationship relates the at least one of first relative position at the studied time value to the at least one second relative position at the studied time value.

2. The method of embodiment 1, wherein the at least one landmark comprises at least two landmarks.

3. The method of embodiment 2, wherein a studied time value is within a certain range of a time value assigned to an image when the studied time value is equal to the time value assigned to the image.

4. The method of embodiment 2, wherein, for each of the at least one training dataset, each relationship of the plurality of relationships is determined based on a force applied to the subject, assuming one or more forces applied to the subject are balanced.

5. The method of embodiment 2, wherein the first period of time corresponds to a first one or more occurrences of a physical cycle exhibited by the subject and the second period of time corresponds to a second one or more occurrences of the physical cycle exhibited by the subject.

6. The method of embodiment 5, wherein:
the subject is a heart;
in the first condition the heart is at rest;
in the second condition the heart is under a stress stimulus; and
the physical cycle is a cardiac cycle of the heart.

7. The method of embodiment 6, wherein, for each of the at least one training dataset, each relationship of the plurality of relationships is determined based on an amount of additional work energy required of the heart because of the stress stimulus, assuming work energy is conserved.

8. The method of embodiment 7, wherein, for each of the at least one training dataset, each relationship of the plurality of relationships is determined based on the equation:

$$\sum_{n=1}^{landmarks}(c_n x_n^{stressed} + d_n y_n^{stressed}) = \sum_{n=1}^{landmarks}(a_n x_n^{resting} + b_n y_n^{resting}) + W,$$

wherein:

a, h, c, and d are coefficients to be determined;
$x^{resting}$ and $y^{resting}$ are components of the first relative position at the studied time value of each landmark n of the at least one landmark;
$x^{stressed}$ and $y^{stressed}$ are components of the second relative position at the studied time value of each landmark n of the at least one landmark;
W is the amount of additional work energy required of the heart because of the stress stimulus; and
n varies from one to a count of the at least one landmark.

9. The method of embodiment 7, wherein, for each of the at least one training dataset, each relationship of the plurality of relationships is determined based on the equation:

$$\sum_{n=1}^{landmarks}(d_n x_n^{stressed} + e_n y_n^{stressed} + f_n z_n^{stressed}) = \sum_{n=1}^{landmarks}(a_n x_n^{resting} + b_n y_n^{resting} + c_n z_n^{resting}) + W,$$

wherein:
a, h, c, d, e, and f are coefficients to be determined;
$x^{resting}$, $y^{resting}$ and $z^{resting}$ are components of the first relative position at the studied time value of each landmark n of the at least one landmark;
$x^{stressed}$, $y^{stressed}$ and $z^{stressed}$ are components of the second relative position at the studied time value of each landmark n of the at least one landmark;
W is the amount of additional work energy required of the heart because of the stress stimulus; and
n varies from one to a count of the at least one landmark.

10. The method of embodiment 9, wherein W comprises the difference between:
a percentage of maximum heart rate of the heart in the second condition; and
a percentage of maximum heart rate of the heart in the first condition,
wherein each percentage of maximum heart rate is a ratio between:
a heart rate of the heart; and
a maximum heart rate of the heart.

11. The method of embodiment 9, wherein an image sequence processing system determines coefficients a, b, c, d, e, and f for each relationship of the plurality of relationships, for each of the at least one training dataset, by applying a multivariate regression model.

12. The method of embodiment 11, wherein the multivariate regression model is a linear multivariate regression model.

13. The method of embodiment 11, wherein the multivariate regression model is selected from the group consisting of a CCA model, a PCA model, a ICA model, and a PLSR model.

14. The method of embodiment 11, wherein each image of the first plurality of images of each of the at least one training dataset and each image of the second plurality of images of each of the at least one training dataset is an ultrasound image of the heart.

15. The method of embodiment 11, wherein one or more experts identify the position of one or more of the at least one landmark in one or more images of the first plurality of images of one or more of the at least one training dataset and/or one or more images of the second plurality of images of one or more of the at least one training dataset.

16. The method of embodiment 7, further comprising generating a plurality of combined relationships corresponding to the plurality of studied time values, wherein for each studied time value of the plurality of studied time values, the combined relationship is generated based on each relationship corresponding to the studied time value of the plurality of relationships of each of the at least one training dataset.

17. The method of embodiment 16, wherein the method further comprises:

receiving a plurality of rest images of a patient heart, wherein the plurality of rest images comprises images of the patient heart at a corresponding plurality of rest timepoints within one or more occurrences of a cardiac cycle of the patient heart wherein the patient heart is at rest;

identifying, in each image of the plurality of rest images, at least one position corresponding to the at least one landmark in the image, wherein each of the at least one landmark in the image corresponds to the corresponding at least one structure in the patient heart;

aligning each image of the plurality of rest images to the common timescale, such that each image of the plurality of rest images is assigned a time value within the common timescale based on the timepoint of the plurality of rest timepoints corresponding to the image;

generating at least one relative rest position corresponding to the at least one landmark for each of the plurality of studied time values within the common timescale, wherein for each studied time value of the plurality of studied time values, if the studied time value is within a certain range of the time value assigned to an image in the plurality of rest images, the relative rest position of the landmark is determined based on the position of the landmark in the image, and, if the studied time value is not within the certain range of the time value assigned to an image in the plurality of rest images, the relative rest position of the landmark is interpolated from the position of the landmark in two or more images of the plurality of rest images; and predicting at least one stress position corresponding to the at least one landmark for each of the plurality of studied time values within the common timescale, wherein for each studied time value of the plurality of studied time values the at least one predicted stress position is predicted based on:

the at least one relative rest position at the studied time value; and the combined relationship of the plurality of combined relationships corresponding to the studied time value, wherein each at least one predicted stress position represents a position of the corresponding landmark in a hypothetical image of the patient heart at the studied time value when the patient heart is under an amount of stress.

18. The method of embodiment 17, wherein the method further comprises:

receiving a plurality of stressed images of the patient heart, wherein the plurality of stressed images comprises images of the patient heart at a corresponding plurality of stressed timepoints within one or more occurrences of the cardiac cycle of the patient heart wherein the patient heart is under the amount of stress;

aligning each image of the plurality of stressed images to the common timescale, such that each image of the plurality of stressed images is assigned a time value within the common timescale based on the timepoint of the plurality of stressed timepoints corresponding to the image; and predicting at least one position corresponding to the at least one landmark for each image of the plurality of stressed images, wherein if the time value assigned to the image is within the certain range of a studied time value of the plurality of studied time values, the position of each landmark in the image is predicted based on the predicted stress position of the landmark at the studied time value, and, if the time value assigned to the image is not within the certain range of a studied time value of the plurality of studied time values, the position of each landmark in the image is interpolated from the predicted stress position of the landmark at two or more of the plurality of studied time values.

19. The method of embodiment 18, wherein each at least one structure in the patient heart is a structure on an endocardial and/or epicardial border of the patient heart.

20. The method of embodiment 19, the method further comprising:

approximating, for one or more images of the plurality of stressed images, at least one border, wherein for each image of the one or more images each of the at least one border is approximated based on the predicted position of one or more of the at least one landmark in the image, wherein each of the at least one border approximates an endocardial border and/or an epicardial border of the patient heart under the amount of stress; and/or approximating, for one or more images of the plurality of rest images, at least one border, wherein for each image of the one or more images each of the at least one border is approximated based on the position of one or more of the at least one landmark in the image, wherein each of the at least one border approximates an endocardial border and/or an epicardial border of the patient heart at rest.

21. The method of embodiment 20, the method further comprising:

generating at least one time-aligned pair of images, wherein each at least one time-aligned pair of images has an associated time value and comprises:

a rest image taken from the plurality of rest images and assigned the associated time value; and a stressed image taken from the plurality of stressed images and assigned the associated time value; and refining a position of one or more points on an approximated border of the stressed image of one or more of the at least one time-aligned pair of images, wherein refining the position of each of the one or more points on the approximated border of the stressed image of each of the one or more of the at least one time-aligned pair of images, comprises:

identifying a corresponding position on an approximated border of the rest image of the time-aligned pair of images;

defining a template set of pixels in the rest image, wherein the template set comprises a pixel corresponding to the corresponding position and one or more additional template pixels;

defining a search window set of pixels in the stressed image, wherein the search window set comprises a pixel corresponding to the position and one or more additional search pixels, and wherein the search window set comprises a plurality of possible displacements of the template set;

identifying a match between the template set and at least one of the plurality of possible displacements; and updating the position based on the at least one of the plurality of possible displacements.

22. The method of embodiment 21, the method further comprising:

deriving features from the plurality of stress images and the plurality of rest images; classifying motion of the patient heart as abnormal based on the derived features; and recommending further review of the patient heart.

23. A method of predicting at least one predicted second position corresponding to at least one landmark, comprising:

receiving a plurality of relationships corresponding to a plurality of studied time values within a common timescale, wherein for each studied time value of the plurality of studied time values, the relationship relates at least one first position corresponding to at least one landmark at the studied time value to at least one second position corresponding to the at least one landmark at the studied time value;

receiving a first plurality of images of an inquire subject, wherein the first plurality of images comprises images of the inquire subject at a corresponding first plurality of timepoints within a first period of time, wherein during the first period of time the inquire subject is in a first condition;

identifying, in each image of the first plurality of images, at least one position corresponding to the at least one landmark in the image, wherein each of the at least one landmark in the image corresponds to a corresponding at least one structure in the inquire subject;

aligning each image of the first plurality of images to the common timescale, such that each image of the first plurality of images is assigned a time value within the common timescale based on the timepoint of the first plurality of timepoints corresponding to the image;

generating at least one first relative position corresponding to the at least one landmark for each of the plurality of studied time values within the common timescale, wherein for each studied time value of the plurality of studied time values, if the studied time value is within a certain range of the time value assigned to an image in the first plurality of images, the first relative position of the landmark is determined based on the position of the landmark in the image, and, if the studied time value is not within the certain range of the time value assigned to an image in the first plurality of images, the first relative position of the landmark is interpolated from the position of the landmark in two or more images of the first plurality of images; and predicting at least one predicted second position corresponding to the at least one landmark for each of the plurality of studied time values within the common timescale, wherein for each studied time value of the plurality of studied time values the at least one predicted second position is predicted based on:
  the at least one first relative position at the studied time value; and
  the relationship of the plurality of relationships corresponding to the studied time value, wherein each at least one predicted second position represents a position of the corresponding landmark in a hypothetical image of the inquire subject at the studied time value when the inquire subject is in a second condition.

24. The method of embodiment 23, wherein the method further comprises:
  receiving a second plurality of images of the inquire subject, wherein the second plurality of images comprises images of the inquire subject at a corresponding second plurality of timepoints within a second period of time, wherein during the second period of time the inquire subject is in the second condition
  aligning each image of the second plurality of images to the common timescale, such that each image of the second plurality of images is assigned a time value within the common timescale based on the timepoint of the second plurality of timepoints corresponding to the image; and
  predicting at least one position corresponding to the at least one landmark for each image of the second plurality of images, wherein if the time value assigned to the image is within the certain range of a studied time value of the plurality of studied time values, the position of each landmark in the image is predicted based on the predicted second position of the landmark at the studied time value, and, if the time value assigned to the image is not within the certain range of a studied time value of the plurality of studied time values, the position of each landmark in the image is interpolated from the predicted second position of the landmark at two or more of the plurality of studied time values.

25. The method of embodiment 24, wherein the at least one landmark comprises at least two landmarks.

26. The method of embodiment 25, wherein the first period of time corresponds to a first one or more occurrences of a physical cycle exhibited by the inquire subject and the second period of time corresponds to a second one or more occurrences of the physical cycle exhibited by the inquire subject.

27. The method of embodiment 26, wherein:
  the inquire subject is a heart;
  in the first condition the heart is at rest;
  in the second condition the heart is under a stress stimulus;
  the physical cycle is a cardiac cycle of the heart.

28. The method of embodiment 27, wherein, for each studied time value of the plurality of studied time values, the at least one predicted second position is predicted according to the equation:

$$\sum_{n=1}^{landmarks} (c_n x_n^{stressed} + d_n y_n^{stressed}) = \sum_{n=1}^{landmarks} (a_n x_n^{resting} + b_n y_n^{resting}) + W,$$

wherein:
  receiving the plurality of relationships comprises receiving coefficients a, b, c, and d for each studied time value of the plurality of studied time values;
  $x^{resting}$, $y^{resting}$ are components of the first relative position at the studied time value of each landmark n of the at least one landmark;
  W is an amount of additional work energy required of the heart in the second condition;
  n varies from one to a count of the at least one landmark; and
  $x^{stressed}$ and $y^{stressed}$ are components of the predicated second position at the studied time value for each landmark n of the at least one landmark.

29. The method of embodiment 27, wherein, for each studied time value of the plurality of studied time values, the at least one predicted second position is predicted according to the equation:

$$\sum_{n=1}^{landmarks} (d_n x_n^{stressed} + e_n y_n^{stressed} + f_n z_n^{stressed}) = \sum_{n=1}^{landmarks} (a_n x_n^{resting} + b_n y_n^{resting} + c_n z_n^{resting}) + W,$$

wherein:
  receiving the plurality of relationships comprises receiving coefficients a, b, c, d, e, and f for each studied time value of the plurality of studied time values;

$x^{resting}$, $y^{resting}$, and $z^{resting}$ are components of the first relative position at the studied time value of each landmark n of the at least one landmark;

W is an amount of additional work energy required of the heart in the second condition;

n varies from one to a count of the at least one landmark; and $x^{stressed}$, $y^{stressed}$, and $z^{stressed}$ are components of the predicated second position at the studied time value for each landmark n of the at least one landmark.

30. The method of embodiment 29, wherein W comprises the difference between:
    a percentage of maximum heart rate of the heart in the second condition; and
    a percentage of maximum heart rate of the heart in the first condition,
    wherein each percentage of maximum heart rate is a ratio between:
    a heart rate of the heart; and
    a maximum heart rate of the heart.

31. The method of embodiment 29, wherein the aligning each image of the first plurality of images to the common timescale comprises:
    identifying in the first plurality of images at least three phase images corresponding to a corresponding at least three of phases of the cardiac cycle of the heart; and
    assigning a time value to each image the first plurality of images, wherein the at least three phase images are assigned time values relative to an established timing of their corresponding phases in the cardiac cycle of the heart and the remaining images of the first plurality of images are assigned time values relative to their timing in relation to the at least three phase images.

32. The method of embodiment 31, wherein the position of each landmark of the at least one landmark in each image of the first plurality of images is represented by a displacement of the landmark in the image from an origin position.

33. The method of embodiment 32, wherein the origin position is defined for each landmark of the at least one landmark as a location of the landmark in a start phase image selected from the at least three phase images.

34. The method of embodiment 33, wherein the start phase image corresponds to an end diastolic phase of the cardiac cycle of the heart.

35. The method of embodiment 29, the method further comprising:
    approximating, for one or more images of the second plurality of images, at least one border, wherein for each image of the one or more images each of the at least one border is approximated based on the predicted position of one or more of the at least one landmark in the image, wherein each of the at least one border approximates an endocardial border and/or an epicardial border of the heart in the second condition; and/or
    approximating, for one or more images of the first plurality of images, at least one border, wherein for each image of the one or more images each of the at least one border is approximated based on the position of one or more of the at least one landmark in the image, wherein each of the at least one border approximates an endocardial border and/or an epicardial border of the heart in the first condition.

36. The method of embodiment 35, the method further comprising:
    generating at least one time-aligned pair of images, wherein each at least one time-aligned pair of images has an associated time value and comprises:
    a rest image taken from the first plurality of images and assigned the associated time value; and
    a stressed image taken from the second plurality of images and assigned the associated time value; and
    refining a position of one or more points on an approximated border of the stressed image of one or more of the at least one time-aligned pair of images, wherein refining the position of each of the one or more points on the approximated border of the stressed image of each of the one or more of the at least one time-aligned pair of images, comprises:
    identifying a corresponding position on an approximated border of the rest image of the time-aligned pair of images;
    defining a template set of pixels in the rest image, wherein the template set comprises a pixel corresponding to the corresponding position and one or more additional template pixels;
    defining a search window set of pixels in the stressed image, wherein the search window set comprises a pixel corresponding to the position and one or more additional search pixels, and wherein the search window set comprises a plurality of possible displacements of the template set;
    identifying a match between the template set and at least one of the plurality of possible displacements; and
    updating the position based on the at least one of the plurality of possible displacements.

37. The method of embodiment 36, the method further comprising:
    deriving features from the first plurality of images and the second plurality of images;
    classifying motion of the heart as abnormal based on the derived features; and
    recommending further review of the heart.

38. The method of embodiment 23, wherein the plurality of relationships are received from one or more data structures embodied on one or more computer-readable media.

39. A method of refining a feature associated with an image, comprising:
    receiving at least one time-aligned pair of images of a heart, wherein each at least one time-aligned pair of images comprises a rest image and a stressed image, wherein the rest image comprises an image of the heart at a particular point in time in the cardiac cycle of the heart when the heart is at rest and the stressed image comprises an image of the heart at the particular point in time in the cardiac cycle of the heart when the heart is under a stress stimulus, wherein each stressed image of the at least one time-aligned pair of images has a feature associated therewith, wherein the feature comprises at least one point wherein each at least one point has a position in the stressed image; and
    refining the position of one or more points in the feature associated with the stressed image of one or more of the at least one time-aligned pair of images based on information derived from the rest image of one or more of the at least one time-aligned pair of images.

40. The method of embodiment 39, wherein the method further comprises identifying the at least one time-aligned pair of images from a plurality of images of the heart at rest and a plurality of images of the heart under the stress stimulus, wherein for each of the at least one time-aligned pair of images:
    the rest image is identified in the plurality of images of the heart at rest; and the stressed image is identified in the plurality of images of the heart under the stress stimulus.

41. The method of embodiment 40, wherein the refining the position of each of the one or more points in the feature associated with the stressed image of each of the one or more of the at least one time-aligned pair of images, comprises:
identifying a corresponding position in the rest image of the time-aligned pair of images; and
updating the position based on texture information near the corresponding position in the rest image.

42. The method of embodiment 41, wherein updating the position based on texture information near the corresponding position in the rest image, comprises:
defining a template set of pixels in the rest image, wherein the template set comprises a pixel corresponding to the corresponding position and one or more additional template pixels;
defining a search window set of pixels in the stressed image, wherein the search window set comprises a pixel corresponding to the position and one or more additional search pixels, and wherein the search window set comprises a plurality of possible displacements of the template set;
computing a similarity measure for one or more of the plurality of possible displacements, wherein the similarity measure represents a degree of textural similarity between the template set and the displacement;
updating the position based on at least one of the plurality of possible displacements.

43. The method of embodiment 42, wherein the similarity measure is computed by one or more suitably programmed computers.

44. The method of embodiment 42, wherein the position is updated based on the displacement of the plurality of possible displacements with the greatest computed similarity measure.

45. The method of embodiment 42, wherein the position is updated based on two or more displacements of the plurality of possible displacements and the effect of each displacement of the two or more displacements on the position is weighted based on the computed similarity measure of the displacement.

46. The method of embodiment 42, wherein the similarity measure is based on Rayleigh distributed speckle in the template set and the displacement.

47. The method of embodiment 44, wherein:
the template set is a block of pixels centered on the pixel corresponding to the corresponding position in the rest image;
the search window set is a block of pixels centered on the pixel corresponding to the position in the stressed image; and
the position is updated to correspond to a pixel at a center of the displacement with the greatest computed similarity measure.

48. The method of embodiment 42, wherein:
the template set is a 3×3 block of pixels contiguous to the pixel corresponding to the corresponding position in the rest image;
the search window set is a 5×5 block of pixels centered on the pixel corresponding to the position in the stressed image; and
the plurality of possible displacements consists of nine overlapping displacements of the 3×3 block of pixels within the 5×5 block of pixels.

49. The method of embodiment 42, wherein the feature approximates an epicardial border and/or an endocardial border of the heart.

50. A method of temporally aligning a plurality of images of a heart, comprising:
identifying in a plurality of images of a heart at least three phase images corresponding to a corresponding at least three phases of a cardiac cycle of the heart, wherein the plurality of images comprises images of the heart at a corresponding plurality of timepoints within the cardiac cycle of the heart, wherein the plurality of images are sequenced in the order of their corresponding timepoints within the cardiac cycle of the heart; and
assigning a time value to each image of the plurality of images, wherein the at least three phase images are assigned time values based on an established timing of their corresponding phases in the cardiac cycle of the heart and the remaining images of the plurality of images are assigned time values based on at least two piecewise interpolation functions, wherein for each consecutive pair of phase images of the at least three phase images a suitable programmed computer applies one of the at least two piecewise interpolation functions to the images sequenced between the consecutive pair of phase images to determine the assigned time values of the images based on the time values assigned to the consecutive pair of phase images.

51. The method of embodiment 50, wherein one or more of the at least two piecewise interpolation functions is a linear function.

In embodiments of the subject invention, computer-usable instructions for performing each of the methods described above are embodied on one or more computer-readable media. With respect to embodiment 38, the computer-usable instructions can be embodied on the one or more computer-readable media recited in the embodiment. In embodiments of the subject invention, at least one of the one or more computer-readable media can be incorporated into an image sequence processing system such as the image sequence processing system 103 discussed above.

The invention claimed is:

1. A method of determining a plurality of relationships between a first condition and a second condition, comprising:
receiving at least one training dataset, wherein each of the at least one training dataset comprises a first plurality of images of a subject and a second plurality of images of the subject, wherein the first plurality of images comprises images of the subject at a corresponding first plurality of timepoints within a first period of time and the second plurality of images of the subject comprises images of the subject at a corresponding second plurality of timepoints within a second period of time, wherein during the first period of time the subject is in a first condition and during the second period of time the subject is in a second condition;
identifying, in each image of the first plurality of images of each of the at least one training dataset and each image of the second plurality of images of each of the at least one training dataset, at least one position corresponding to at least one landmark in the image, wherein each of the at least one landmark in the image corresponds to a corresponding at least one structure in the subject;
aligning each image of the first plurality of images of each of the at least one training dataset to a common timescale, such that, for each of the at least one training dataset, each image of the first plurality of images is assigned a time value within the common timescale based on the timepoint of the first plurality of timepoints corresponding to the image;

aligning each image of the second plurality of images of each of the at least one training dataset to the common timescale, such that, for each of the at least one training dataset, each image of the second plurality of images is assigned a time value within the common timescale based on the timepoint of the second plurality of timepoints corresponding to the image;

generating, by a computer processor, at least one first relative position corresponding to the at least one landmark for each of the plurality of studied time values within the common timescale for each of the at least one training dataset, wherein for each studied time value of the plurality of studied time values, if the studied time value is within a certain range of the time value assigned to an image in the first plurality of images, the first relative position of the landmark is determined based on the position of the landmark in the image, and, if the studied time value is not within the certain range of the time value assigned to an image in the first plurality of images, the first relative position of the landmark is interpolated from the position of the landmark in two or more images of the first plurality of images;

generating at least one second relative position corresponding to the at least one landmark for each of the plurality of studied time values within the common timescale for each of the at least one training dataset, wherein for each studied time value of the plurality of studied time values, if the studied time value is within a certain range of the time value assigned to an image in the second plurality of images, the second relative position of the landmark is determined based on the position of the landmark in the image, and, if the studied time value is not within the certain range of the time value assigned to an image in the second plurality of images, the second relative position of the landmark is interpolated from the position of the landmark in two or more images of the second plurality of images; and determining, for each of the at least one training dataset, a plurality of relationships corresponding to the plurality of studied time values, wherein for each studied time value of the plurality of studied time values, the relationship relates the at least one of first relative position at the studied time value to the at least one second relative position at the studied time value.

2. The method of claim 1, wherein the at least one landmark comprises at least two landmarks.

3. The method of claim 2, wherein a studied time value is within a certain range of a time value assigned to an image when the studied time value is equal to the time value assigned to the image.

4. The method of claim 2, wherein, for each of the at least one training dataset, each relationship of the plurality of relationships is determined based on a force applied to the subject, assuming one or more forces applied to the subject are balanced.

5. The method of claim 2, wherein the first period of time corresponds to a first one or more occurrences of a physical cycle exhibited by the subject and the second period of time corresponds to a second one or more occurrences of the physical cycle exhibited by the subject.

6. The method of claim 5 wherein:
the subject is a heart;
in the first condition the heart is at rest;
in the second condition the heart is under a stress stimulus; and
the physical cycle is a cardiac cycle of the heart.

7. The method of claim 6, wherein, for each of the at least one training dataset, each relationship of the plurality of relationships is determined based on an amount of additional work energy required of the heart because of the stress stimulus, assuming work energy is conserved.

8. The method of claim 7, wherein, for each of the at least one training dataset, each relationship of the plurality of relationships is determined based on the equation:

$$\sum_{n=1}^{landmarks} (c_n x_n^{stressed} + d_n y_n^{stressed}) = \sum_{n=1}^{landmarks} (a_n x_n^{resting} + b_n y_n^{resting}) + W,$$

wherein:
a, b, c, and d are coefficients to be determined;
$x^{resting}$ and $y^{resting}$ are components of the first relative position at the studied time value of each landmark n of the at least one landmark;
$x^{stressed}$ and $y^{stressed}$ are components of the second relative position at the studied time value of each landmark n of the at least one landmark;
W is the amount of additional work energy required of the heart because of the stress stimulus; and
n varies from one to a count of the at least one landmark.

9. The method of claim 7, wherein, for each of the at least one training dataset, each relationship of the plurality of relationships is determined based on the equation:

$$\sum_{n=1}^{landmarks} (d_n x_n^{stressed} + e_n y_n^{stressed} + f_n z_n^{stressed}) = \sum_{n=1}^{landmarks} (a_n x_n^{resting} + b_n y_n^{resting} + c_n z_n^{resting}) + W,$$

wherein:
a, b, c, d, e, and f are coefficients to be determined;
$x^{resting}$, $y^{resting}$, and $z^{resting}$ are components of the first relative position at the studied time value of each landmark n of the at least one landmark;
$x^{stressed}$, $y^{stressed}$, and $z^{stressed}$ are components of the second relative position at the studied time value of each landmark n of the at least one landmark;
W is the amount of additional work energy required of the heart because of the stress stimulus; and
n varies from one to a count of the at least one landmark.

10. The method of claim 9, wherein W comprises the difference between:
a percentage of maximum heart rate of the heart in the second condition; and
a percentage of maximum heart rate of the heart in the first condition,
wherein each percentage of maximum heart rate is a ratio between:
a heart rate of the heart; and
a maximum heart rate of the heart.

11. The method of claim 9, wherein an image sequence processing system determines coefficients a, b, c, d, e, and f for each relationship of the plurality of relationships, for each of the at least one training dataset, by applying a multivariate regression model.

12. The method of claim 11, wherein the multivariate regression model is a linear multivariate regression model.

13. The method of claim 11, wherein the multivariate regression model is selected from the group consisting of a CCA model, a PCA model, a ICA model, and a PLSR model.

14. The method of claim 11, wherein each image of the first plurality of images of each of the at least one training dataset and each image of the second plurality of images of each of the at least one training dataset is an ultrasound image of the heart.

15. The method of claim 11, wherein one or more experts identify the position of one or more of the at least one landmark in one or more images of the first plurality of images of one or more of the at least one training dataset and/or one or more images of the second plurality of images of one or more of the at least one training dataset.

16. The method of claim 7, further comprising generating a plurality of combined relationships corresponding to the plurality of studied time values, wherein for each studied time value of the plurality of studied time values, the combined relationship is generated based on each relationship corresponding to the studied time value of the plurality of relationships of each of the at least one training dataset.

17. The method of claim 16, wherein the method further comprises:
receiving a plurality of rest images of a patient heart, wherein the plurality of rest images comprises images of the patient heart at a corresponding plurality of rest timepoints within one or more occurrences of a cardiac cycle of the patient heart wherein the patient heart is at rest;
identifying, in each image of the plurality of rest images, at least one position corresponding to the at least one landmark in the image, wherein each of the at least one landmark in the image corresponds to the corresponding at least one structure in the patient heart;
aligning each image of the plurality of rest images to the common timescale, such that each image of the plurality of rest images is assigned a time value within the common timescale based on the timepoint of the plurality of rest timepoints corresponding to the image;
generating at least one relative rest position corresponding to the at least one landmark for each of the plurality of studied time values within the common timescale, wherein for each studied time value of the plurality of studied time values, if the studied time value is within a certain range of the time value assigned to an image in the plurality of rest images, the relative rest position of the landmark is determined based on the position of the landmark in the image, and, if the studied time value is not within the certain range of the time value assigned to an image in the plurality of rest images, the relative rest position of the landmark is interpolated from the position of the landmark in two or more images of the plurality of rest images; and
predicting at least one stress position corresponding to the at least one landmark for each of the plurality of studied time values within the common timescale, wherein for each studied time value of the plurality of studied time values the at least one predicted stress position is predicted based on:
the at least one relative rest position at the studied time value; and
the combined relationship of the plurality of combined relationships corresponding to the studied time value,
wherein each at least one predicted stress position represents a position of the corresponding landmark in a hypothetical image of the patient heart at the studied time value when the patient heart is under an amount of stress.

18. The method of claim 17, wherein the method further comprises:
receiving a plurality of stressed images of the patient heart, wherein the plurality of stressed images comprises images of the patient heart at a corresponding plurality of stressed timepoints within one or more occurrences of the cardiac cycle of the patient heart wherein the patient heart is under the amount of stress;
aligning each image of the plurality of stressed images to the common timescale, such that each image of the plurality of stressed images is assigned a time value within the common timescale based on the timepoint of the plurality of stressed timepoints corresponding to the image; and
predicting at least one position corresponding to the at least one landmark for each image of the plurality of stressed images, wherein if the time value assigned to the image is within the certain range of a studied time value of the plurality of studied time values, the position of each landmark in the image is predicted based on the predicted stress position of the landmark at the studied time value, and, if the time value assigned to the image is not within the certain range of a studied time value of the plurality of studied time values, the position of each landmark in the image is interpolated from the predicted stress position of the landmark at two or more of the plurality of studied time values.

19. The method of claim 18, wherein each at least one structure in the patient heart is a structure on an endocardial and/or epicardial border of the patient heart.

20. The method of claim 19, the method further comprising:
approximating, for one or more images of the plurality of stressed images, at least one border, wherein for each image of the one or more images each of the at least one border is approximated based on the predicted position of one or more of the at least one landmark in the image, wherein each of the at least one border approximates an endocardial border and/or an epicardial border of the patient heart under the amount of stress; and/or
approximating, for one or more images of the plurality of rest images, at least one border, wherein for each image of the one or more images each of the at least one border is approximated based on the position of one or more of the at least one landmark in the image, wherein each of the at least one border approximates an endocardial border and/or an epicardial border of the patient heart at rest.

21. The method of claim 20, the method further comprising:
generating at least one time-aligned pair of images, wherein each at least one time-aligned pair of images has an associated time value and comprises:
a rest image taken from the plurality of rest images and assigned the associated time value; and
a stressed image taken from the plurality of stressed images and assigned the associated time value; and
refining a position of one or more points on an approximated border of the stressed image of one or more of the at least one time-aligned pair of images, wherein refining the position of each of the one or more points on the approximated border of the stressed image of each of the one or more of the at least one time-aligned pair of images, comprises:

identifying a corresponding position on an approximated border of the rest image of the time-aligned pair of images;

defining a template set of pixels in the rest image, wherein the template set comprises a pixel corresponding to the corresponding position and one or more additional template pixels;

defining a search window set of pixels in the stressed image, wherein the search window set comprises a pixel corresponding to the position and one or more additional search pixels, and wherein the search window set comprises a plurality of possible displacements of the template set;

identifying a match between the template set and at least one of the plurality of possible displacements; and updating the position based on the at least one of the plurality of possible displacements.

22. The method of claim 21, the method further comprising:

deriving features from the plurality of stress images and the plurality of rest images;

classifying motion of the patient heart as abnormal based on the derived features; and recommending further review of the patient heart.

23. A method of predicting at least one predicted second position corresponding to at least one landmark, comprising:

receiving a plurality of relationships corresponding to a plurality of studied time values within a common timescale, wherein for each studied time value of the plurality of studied time values, the relationship relates at least one first position corresponding to at least one landmark at the studied time value to at least one second position corresponding to the at least one landmark at the studied time value;

receiving a first plurality of images of an inquire subject, wherein the first plurality of images comprises images of the inquire subject at a corresponding first plurality of timepoints within a first period of time, wherein during the first period of time the inquire subject is in a first condition;

identifying, in each image of the first plurality of images, at least one position corresponding to the at least one landmark in the image, wherein each of the at least one landmark in the image corresponds to a corresponding at least one structure in the inquire subject;

aligning each image of the first plurality of images to the common timescale, such that each image of the first plurality of images is assigned a time value within the common timescale based on the timepoint of the first plurality of timepoints corresponding to the image;

generating, by computer processor, at least one first relative position corresponding to the at least one landmark for each of the plurality of studied time values within the common timescale, wherein for each studied time value of the plurality of studied time values, if the studied time value is within a certain range of the time value assigned to an image in the first plurality of images, the first relative position of the landmark is determined based on the position of the landmark in the image, and, if the studied time value is not within the certain range of the time value assigned to an image in the first plurality of images, the first relative position of the landmark is interpolated from the position of the landmark in two or more images of the first plurality of images; and predicting at least one predicted second position corresponding to the at least one landmark for each of the plurality of studied time values within the common timescale, wherein for each studied time value of the plurality of studied time values the at least one predicted second position is predicted based on:

the at least one first relative position at the studied time value; and the relationship of the plurality of relationships corresponding to the studied time value, wherein each predicted second position of the at least one predicted second position represents a position of the corresponding landmark in a hypothetical image of the inquire subject at the studied time value when the inquire subject is in a second condition.

24. The method of claim 23, wherein the method further comprises:

receiving a second plurality of images of the inquire subject, wherein the second plurality of images comprises images of the inquire subject at a corresponding second plurality of timepoints within a second period of time, wherein during the second period of time the inquire subject is in the second condition;

aligning each image of the second plurality of images to the common timescale, such that each image of the second plurality of images is assigned a time value within the common timescale based on the timepoint of the second plurality of timepoints corresponding to the image; and predicting at least one position corresponding to the at least one landmark for each image of the second plurality of images, wherein if the time value assigned to the image is within the certain range of a studied time value of the plurality of studied time values, the position of each landmark in the image is predicted based on the predicted second position of the landmark at the studied time value, and, if the time value assigned to the image is not within the certain range of a studied time value of the plurality of studied time values, the position of each landmark in the image is interpolated from the predicted second position of the landmark at two or more of the plurality of studied time values.

25. The method of claim 24, wherein the at least one landmark comprises at least two landmarks.

26. The method of claim 25, wherein the first period of time corresponds to a first one or more occurrences of a physical cycle exhibited by the inquire subject and the second period of time corresponds to a second one or more occurrences of the physical cycle exhibited by the inquire subject.

27. The method of claim 26, wherein:
the inquire subject is a heart;
in the first condition the heart is at rest;
in the second condition the heart is under a stress stimulus;
the physical cycle is a cardiac cycle of the heart.

28. The method of claim 27, wherein, for each studied time value of the plurality of studied time values, the at least one predicted second position is predicted according to the equation:

$$\sum_{n=1}^{landmarks} (c_n x_n^{stressed} + d_n y_n^{stressed}) = \sum_{n=1}^{landmarks} (a_n x_n^{resting} + b_n y_n^{resting}) + W,$$

wherein:
receiving the plurality of relationships comprises receiving coefficients a, b, c, and d for each studied time value of the plurality of studied time values;

$x^{resting}$ and $y^{resting}$ are components of the first relative position at the studied time value of each landmark n of the at least one landmark;

W is an amount of additional work energy required of the heart in the second condition;

n varies from one to a count of the at least one landmark; and $x^{stressed}$ and $y^{stressed}$ are components of the predicated second position at the studied time value for each landmark n of the at least one landmark.

29. The method of claim 27, wherein, for each studied time value of the plurality of studied time values, the at least one predicted second position is predicted according to the equation:

$$\sum_{n=1}^{landmarks}(d_n x_n^{stressed} + e_n y_n^{stressed} + f_n z_n^{stressed}) = \sum_{n=1}^{landmarks}(a_n x_n^{resting} + b_n y_n^{resting} + c_n z_n^{resting}) + W,$$

wherein:

receiving the plurality of relationships comprises receiving coefficients a, b, c, d, e, and f for each studied time value of the plurality of studied time values;

$x^{resting}$, $y^{resting}$, and $z^{resting}$ are components of the first relative position at the studied time value of each landmark n of the at least one landmark;

W is an amount of additional work energy required of the heart in the second condition;

n varies from one to a count of the at least one landmark; and $x^{stressed}$, $y^{stressed}$, and $z^{stressed}$ are components of the predicated second position at the studied time value for each landmark n of the at least one landmark.

30. The method of claim 29, wherein W comprises the difference between:

a percentage of maximum heart rate of the heart in the second condition; and a percentage of maximum heart rate of the heart in the first condition, wherein each percentage of maximum heart rate is a ratio between:

a heart rate of the heart; and a maximum heart rate of the heart.

31. The method of claim 29, wherein the aligning each image of the first plurality of images to the common timescale comprises:

identifying in the first plurality of images at least three phase images corresponding to a corresponding at least three of phases of the cardiac cycle of the heart; and assigning a time value to each image the first plurality of images, wherein the at least three phase images are assigned time values relative to an established timing of their corresponding phases in the cardiac cycle of the heart and the remaining images of the first plurality of images are assigned time values relative to their timing in relation to the at least three phase images.

32. The method of claim 31, wherein the position of each landmark of the at least one landmark in each image of the first plurality of images is represented by a displacement of the landmark in the image from an origin position.

33. The method of claim 32, wherein the origin position is defined for each landmark of the at least one landmark as a location of the landmark in a start phase image selected from the at least three phase images.

34. The method of claim 33, wherein the start phase image corresponds to an end diastolic phase of the cardiac cycle of the heart.

35. The method of claim 29, the method further comprising:

approximating, for one or more images of the second plurality of images, at least one border, wherein for each image of the one or more images each of the at least one border is approximated based on the predicted position of one or more of the at least one landmark in the image, wherein each of the at least one border approximates an endocardial border and/or an epicardial border of the heart in the second condition; and/or approximating, for one or more images of the first plurality of images, at least one border, wherein for each image of the one or more images each of the at least one border is approximated based on the position of one or more of the at least one landmark in the image, wherein each of the at least one border approximates an endocardial border and/or an epicardial border of the heart in the first condition.

36. The method of claim 35, the method further comprising:

generating at least one time-aligned pair of images, wherein each at least one time-aligned pair of images has an associated time value and comprises:

a rest image taken from the first plurality of images and assigned the associated time value; and a stressed image taken from the second plurality of images and assigned the associated time value; and refining a position of one or more points on an approximated border of the stressed image of one or more of the at least one time-aligned pair of images, wherein refining the position of each of the one or more points on the approximated border of the stressed image of each of the one or more of the at least one time-aligned pair of images, comprises:

identifying a corresponding position on an approximated border of the rest image of the time-aligned pair of images;

defining a template set of pixels in the rest image, wherein the template set comprises a pixel corresponding to the corresponding position and one or more additional template pixels;

defining a search window set of pixels in the stressed image, wherein the search window set comprises a pixel corresponding to the position and one or more additional search pixels, and wherein the search window set comprises a plurality of possible displacements of the template set;

identifying a match between the template set and at least one of the plurality of possible displacements; and updating the position based on the at least one of the plurality of possible displacements.

37. The method of claim 36, the method further comprising:

deriving features from the first plurality of images and the second plurality of images;

classifying motion of the heart as abnormal based on the derived features; and recommending further review of the heart.

38. One or more non-transitory computer-readable media having computer-useable instructions embodied thereon for performing a method of predicting at least one predicted second position corresponding to at least one landmark, the method comprising:

receiving a plurality of relationships corresponding to a plurality of studied time values within a common timescale, wherein for each studied time value of the plurality of studied time values, the relationship relates at least one first position corresponding to at least one landmark at the studied time value to at least one second position corresponding to the at least one landmark at the studied time value;

receiving a first plurality of images of an inquire subject, wherein the first plurality of images comprises images of the inquire subject at a corresponding first plurality of timepoints within a first period of time, wherein during the first period of time the inquire subject is in a first condition;

identifying, in each image of the first plurality of images, at least one position corresponding to the at least one landmark in the image, wherein each of the at least one landmark in the image corresponds to a corresponding at least one structure in the inquire subject;

aligning each image of the first plurality of images to the common timescale, such that each image of the first plurality of images is assigned a time value within the common timescale based on the timepoint of the first plurality of timepoints corresponding to the image;

generating at least one first relative position corresponding to the at least one landmark for each of the plurality of studied time values within the common timescale, wherein for each studied time value of the plurality of studied time values, if the studied time value is within a certain range of the time value assigned to an image in the first plurality of images, the first relative position of the landmark is determined based on the position of the landmark in the image, and, if the studied time value is not within the certain range of the time value assigned to an image in the first plurality of images, the first relative position of the landmark is interpolated from the position of the landmark in two or more images of the first plurality of images; and predicting at least one predicted second position corresponding to the at least one landmark for each of the plurality of studied time values within the common timescale, wherein for each studied time value of the plurality of studied time values the at least one predicted second position is predicted based on:

the at least one first relative position at the studied time value; and the relationship of the plurality of relationships corresponding to the studied time value, wherein each at least one predicted second position represents a position of the corresponding landmark in a hypothetical image of the inquire subject at the studied time value when the inquire subject is in a second condition.

39. The media of claim 38, wherein the plurality of relationships are received from one or more data structures embodied on the one or more computer-readable media.

* * * * *

UNITED STATES PATENT AND TRADEMARK OFFICE
CERTIFICATE OF CORRECTION

PATENT NO. : 8,396,268 B2
APPLICATION NO. : 12/751766
DATED : March 12, 2013
INVENTOR(S) : Adeala T. Zabair et al.

It is certified that error appears in the above-identified patent and that said Letters Patent is hereby corrected as shown below:

In the Specification

Column 28,
Line 27, "MI-IR" should read --MHR--.

Column 34,
Line 54, "image segmentation" should read --Image segmentation--.

Column 35,
Line 11, "x(s) = [x(s),y(s)], s∈[0, 1]" should read --x($s$) = [$x(s),y(s)$], $s$∈ [0, 1]--.
Line 13, "x'(s) and x"(s)" should read --x'($s$) and x"($s$)--.
Line 14, "x(s)" should read --x($s$)--.
Line 14, "E$_{ext}$(x(s))" should read --E$_{ext}$(x($s$))--.

Column 38,
Line 24, "0≦ê≦1" should read --0 ≤ ê ≤ 1--.

Column 41,
Line 5, "Maglayeras" should read --Maglaveras--.
Line 15, "tracking algorithm." should read --tracking algorithms.--.

Column 44,
Line 65, " $\alpha_{ij} = \beta_{ij} + \hat{\eta}_{ij}$, where $\hat{\eta}_{ij}$ l.$n$ ($\eta_{ij}$)." should read
-- $\alpha_{ij} = \beta_{ij} + \hat{\eta}_{ij}$, where $\hat{\eta}_{ij} \equiv \ln(\eta_{ij})$. --.

Column 45,
Line 53, "0≦ρ≦1" should read --0 ≤ $\rho$ < 1--.

Signed and Sealed this
Twentieth Day of May, 2014

Michelle K. Lee
*Deputy Director of the United States Patent and Trademark Office*

Line 53, "$n_1 \geqq 0, n_2 \geqq 0$" should read --$n_1 \geq 0, n_2 \geq 0$--.

Column 52,

Line 16, "left ($\leqq$)" should read --left ($\leq$)--.

Column 55,

Line 33, "$-1 \leqq \kappa \leqq 1$" should read -- $-1 \leq \kappa \leq 1$--.
Line 42, "
|        | Prior |     |
|--------|-------|-----|
| Update | In    | Out"| should read

--Prior

| Update | In | Out--. |

In the Claims

Column 62,
Line 16, "a, h, c, d, e, and f" should read --$a, b, c, d, e$, and $f$--.